(12) United States Patent
Finkelstein et al.

(10) Patent No.: US 11,467,286 B2
(45) Date of Patent: Oct. 11, 2022

(54) METHODS AND SYSTEMS FOR HIGH-RESOLUTION LONG-RANGE FLASH LIDAR

(71) Applicant: Sense Photonics, Inc., Durham, NC (US)

(72) Inventors: Hod Finkelstein, Berkeley, CA (US); Brent Fisher, Bethesda, MD (US); Scott Burroughs, Raleigh, NC (US); Russell Kanjorski, Chapel Hill, NC (US)

( * ) Notice: Subject to any disclaimer, the term of this patent is extended or adjusted under 35 U.S.C. 154(b) by 841 days.

(21) Appl. No.: 16/273,783

(22) Filed: Feb. 12, 2019

(65) Prior Publication Data

US 2019/0250257 A1   Aug. 15, 2019

Related U.S. Application Data

(60) Provisional application No. 62/684,822, filed on Jun. 14, 2018, provisional application No. 62/655,000, (Continued)

(51) Int. Cl.
*G01S 17/00* (2020.01)
*G01S 17/89* (2020.01)
(Continued)

(52) U.S. Cl.
CPC .............. *G01S 17/89* (2013.01); *G01S 7/487* (2013.01); *G01S 7/4813* (2013.01);
(Continued)

(58) Field of Classification Search
USPC ................................................ 356/4.01, 5.01
See application file for complete search history.

(56) References Cited

U.S. PATENT DOCUMENTS

| | | |
|---|---|---|
| 6,100,517 A | 8/2000 | Yahav et al. |
| 7,979,172 B2 | 7/2011 | Breed |
| | (Continued) | |

FOREIGN PATENT DOCUMENTS

| | | |
|---|---|---|
| DE | 102016114432 A1 | 2/2018 |
| JP | 2017534868 A | 11/2017 |
| | (Continued) | |

OTHER PUBLICATIONS

Notification of Transmittal of the International Search Report and the Written Opinion of the International Searching Authority, or the Declaration, in corresponding PCT Application No. PCT/US2019/017642 (Dated Apr. 9, 2020).

(Continued)

*Primary Examiner* — James R Hulka
(74) *Attorney, Agent, or Firm* — Myers Bigel, P.A.

(57) ABSTRACT

A Light Detection And Ranging (LIDAR) apparatus includes a pulsed light source to emit optical signals, a detector array comprising single-photon detectors to output respective detection signals indicating times of arrival of a plurality of photons incident thereon, and processing circuitry to receive the respective detection signals. The processing circuitry includes one or more of a recharge circuit configured to activate and deactivate subsets of the single photon detectors for respective strobe windows between pulses of the optical signals and at differing delays, a correlator circuit configured to output respective correlation signals representing detection of one or more of the photons having times of arrival within a predetermined correlation time relative to one another, and a time processing circuit comprising a counter circuit configured to increment a count value and a time integrator circuit configured to generate an integrated time value based on the respective correlation signals or detection signals.

23 Claims, 20 Drawing Sheets

Related U.S. Application Data filed on Apr. 9, 2018, provisional application No. 62/637,128, filed on Mar. 1, 2018, provisional application No. 62/630,079, filed on Feb. 13, 2018.

(51) Int. Cl.

| | | |
|---|---|---|
| *G01S 7/4863* | (2020.01) | |
| *G01S 7/4865* | (2020.01) | |
| *G01S 17/10* | (2020.01) | |
| *G01S 7/487* | (2006.01) | |
| *H04N 5/335* | (2011.01) | |
| *G01S 7/481* | (2006.01) | |
| *G01S 17/931* | (2020.01) | |

(52) U.S. Cl.
CPC .......... *G01S 7/4815* (2013.01); *G01S 7/4816* (2013.01); *G01S 7/4863* (2013.01); *G01S 7/4865* (2013.01); *G01S 17/10* (2013.01); *G01S 17/931* (2020.01); *H04N 5/335* (2013.01)

(56) References Cited

U.S. PATENT DOCUMENTS

| | | | |
|---|---|---|---|
| 9,516,244 B2 | 12/2016 | Borowski | |
| 9,831,630 B2* | 11/2017 | Lipson | H01S 5/00 |
| 10,036,803 B2* | 7/2018 | Pacala | G01S 17/42 |
| 10,298,908 B2* | 5/2019 | Retterath | G01S 17/931 |
| 10,359,375 B2* | 7/2019 | Cao | G21K 1/025 |
| 10,895,534 B2* | 1/2021 | Finkelstein | G01N 21/6408 |
| 11,006,876 B2* | 5/2021 | Johnson | A61B 5/742 |
| 11,096,620 B1* | 8/2021 | Seidman | A61B 5/0075 |
| 11,187,575 B2* | 11/2021 | Field | G01J 1/0422 |
| 2008/0161987 A1* | 7/2008 | Breed | G08G 1/161 701/27 |
| 2011/0260036 A1 | 10/2011 | Baraniuk et al. | |
| 2013/0300838 A1 | 11/2013 | Borowski | |
| 2014/0158870 A1 | 6/2014 | Deantonio et al. | |
| 2015/0219764 A1 | 8/2015 | Lipson | |
| 2015/0285625 A1 | 10/2015 | Deane | |
| 2015/0293021 A1 | 10/2015 | Finkelstein et al. | |
| 2016/0266054 A1 | 9/2016 | Cao et al. | |
| 2017/0299700 A1* | 10/2017 | Pacala | G01S 17/89 |
| 2018/0295344 A1* | 10/2018 | Retterath | H04N 5/232121 |
| 2019/0310375 A1* | 10/2019 | Finkelstein | G01S 7/4815 |
| 2020/0057151 A1* | 2/2020 | Finkelstein | G01S 17/86 |
| 2020/0135776 A1* | 4/2020 | Finkelstein | G01S 17/08 |
| 2020/0158836 A1* | 5/2020 | Henderson | G01S 7/4863 |
| 2020/0158838 A1* | 5/2020 | Henderson | G01S 7/4868 |
| 2020/0196932 A1* | 6/2020 | Johnson | A61B 5/165 |
| 2020/0217965 A1* | 7/2020 | Calder | G01S 17/894 |
| 2020/0284884 A1* | 9/2020 | Henderson | G01S 7/4863 |
| 2021/0109224 A1* | 4/2021 | Finkelstein | G01S 7/4863 |
| 2021/0231782 A1* | 7/2021 | Henderson | G01S 7/4817 |
| 2021/0259618 A1* | 8/2021 | Seidman | G01N 33/4833 |
| 2021/0293614 A1* | 9/2021 | Field | A61B 5/6803 |

FOREIGN PATENT DOCUMENTS

| | | |
|---|---|---|
| KR | 1020140022249 A | 2/2014 |
| WO | 2010149593 A1 | 12/2010 |
| WO | 2017143217 A1 | 8/2017 |
| WO | 2017/149526 A2 | 9/2017 |

OTHER PUBLICATIONS

"3D Image Sensor REAL3" Infineon Technologies AG, From URL: https://www.infineon.com/cms/en/product/sensor/3d-image-sensor-real3/ (10 pages) (2015).

"An Introduction to the Silicon Photomultiplier" Technical Note, Sense Light (16 pages) (Feb. 2017).

Beer et al. "Background Light Rejection in SPAD-Based LiDAR Sensors by Adaptive Photon Coincidence Detection" Sensors 18(12):1-16 (Dec. 2018).

Beer et al. "SPAD-based flash LiDAR sensor with high ambient light rejection for automotive applications" Proceedings vol. 10540, Quantum Sensing and Nano Electronics and Photonics XV 10540:105402G (Jan. 2018).

Caliman et al. "8 mW fundamental mode output of wafer-fused VCSELs emitting in the 1550-nm band" Optics Express 19(18): 16996-17001 (2011).

Dutton et al. "Single Photon Counting Performance and Noise Analysis of CMOS SPAD-Based Image Sensors" Sensors 16(7):1-17 (Jul. 2016).

Gnecchi et al. "A 1×16 SiPM Array for Automotive 3D Imaging LiDAR Systems" IISW (pp. 133-136) (2017).

Harris, Mark "Can Israeli Start-up Oryx Oust Lidar From Self-Driving Cars?" IEEE Spectrum (3 pages) (Nov. 2016).

Lapedus, Mark "Radar Versus LiDAR" Semiconductor Engineering (15 pages) (Oct. 2017).

"LIDAR Filters" Alluxa © 2019, From URL: https://www.alluxa.com/learning-center/optical-filter-applications/lidar-filters (4 pages) (Date Unknown but Admitted Prior Art).

Niclass et al. "Design and characterization of a CMOS 3-D image sensor based on single photon avalanche diodes" IEEE Journal of Solid-State Circuits 40(9):1847-1854 (Sep. 2005).

"Notch Filter Spectra vs. Angle of Incidence" Semrock, © 2019 IDEX Health & Science LLC, From URL: https://www.semrock.com/TN_Notch_SpectrumvsAOI.aspx (3 pages) (Date Unknown but Admitted Prior Art).

Olivier, Pierre "Leddar Optical Time-of-Flight Sensing Technology: A New Approach to Detection and Ranging" White Paper, LeddarTech Inc. (13 pages) (2015).

Panina et al. "Compact CMOS Analog Counter for SPAD Pixel Arrays" IEEE Transactions on Circuits and Systems II: Express Briefs 61(4):214-218 (Apr. 2014).

Perenzoni et al. "Compact SPAD-Based pixel architectures for time-resolved image sensors" Sensors 16(5):1-12 (May 2016).

"Stereo video camera" Robert Bosch GmbH, From URL: https://www.bosch-mobility-solutions.com/en/products-and-services/passenger-cars-and-light-commercial-vehicles/driver-assistance-systems/lane-departure-warning/stereo-video-camera/ (7 pages) (2013).

Wahl, Michael "Time-Correlated Single Photon Counting" PicoQuant GmbH (14 pages) (2014).

Wiedenmann et al. "High volume production of single-mode VCSELs" Proceedings of SPIE—The International Society for Optical Engineering, vol. 6132 (12 pages) (Mar. 2006).

Extended European Search Report, corresponding to EP 19848671.4 dated Jul. 27, 2021 (8 pages).

\* cited by examiner

METHODS AND SYSTEMS FOR HIGH-RESOLUTION LONG-RANGE FLASH LIDAR

CLAIM OF PRIORITY

This application claims priority from U.S. Provisional Application Nos. 62/630,079 filed Feb. 13, 2018, 62/637,128 filed Mar. 1, 2018, 62/655,000 filed Apr. 9, 2018, and 62/684,822 filed Jun. 14, 2018, respectively entitled "Methods and Systems for High-resolution Long-range Flash Lidar", the disclosures of which are incorporated by reference herein.

FIELD

The subject matter herein relates generally to 3D imaging, and more specifically to LIDAR (Light Detection And Ranging; also referred to herein as "LIDAR") systems for 3D imaging.

BACKGROUND 3D imaging systems can be categorized as radar-based systems, which may rely on microwave radiation (e.g., a wavelength range of 1 mm-100 cm), and optical systems, which may rely on electromagnetic radiation in the optical band (e.g., a wavelength range of 100 nanometer(nm)-1 millimeter (mm)). Optical 3D imaging systems can be categorized to stereo-based systems (which may rely on the parallax effect), interferometric imaging systems (which may rely on the Doppler effect), and Time-of-Flight (TOF) systems.

TOF 3D imaging systems can be categorized as indirect TOF or direct TOF systems. An example of an indirect TOF system is the Photonic Mixer Device (PMD), which can measure the phase delay between a transmitted and received amplitude-modulated optical signal. The distance d to the targets can be calculated as (d and R used interchangeably herein):

$$d = \frac{C * \phi}{4 * \pi * f}$$

Phase can be detected using a quasi-CCD (charge coupled device) in-pixel configuration referred to as a lock-in pixel, where the photogenerated charge is distributed between multiple (e.g., 4) wells, each delayed by one quarter of the modulation cycle and lasting half the modulation cycle. The phase shift of the collected signal can be extracted from the charges collected in each quarter-cycle well. A maximum achievable range resolution of some PMDs may be expressed as:

$$\sigma_B = \frac{c}{4\pi \cdot f_{mod} \sqrt{2}} \cdot \frac{\sqrt{B}}{c_{demod} \cdot A_{sig}}$$

where c is the speed of light, $f_{mod}$ the modulation frequency, B is the offset which is equal to $B = A_{sig} + BG$ where the first term is the number of signal electrons and the second is the number of background electrons in an integration time, and $c_{demod}$ is the demodulation contrast.

There may be several drawbacks for PMD devices. For example, PMDs typically use non-CMOS (complementary metal-oxide semiconductor) devices and may therefore be more expensive than some generic CMOS devices, such as CMOS Image Sensors. Another shortcoming of PMD devices may be associated with trade-offs between range and range resolution. For example, when four separate and electrically isolated taps are used, the silicon area required for each pixel increases, thereby reducing the maximal number of pixels on a chip (which area is typically constrained by the reticle field size in semiconductor manufacturers' photolithography lines) as well as the effective price per pixel. The maximal range may be determined by maximal phase which can be measured, which is $2\pi$. The frequency can be lowered in order to increase the maximal range. On the other hand, range resolution may be constrained by the phase error, which may be determined by deviation from a perfect sinusoidal modulation by the emitter and by noise at the four detector taps, in addition to other amplitude and phase noise between the emitter and detector. Therefore, a higher modulation frequency may be used to increase or maximize the phase delay for a given distance traversed by the light pulse. Higher modulation frequencies may require more expensive emitter drivers, faster frame-rate detectors, as well as higher sensitivity, because at higher frequencies, each of the four phases may spans a shorter amount of time, so less light may be available for integration and the signal-to-noise may be reduced. The issue of dynamic range may be exacerbated by the fact that the signal at the output of the detector may be lowest for long-range, lower-reflectivity targets which happen to be at a range where the phase difference between taps may be minimal; whereas the maximal signal may occur with short-range, higher-reflectivity targets which happen to be at a distance where the phase difference between taps may be maximal. Moreover, direct sunlight can impede the performance of PMD detectors. While a background subtraction functionality may be integrated into the detector in some devices, the full-well capacity of each of the taps should still accommodate the photon flux due to direct sunlight at the lowest modulation frequency (longest integration), and the Poisson noise accompanied by this accumulated charge can degrade the signal-to-noise ratio, especially for distant, weak reflections.

One way to address some of the deficiencies described above is by switching between frequencies, or tones. However, such switching can effectively reduce the refresh rate, and may have limited effect because achieving ranges of hundreds of meters (as may be desired for applications such as autonomous vehicles) typically requires very low frequencies with very fine phase control. Moreover, the issue of dynamic range can become severe at long ranges and especially in the presence of direct sunlight.

The other category of TOF 3D imagers are direct TOF systems, which measure the distance to targets by measuring the time an optical signal takes to reach a target and back to the sensor (i.e., the time between emission of the optical signal and detection/time of arrival of the reflected optical signal at the sensor). Strobing direct TOF cameras typically use a periodic pulsed light source for illumination and a CCD or CMOS image sensor for detection. The image sensor is activated (or "strobed") for short windows of time at variable delays with respect to the light source, thus capturing reflected signals only from specific ranges at each frame. Each collected image contains the integrated signal from all photons in that time (and distance) window. No information may be collected regarding the time of arrival of individual photons. While such devices can use standard CMOS process technologies to design the high-speed strobing cameras, their effective refresh rates (RR) may be slow, and may be represented by: RR=(Range resolution/Maximal range)×(1/frame time). Therefore, if in one example 33 milliseconds (ms) is required to integrate a signal with acceptable signal to noise ratio (SNR), and 200 m maximal range and 5 cm range resolution is desired, the refresh rate is 0.0075 frames per second, which is typically unacceptable. Note that the integration time cannot be made arbitrarily short due to read noise.

Non-strobing direct TOF 3D imaging systems can use a number of detection elements, including but not limited to single-element scanning systems, linear-array scanning or rotating systems, and staring or Flash Lidar systems. Single-element scanning systems, for example utilizing Micro-Electrical Mechanical Systems (MEMS) for beam steering, are typically constrained by the round-trip time required for a beam to acquire a signal from the farthest target. For example, if the maximal detectable target is 200 m away, the system may wait 1.3 µsec between transmitting a pulse to one direction and the next; otherwise, there may be ambiguity when receiving a signal as to its originating pulse. This may place limitations on the resolution and refresh rate of such a system. For example, if a resolution of 0.1×0.1 square degrees is desired across a 120 degree×30 degree field of view with a 200 m maximal range, the refresh rate of the system would be 2.1 frames/second, which is typically too slow for many applications (unless short-cuts are taken which may result in non-imaged regions or in lower resolutions). Another possible issue with such arrays is the potential for misalignment of the MEMS mirrors, which may result in incomplete and/or inaccurate coverage of the field of view.

Linear arrays for Lidar may use sub-Geiger-mode diode arrays, such as p-i-n diodes and avalanche photodiode (APD)-based arrays. While the physical operation of each is different—p-i-n diodes may use a wide depletion region to increase quantum efficiency at the expense of temporal resolution, whereas APDs may use a high electric field to provide gain at the expense of noise amplification—their operation in the context of 3D imaging systems is similar. P-i-n diodes and APDs may generally be referred to herein as "photodiodes."

Lidar systems utilizing such photodiodes may operate by emitting periodic pulsed light. Photons may be absorbed, and in the case of APD's amplified, in the photodiode, generating a current which may be approximately linearly related to the number of photons. This linearity may be maintained well with p-i-n diodes but response may deviate from linear at high-gain operation of APD's. By measuring the photocurrent of the photodiode, weak signals can be measured, and because these devices do not integrate charge, they can, in principle operate with high ambient light, as long as their noise and the statistical shot noise can be kept low. This, together with active illumination and spectral filtering, may allow ambient light imaging. Moreover, by processing the analog waveform of the generated photocurrent, multiple reflections can be discriminated and identified.

The direct output of the photodiode is an analog current which corresponds to the time-varying photon flux convolved with the temporal response of the photodiode and its output impedance. As small signal-to-background ratios should be accommodated, digitization of the current may typically take place very close to the sensing junction. An Analog to Digital Converter (ADC) may require a relatively large number of bits to accommodate the high dynamic range and the very fine resolution desired. If there is no redundancy in the array, i.e., if all pixels may record a reflected signal (or "echo") simultaneously, one ADC can be allocated for each pixel. This may translate to large die area, so large-scale integration of multi-pixel two-dimensional arrays may be limited to small arrays. Moreover, operating at high gains can limit the bandwidth of the device.

The limited temporal resolution of photodiodes (e.g., 10 ns rise for certain APDs) may mean that sampling the precise arrival time of the leading edge of the echo can involve a relatively large error. This may limit the depth resolution of the sensor, which may result in a relatively low spatial resolution, low range resolution system.

Geiger-mode Avalanche diodes may be used in some Lidar systems. Geiger-mode avalanche diodes are p-n diodes that are reverse-biased beyond their breakdown voltage. Because a single photon may induce an avalanche, which can in-turn be read out as a binary event whose analog information is contained in its time, these devices may not incur read noise, and may thus be amenable to fast acquisitions with high temporal resolutions. Appropriate circuitry can be designed to provide reliable operation and to sample the output of Geiger-mode avalanche diodes.

In an imaging Silicon Photomultiplier (SiPM) pixel-array configuration, Geiger-mode avalanche diodes may be organized in clusters of microcells, such that the number of avalanches in a pixel may be used for counting the number of detected photons in a detection cycle, and appropriate timing measurement circuitry may be used to detect the time of these avalanches with respect to a reference time, such as that of an emitted pulse of light. These devices may have a number of deficiencies. For example, the maximum number of photons which can be detected for a given laser cycle may be limited by the number of microcells in a pixel. Thus, where the diodes are electrically isolated to reduce or prevent electrical or optical cross-talk, a higher number resolution translates to larger area, which can limit the number of pixels in on-chip arrays. Furthermore, the responsivity of a pixel to the number of avalanches may be non-linear, which may result in a limited dynamic range, or higher errors in large photon fluxes. If the time of arrival of each photon needs to be recorded, a large number of analog-to-digital computations may be performed, which may result in high area usage on the chip and high current consumption. If the capacitance of the diodes is shared, then afterpulsing, which is a correlated noise source in Geiger-mode diodes and is thus a source of noise, may increase. Imaging SiPM arrays may thus be generally used in low-pixel-number arrays, such as a 1×16 SiPM. If finer resolution is required, one or more arrays may need to be rotated around an axis, resulting in larger and more expensive systems.

Another configuration of Geiger-mode avalanche photodiodes is a SPAD (single photon avalanche detector) array in a Time-Correlated Single-Photon Counting (TCSPC) configuration. For example, as shown in FIG. 26, a controller sends a trigger to a pulsed light source, such as a laser, which in response transmits a pulse at time to. Simultaneously, a Time-to-Digital Converter (TDC) or array thereof, starts measuring time at time to, using various methods. Some of the photons reflected from target(s) (also referred to herein as echo signals or "echos") may trigger one or more avalanches in the SPAD array upon receipt (shown in FIG. 26 with reference to 2 echos, detected at times t1 and t2, respectively). Each avalanche stops its TDC and a digital value corresponding to the time elapsed between the laser trigger and the detection of the avalanche is output and stored in memory. Typically, a statistical distribution of the arrival times of photons in each pixel is produced, from which the 3D position of imaged targets can be inferred (shown in FIG. 26 as object 1 and object 2, based on arrival times t1 and t2 of the echo signals), A similar "Reverse Start-Stop" method may start the time measurement when an avalanche is sensed and end the time measurement at the next laser trigger, which can save power when avalanches are relatively sparse.

In some conventional configurations, a SPAD in an array may be strobed by pre-charging the SPAD beyond its breakdown voltage at a time correlated with the firing of an emitter pulse. If a photon is absorbed in the SPAD, it may trigger an avalanche breakdown. This event can trigger a time measurement in a time-to-digital converter, which in turn can output a digital value corresponding to the arrival time of the detected photon. A single arrival time carries little information because avalanches may be triggered by ambient light, by thermal emissions within the diode, by a trapped charge being released (afterpulse), and/or via tunneling. Moreover, SPAD devices may have an inherent jitter in their response. Statistical digital processing is typically performed in 3D SPAD-based direct TOF imagers.

Data throughput in such 3D SPAD-based direct TOF imagers is typically high. A typical acquisition may involve tens to tens of thousands of photon detections, depending on the background noise, signal levels, detector jitter, and/or required timing precision. The number of bits required to digitize the time-of-arrival (TOA) may be determined by the ratio of range to range resolution. For example, a LIDAR with a range of 200 m and range resolution of 5 cm may require 12 bits. If 500 acquisitions are required to determine a 3D point in a point cloud, 500 time-to-digital conversions may be needed to be performed, and 6 kbits may need to be stored for processing. For an example LIDAR system with 0.1×0.1 degree resolution and 120 degrees (horizontal) by 30 degrees (vertical) range, 360,000 acquisitions may be performed per imaging cycle. This can require 180 million TDC operations and 2.16 Gbits of data. Typical refresh rates for some applications (e.g., autonomous vehicles) may be 30 frames per second. Therefore, a SPAD-based LIDAR achieving typical target performance specifications may require 5.4 billion TDC operations per second, moving and storing 64.8 Gbit of information and processing 360,000× 30=10.8 million histograms per second.

In addition to such astronomical processing requirements, an architecture that uses direct digitization of photons arrival times may have area and power requirements that may likewise be incompatible with mobile applications, such as for autonomous vehicles. For example, if a TDC is integrated into each pixel, a large die may only fit 160×128 pixels, due for instance to the low fill factor of the pixel (where most of the area is occupied by control circuitry and the TDC). The TDC and accompanying circuitry may offer a limited number of bits.

Another deficiency of some existing SPAD arrays is that once a SPAD is discharged, it remains discharged, or "blind", for the remainder of the cycle. Direct sunlight is usually taken as 100 k lux. In one example, at 940 nm, the direct beam solar irradiance is 0.33 W/m²/nm. At 940 nm, photon energy is $2.1 \times 10^{-19}$ J, so $0.33/2.1 \times 10^{-19} = 1.6 \times 10^{18}$ photons impinge per m² per second in a 1 nm band. Typical LIDAR filters may have a pass band of approximately 20 nm. For a 10 μm diameter SPAD, this translates to $3.2 \times 10^9$ photons per second. Light takes $400/3 \times 10^8 = 1.3$ μs to traverse 2×200 m. During this time, $3.2 \times 10^9 \times 1.3 \times 10^{-6} = 4,160$ photons on average will impinge on the SPAD. As soon as the first photon induces an avalanche, that SPAD will become deactivated. Consequently, under these conditions, some SPAD 3D cameras may not be operable in direct sunlight.

One method to address high ambient light conditions implements a spatio-temporal correlator. In one example, 4 pixels may be used to digitally detect correlated events, which can be attributed to a pulsed source rather than to ambient light. Times of arrival of up to 4 SPADs per pixel may be digitized using a fine and coarse TDC, and results may be stored in a 16-bit in-pixel memory per SPAD. The results may be offloaded from the chip to be processed in software. The software may select coincident arrivals to form a histogram of arrival times per pixel per frame. The histogram may be processed to provide a single point on the point cloud. This scheme may quadruple the area and processing power versus generic imagers. By using 4 correlated arrivals, this example system may set limits on emitter power, maximal target range and/or target reflectivity, because a single pulse may provide 4 detected photons at the detector. Furthermore, the area required for the circuitry may allow for a limited number of pixels, which may include only a small portion of the overall die area. Thus, a high-resolution imager may be difficult or impossible to implement using this scheme. For example, the data throughput to process a 2×192 pixel array may be 320 Mbit/sec, so scaling these 2×192 pixels to the 360,000 pixels mentioned above for a staring LIDAR system may be unrealistic.

SUMMARY

According to some embodiments of the present disclosure, a Light Detection And Ranging (LIDAR) apparatus includes a pulsed light source configured to emit optical signals; a detector array comprising single-photon detectors that are configured to output respective detection signals indicating respective times of arrival of a plurality of photons incident thereon, where the photons comprise signal photons having wavelengths corresponding to the optical signals from the pulsed light source and background photons having wavelengths corresponding to at least one other source of light (e.g., ambient light); and processing circuitry configured to receive the respective detection signals output from the single-photon detectors. The processing circuitry includes one or more of a recharge circuit configured to activate and deactivate subsets of the single photon detectors for respective strobe windows between pulses of the optical signals and at respective delays that differ with respect to the pulses, responsive to respective strobing signals; a correlator circuit configured to output respective correlation signals representing detection of one or more of the photons whose respective time of arrival is within a predetermined correlation time relative to at least one other of the photons; and a time processing circuit comprising a counter circuit configured to increment a count value responsive to the respective correlation signals or detection signals and a time integrator circuit configured to generate an integrated time value with respect to a reference timing signal based on the respective times of arrival indicated by the respective correlation signals or detection signals, where a ratio of the integrated time value to the count value indicates an average time of arrival of the photons.

In some embodiments, a tunable optical filter element may be arranged to pass or transmit the photons that are incident on the detector array. The tunable optical filter element may have a transmission band that is configured to vary based on a spectrum of optical signals output from a pulsed light source and/or a temperature of the pulsed light source.

In some embodiments, the processing circuitry may further include a first channel that is configured to provide output values responsive to a first subset of the detection signals indicating the respective times of arrival of the plurality of photons including the signal photons and the background photons; a second channel that is configured to provide reference values responsive to a second subset of the detection signals indicating the respective times of arrival of the background photons but not the signal photons; and a control circuit that is configured to calculate an estimate of the average time of arrival of the photons based on a mathematical relationship between the output values and the reference values.

In some embodiments, the processing circuitry may be integrated on-chip with the detector array.

In some embodiments, the single-photon detectors may be single-photon avalanche detectors (SPADs).

In some embodiments, a control circuit may be configured to generate the respective strobing signals and/or calculate the average time of arrival of the photons.

In some embodiments, the control circuit may be integrated on-chip with the detector array.

According to some embodiments of the present disclosure, a Light Detection And Ranging (LIDAR) measurement device includes a detector array comprising single-photon detectors that are configured to output respective detection signals indicating respective times of arrival of photons incident thereon, where the photons comprise signal photons having wavelengths corresponding to optical signals output from a pulsed light source; and processing circuitry comprising a recharge circuit that is configured to activate and deactivate subsets of the single photon detectors for respective strobe windows between pulses of the optical signals and at respective delays that differ with respect to the pulses, responsive to respective strobing signals.

In some embodiments, durations of the respective strobe windows may be the same.

In some embodiments, durations of the respective strobe windows may differ.

In some embodiments, a time between the pulses of the optical signals may correspond to a distance range, and the durations of the respective strobe windows may differ according to sub-ranges of the distance range.

In some embodiments, the durations of the respective strobe windows corresponding to closer sub-ranges of the distance range may be greater than the durations of the respective strobe windows corresponding to farther sub-ranges of the distance range.

In some embodiments, the recharge circuit may be configured to activate and deactivate the subsets of the single photon detectors for the respective strobe windows responsive to the respective strobing signals based on relative positions of the subsets of the single photon detectors in the detector array.

In some embodiments, the relative positions may correspond to different azimuths and altitudes of an operating environment relative to an orientation of the detector array.

In some embodiments, the recharge circuit may be configured to dynamically adjust the durations of the respective strobe windows responsive to the respective strobing signals.

In some embodiments, the recharge circuit may be configured to dynamically adjust the durations of the respective strobe windows responsive to the respective strobing signals so as to alter boundaries of the sub-ranges corresponding to the respective strobe windows, or based on a brightness of a target indicated by previous detection signals.

According to some embodiments of the present disclosure, a Light Detection And Ranging (LIDAR) measurement device includes a detector array comprising single-photon detectors that are configured to output respective detection signals indicating respective times of arrival of a plurality of photons incident thereon, where the photons comprise signal photons having wavelengths corresponding to optical signals output from an emission source and background photons having wavelengths corresponding to at least one other light source; and processing circuitry configured to receive the respective detection signals output from the single-photon detectors. The processing circuitry includes a time processing circuit comprising a counter circuit configured to increment a count value responsive to the respective detection signals, and a time integrator circuit configured to generate an integrated time value with respect to a reference timing signal based on the respective times of arrival indicated by the respective detection signals, where a ratio of the integrated time value to the count value indicates an average time of arrival of the photons.

In some embodiments, the processing circuitry may further include a recharge circuit that is configured to activate and deactivate subsets of the single photon detectors for respective strobe windows between pulses of the optical signals and at respective delays that differ with respect to the pulses, responsive to respective strobing signals.

In some embodiments, the processing circuitry may further include a correlator circuit that is configured to receive the respective detection signals and output respective correlation signals representing detection of one or more of the photons whose respective time of arrival is within a predetermined correlation time relative to at least one other of the photons. The counter circuit may be configured to increment the count value responsive to a subset of the respective detection signals comprising the correlation signals, and the time integrator circuit may be configured to integrate the respective times of arrival indicated by the subset of the respective detection signals comprising the correlation signals.

In some embodiments, a tunable optical filter element may be arranged to output the photons that are incident on the detector array. The tunable optical filter element may have a transmission band that is configured to vary based on a spectrum of the optical signals and/or temperature of the emission source.

In some embodiments, the time processing circuit may include a first channel that is configured to provide the count value and the integrated time value responsive to a first subset of the detection signals indicating the respective times of arrival of the plurality of photons including the signal photons and the background photons, and a second channel that is configured to provide a reference count value and a reference integrated time value responsive to a second subset of the detection signals indicating the respective times of arrival of the background photons but not the signal photons. A control circuit may be configured to calculate an estimate of the average time of arrival of the photons based on relationships between the integrated time value and the reference integrated time value, and between the count value and a reference count value.

In some embodiments, the counter circuit may include a counting capacitor configured to accumulate charge responsive to each of the respective detection signals and output a voltage corresponding to the count value; and/or the time integrator circuit may include an integrating capacitor configured to accumulate charge responsive to the respective detection signals and output a voltage corresponding to the integrated time value.

According to some embodiments of the present disclosure, a Light Detection And Ranging (LIDAR) measurement device includes a detector array comprising single-photon detectors that are configured to output respective detection signals indicating respective times of arrival of a plurality of photons incident thereon; and processing circuitry configured to receive the respective detection signals output from the single-photon detectors. The processing circuitry includes a correlator circuit that is configured to output respective correlation signals representing detection of one or more of the photons whose respective time of arrival is within a predetermined correlation time relative to at least one other of the photons.

In some embodiments, the correlator circuit may be configured to output the correlation signals independent of stored data indicating the respective times of arrival based on the detection signals, in some embodiments.

In some embodiments, the correlator circuit may be configured to output the correlation signals without storing the respective times of arrival in one or more histograms.

In some embodiments, the predetermined correlation time may be relative to a leading edge of the respective detection signal indicating the respective time of arrival for the one or more of the photons.

In some embodiments, the predetermined correlation time may correspond to a pulse width of optical signals output from a pulsed light source.

In some embodiments, the correlator circuit may include respective buffer elements that are configured to delay the respective detection signals by the predetermined correlation time and output respective pulsed signals having pulse widths corresponding to the predetermined correlation time; and logic circuits that are configured output the correlation signals when the pulse widths of at least two of the respective pulsed signals overlap in time.

In some embodiments, the processing circuitry may further include a time processing circuit comprising a counter circuit configured to increment a count value responsive to each of the correlation signals, and a time integrator circuit configured to generate an integrated time value based on the respective times of arrival corresponding to the correlation signals, where a ratio of the integrated time value to the count value indicates an estimated average time of arrival of the photons.

In some embodiments, the processing circuitry may be configured to bypass the correlator circuit and provide the respective detection signals to the time processing circuit based on the respective detection signals relative to a predetermined threshold.

In some embodiments, the time processing circuit may include a first channel that is configured to provide the count value and the integrated time value responsive to the correlation signals, and a second channel that that is configured to provide a reference count value and a reference integrated time value responsive to respective detection signals corresponding to photons whose respective times of arrival are outside the predetermined correlation time relative to one another.

In some embodiments, the correlator circuit may be configured to increase or decrease the predetermined correlation time when the respective detection signals corresponding to photons whose respective times of arrival are outside the predetermined correlation time relative to one another are below a threshold.

In some embodiments, the processing circuitry may further include a recharge circuit that is configured to activate and deactivate subsets of the single photon detectors for respective strobe windows between pulses of optical signals output from a pulsed light source and at respective delays that differ with respect to the pulses, responsive to respective strobing signals.

In some embodiments, a tunable optical filter element may be arranged to output the photons that are incident on the detector array, the tunable optical filter element having a transmission band that is configured to vary based on a spectrum of optical signals output from a pulsed light source and/or a temperature of the pulsed light source.

According to some embodiments of the present disclosure, a Light Detection And Ranging (LIDAR) measurement device includes a tunable optical filter element having a transmission band that is configured to vary based on a spectrum of optical signals output from an emission source and/or a temperature of the emission source; and a detector array arranged to receive output light transmitted through the optical filter element, the detector array configured to output respective detection signals indicating respective times of arrival of a plurality of photons incident thereon.

In some embodiments, at least one actuator may be configured to alter a tilt angle of the tunable optical filter element relative to a reference angle (e.g., an angle of incidence of light thereon). The tilt angle may be continuously variable over a predetermined angular range, or may be variable among a plurality of discrete tilt angles, and the transmission band may vary based on the tilt angle.

In some embodiments, an impedance measurement circuit may be configured to measure respective impedances at respective regions of the tunable optical filter element, and a driving circuit may be coupled to the impedance measurement circuit and configured to control the at least one actuator to alter the tilt angle based on the respective impedances.

In some embodiments, a temperature of the tunable optical filter element may be configured to vary with a temperature of the emission source.

In some embodiments, the tunable optical filter element may be thermally coupled to the emission source, comprises a same material as the emission source, and/or is included in a temperature-controlled housing.

According to some embodiments of the present disclosure, a Light Detection And Ranging (LIDAR) measurement device includes a detector array configured to output respective detection signals indicating respective times of arrival of photons incident thereon, wherein the photons comprise signal photons having wavelengths corresponding to light output of an emission source and background photons having wavelengths corresponding to at least one other light source; and processing circuitry configured to receive the respective detection signals output from the single-photon detectors. The processing circuitry includes a first channel that is configured to provide output values responsive to a first subset of the detection signals indicating the respective times of arrival of the plurality of photons including the signal photons and the background photons; and a second channel that is configured to provide reference values responsive to a second subset of the detection signals indicating the respective times of arrival of the background photons without the signal photons. A control circuit is configured to calculate an estimate of the average time of arrival of the photons based on a mathematical relationship between the output values and the reference values.

In some embodiments, the control circuit may be configured to sequentially operate one or more single-photon detectors of the detector array to provide the first and second subsets of the detection signals.

In some embodiments, the control circuit may be configured to sequentially operate the one or more of the single-photon detectors to provide the second subset in coordination with deactivation of the emission source.

In some embodiments, the control circuit may be configured to operate one or more single-photon detectors of the detector array to provide the second subset in parallel with the first subset. The one or more of the single photon detectors may comprise an optical filter thereon having a transmission band that is configured to prevent passage of the signal photons to the one or more of the single photon detectors.

In some embodiments, the processing circuitry may further include a correlator circuit that is configured to receive the respective detection signals and output respective correlation signals representing detection of one or more of the photons whose respective times of arrival are within a predetermined correlation time relative to one another as the first subset.

In some embodiments, the correlator circuit may be configured to increase or decrease the predetermined correlation time when the second subset of the detection signals indicate that light from the at least one other light source is below a threshold.

According to some embodiments, a Light Detection And Ranging (LIDAR) imaging device includes an array of single-photon detectors (e.g., SPADs) that are configured to output respective detection signals indicating respective times of arrival of photons incident thereon, and an array of infrared detectors and/or CMOS image sensors integrated in the array of single photon detectors.

In some embodiments, the single photon detectors may have a concentric arrangement (e.g., with a central diode surrounded by one or more ring-shaped diodes), and may share one or more electrical connections or may have their own electrical connections In some embodiments, the single photon detectors may have a stacked arrangement (e.g., with one or more diodes arranged under a first diode), and may share one or more electrical connections or may have their own electrical connections.

In some embodiments, an array of capacitors may be provided on the imaging device (e.g., on a same substrate with the array stacked thereon) so as to allow charge distribution and fast recharging of the single-photon detectors of the array.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION OF EMBODIMENTS

Figure 1:
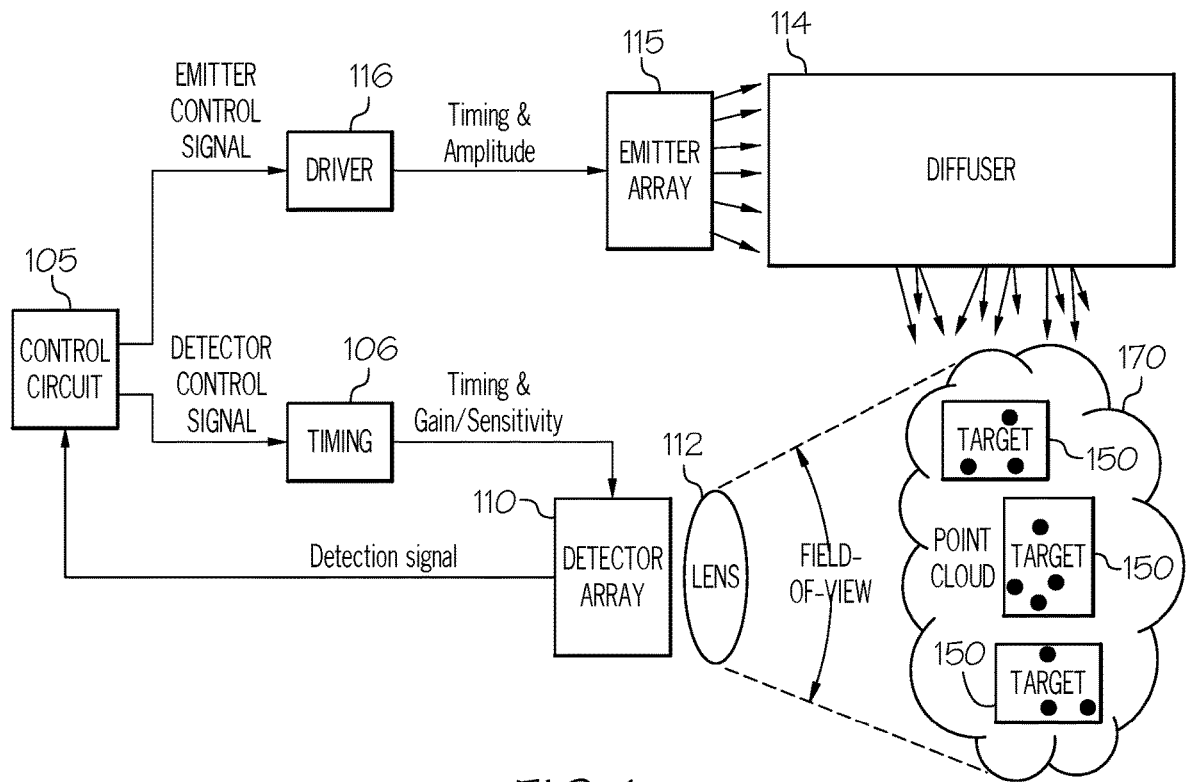
FIG. 1 is a block diagram illustrating example components of a time of flight measurement system or circuit in a LIDAR application in accordance with some embodiments described herein.

Embodiments of the present disclosure are directed to light-based ranging measurement systems (such as LIDAR) and related methods of operation that are configured to reduce the quantity of incoming photons that are measured and/or stored as data in memory. Some embodiments described herein provide methods, systems, and devices including electronic circuits that provide LIDAR systems including one or more emitter elements (including semiconductor lasers, such as surface- or edge-emitting laser diodes; generally referred to herein as emitters) and one or more light detector elements (including semiconductor photodetectors, such as photodiodes, including avalanche photodiodes and single-photon avalanche detectors; generally referred to herein as detectors). In some embodiments, photons are selectively captured or detected by the detectors based on a time correlation between their respective times of arrival relative to one another, which can reduce the quantity of incoming photons that are measured and processed. For example, based on recognition that photons from a pulsed laser and reflected by a target may arrive in a relatively narrow window of time, embodiments described herein can thereby selectively capture these "correlated" photons while rejecting "uncorrelated" photons, such as photons from ambient light sources (e.g., the sun). In some embodiments, a counter circuit, such as an analog counter, generates count value signals representative of the photons that fall within the time correlation window, providing in-pixel averaging without digitizing and storing histograms or other data representative of the captured photons. Thus, data throughput can be significantly reduced.

Effects of ambient light can be further reduced by strobing range gates non-linearly and/or by spectral filtering of the light output by the emitter array and/or the light detected at the detector array. In particular, further embodiments may include tunable spectral filters (e.g., varying with emitter or detector array temperature and/or emitter array spectral output), non-linear data strobing (e.g., varying with time of flight) to further reduce ambient light photon counts. Detection and subtraction of uncorrelated or "background" photons may also be implemented. Minimal or reduced off-chip processing may be required, thereby lowering overall system cost. It will be understood that discussion herein with reference to ambient light or light sources may likewise apply to light from sources other than the pulsed laser or emission source of the LIDAR system of the present disclosure.

That is, some embodiments of the present disclosure may include a combination of in-pixel counting and averaging with a time correlator and, in some further embodiments, non-linear strobing of the detector array, background light subtraction, and/or tunable spectral filtering. In some embodiments, avalanche photodiodes, such as SPAD-based arrays, may be used as a photon capture mechanism. Some embodiments can thus provide long-range staring SPAD-based LIDAR systems operating in direct sunlight conditions. Additional features of the present disclosure, including any and all combinations of such features, will become apparent from the following description and appended claims, taken in conjunction with the accompanying drawings.

FIG. 1 Illustrates example components of a time of flight measurement system or circuit 100 in a LIDAR application in accordance with some embodiments described herein. The circuit may include a control circuit 105, a timing circuit 106, and an array of single-photon detectors 110 (for example, a SPAD array). The timing circuit 106 may generate and output strobing signals that control the timing of the single-photon detectors of the array 110. An emitter array 115 emits a radiation pulse (for example, through a diffuser or optical filter 114) at a time controlled by a timing generator or driver circuit 116.

In some embodiments, each of the emitter elements in the emitter array 115 may be connected to and controlled by a respective driver circuit 116. In other embodiments, respective groups of emitter elements in the emitter array 115 (e.g., emitter elements in spatial proximity to each other), may be connected to a same driver circuit 116. The driver circuit 116 may include one or more driver transistors, which are configured to control the timing and amplitude of the optical emission signal. The timing circuit 106 may likewise control the timing and gain/sensitivity of the detector array 110. In some embodiments, the timing circuit 106 and/or the driver circuit 116 may be included in the control circuit 105.

Optical signals emitted from one or more of the emitters of the emitter array 115 impinges on and is reflected by one or more targets 150, and the reflected light is detected as an optical signal (also referred to herein as echo signals or echo) by one or more of the detectors of the detector array 110 (e.g., via one or more lenses 112), converted into an electrical signal representation, and processed (e.g., based on time of flight) to define a 3-D point cloud representation 170 of the field of view. More particularly, the detector array 110 generates respective detection signals indicating the respective times of arrival of photons in the reflected optical signal, and outputs the respective detection signals to the control circuit 105. In some embodiments, the control circuit 105 may include a pixel processor that measures the time of flight of the illumination pulse over the journey from the emitter array 110 to a target 150 and back to the detector array 110 (i.e., the time between emission of the optical signal by the emitter array 115 and the time of arrival of the reflected optical signal or echo at the detector array 110, as indicated by the respective detection signals) and calculates the distance to the target 150. Operations of LIDAR systems in accordance with embodiments of the present invention as described herein may be performed by one or more processors or controllers, such as the control circuit 105 of FIG. 1. Portions or an entirety of the control circuits described herein may be integrated in the detector array 110 in some embodiments.

In particular embodiments, the emitter array 115 may include a pulsed light source, such as an LED, laser, VCSEL, or arrays thereof. The total optical power output of the light source may be selected to generate a signal-to-noise ratio of the echo signal from the farthest, least reflective target at the brightest background illumination conditions that can be detected in accordance with embodiments described herein. The emitted light can have a relatively narrow bandwidth. In some non-limiting examples, the total emitter peak power may be 0.01, 0.1, 1, 5, 10, 25, 40, 60, or 65 kW with a peak wavelength of 940 nm with an emission bandwidth of about 0.1, 0.5, 1, 3, 5, 10, or 20 nm FWHM (full width at half maximum).

In some embodiments, the emitter array 115 may be an array of VCSELs. The typical emission wavelength spectra of VCSELs on a wafer may be broader than typically desirable in LIDAR applications. For example, peak emission wavelength may vary by about 10 or 20 nm across a wafer. Also, there may be a high spatial correlation between peak emission wavelength of VCSELs on a wafer. In other words, VCSEL devices which are in close proximity on a wafer typically have close emission spectra and these spectra can be measured, e.g., by optical pumping, before dicing or singulation of the VCSEL devices.

Some embodiments described herein may be directed to LIDAR systems that, for example, have particular application for use on a vehicle, such as an autonomous vehicle. The following discussion of embodiments directed to a LIDAR system for autonomous vehicles is merely exemplary in nature, and is in no way intended to limit the disclosure or its applications or uses. For example, while some embodiments of LIDAR systems described herein may have particular application for use on a vehicle, as will be appreciated by those skilled in the art, the LIDAR systems described herein may have other applications, including but not limited to robotic systems, aerial vehicles and warehouse navigation equipment.

It may be desirable for a LIDAR system to include all solid-state components and require no mechanical scanning, reducing cost and increasing robustness. Such a LIDAR system may have a range of several hundred meters, e.g., 150, 200, 250 or 300 meters, may be operable during daytime and nighttime lighting conditions, even with direct sunlight (100 k lux), and may provide a fine range resolution, e.g., 3, 5, 7, 10, or 15 cm. Some or all regions of the field of view may be refreshed with desired frequency, e.g., 10, 20, 30, 40, or 50 frames per second. The angular field of view may be relatively wide for vehicular applications, e.g., 120 degrees horizontal×30 degrees vertical field with 0.1 degree resolution. The wavelength, output power, and emission characteristics of the emitter(s) may not cause eye damage. The LIDAR system may operate at a relatively wide temperature range for outdoor operating conditions, e.g. −40 degrees Celsius (C) to 105 degrees C. ambient, have a small form factor and be cost-effective.

Figure 2:
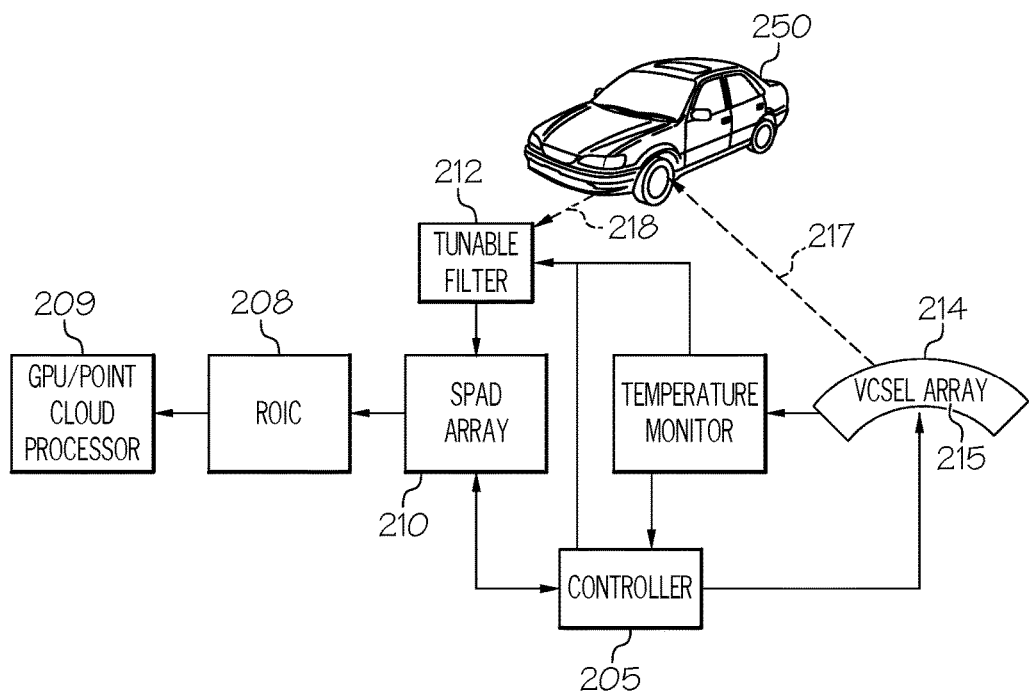
FIG. 2 is a block diagram illustrating example components of a time of flight measurement system or circuit in a LIDAR application in accordance with further embodiments described herein.

Such an example LIDAR system 200, as shown in FIG. 2, includes a narrow-emission-band VCSEL array 215 as the emitter array along with beam shaping emitter optics 214 to emit optical signals that may cover a desired field of view (FOV). For example, the VCSEL array 215 may be printed onto a flexible substrate and interconnected using an overlaid metal-dielectric stencil to ensure substantially simultaneous firing of the array of VCSELs. The interconnected array and substrate may be mounted on a thermally conductive second substrate and enclosed in an enclosure. One or more emission lenses in (or, alternatively, out of) the enclosure may diffuse the VCSEL emissions to form an emission cone to illuminate a desired area.

In the example LIDAR system 200, the detector array is implemented as a SPAD array 210. As described in greater detail herein, the SPAD array 210 may include a plurality of pixels, each of which contains two or more SPADs, a time correlator, an analog counter, and/or a time accumulator. The correlator, counter, and/or accumulator may be integrated on-chip (e.g., stacked below on a same substrate) with the array of SPAD detectors 210. During each imaging frame, a controller 205 drives the VCSEL array 215 to illuminate a portion or entirety of the field of view using optical signals 217 including a train of pulses. An imaging filter 212 passes most or substantially all the arriving echo VCSEL photons 218, yet rejects (a majority of) ambient photons. The SPADs of the array 210 may be discharged when the VCSELs of the array 215 fire, and may be (fully) recharged a short time after the emission of the optical pulse. Some embodiments described herein implement a time correlator, such that only pairs of (or more than two) avalanches detected within a pre-determined time are measured. In some embodiments, a measurement may include the addition of a fixed first charge (indicating a count value) onto a counting capacitor, as well as the addition of a second charge (which is a function of the arrival time) onto a time integrator. At the end of a frame, a circuit (illustrated as including a readout integrated circuit (ROIC) 208 and a GPU/point cloud processor 209) calculates the ratio of integrated time to number of arrivals, which is an estimate of the average time of arrival of photons for the pixel. This estimate is based on calculation of a "center" of the integrated time distribution, and is also referred to herein as center of mass estimation. The processor 209 collects the point cloud data from the imager module (referred to herein as including the detector array and accompanying processing circuitry), generating a 3D point cloud.

As shown in the example of FIG. 2, a temperature monitor 213 measures the temperature of the VCSEL array 215 and outputs electrical signals indicating the temperature. The VCSEL array 215 may be configured to emit light as optical signals 217 including a train of pulses at a wavelength which is weakly absorbed by the atmosphere, for example, at a wavelength of about 940 nm, and simultaneously illuminate a relatively wide field of view, e.g., a region of 120° horizontal by 30° vertical. Some of the emission light 217 hits a target 250 and some of this light is reflected to provide echo signals 218 onto the detector/SPAD array 210, which may be arranged in proximity to the emitter/VCSEL array 215.

Various optical spectral imaging filters can be used as the imaging filter 212 to block some of the ambient light and transmit some, most, or all of the emission light 217 output from the emitter array 215 onto the detector array 210. Some spectral filters may utilize an absorbing material, and some may use a stack of dielectric materials (dielectric filters). Others may use a cavity, such as a Fabry-Perot Interferometer, to selectively transmit wavelengths of light corresponding to the optical emission 217 of the LIDAR system 200 while blocking much of the ambient light. The transmission band of such filters can be tuned, for example, to transmit light over a bandwidth of about 20 nm or 10 nm or 1 nm or 0.1 nm.

In FIG. 2, the imaging filter is implemented as a tunable optical filter element 212 (also referred to herein as a tunable filter) that is configured to transmit the received reflected light 218 (e.g., substantially all of the received reflected light) from the target 250, but reject or block transmission of at least some portion of ambient light and/or light from other LIDAR emitters, that is, light that is outside of the wavelength range of the emission light 217 from the VCSEL array 215. The transmission band (or "pass band") of the tunable filter 212 may be relatively narrow, e.g., 0.1, 0.5, 0.8, 1, 1.5, 3, 5, 7, 10, or 20 nm FWHM. In some embodiments, the transmission band of the tunable filter 212 may be controlled or varied based on changes in the temperature of the emitter array 215 (and/or resulting changes in the spectral output 217 thereof), for example, in response to the electrical signals from the thermal sensor/temperature monitor 213.

In some embodiments, the wafer containing the VCSEL array 215 may be probed and an emission wavelength map may be produced. In some embodiments, a transfer process, such as a micro-transfer printing process, transfers groups of VCSELs to define the VCSEL array 215 with a relatively narrow spectral distribution; for example, VCSELs whose emission maxima are with a 1-nm band of one another may be transferred to a single substrate. In some embodiments, wafer mapping may not be performed, and narrow spectral spread may be ensured based on the localization of transferred VCSELs. In some embodiments, an interconnect layer may be applied on or above the array 215 of VCSEL elements such that the time delay from one or more drivers to each of the VCSEL elements of the array 215 is relatively small. For example and in particular embodiments, a single driver (such as the driver circuit 116 of FIG. 1) drives an interconnect "tree" whereby the interconnect length and the RC delay from the driver to some or all VCSEL elements of the array 215 may be less than about 250 picoseconds (ps), or 500 ps, or 750 ps, or 1 ns. One or more lenses (such as the lens 112) may be arranged to homogenize the emission for the VCSELs and shape a beam to illuminate a desired region with desired uniformity.

As shown in FIG. 2, the tunable filter 212 is a narrow-band imaging filter arranged to filter the optical signals 218 reflected from a target 250 before detection by the SPAD array 210. The tunable filter 212 is controlled by the measured temperature of the VCSEL array 215 (as indicated by output from the temperature monitor 213) and transmits a narrow spectral band corresponding to (substantially all of) the emitted VCSEL energy to the SPAD array 210, while rejecting ambient light. The tunable filter 212 may include tunable Fabry Perot filters, acousto-optical filters, and liquid crystal tunable filters. Some of these filters may suffer from broad transmission bands, slow switching between spectral bands, low light throughput, low out-of-band rejection ratio, and/or high price. In some embodiments, collection optics (such as the lens 112 of FIG. 1) may be used to focus reflected light 218 onto the SPAD array 210 such that each SPAD pixel images a 0.1°×0.1° cone.

Figure 3:
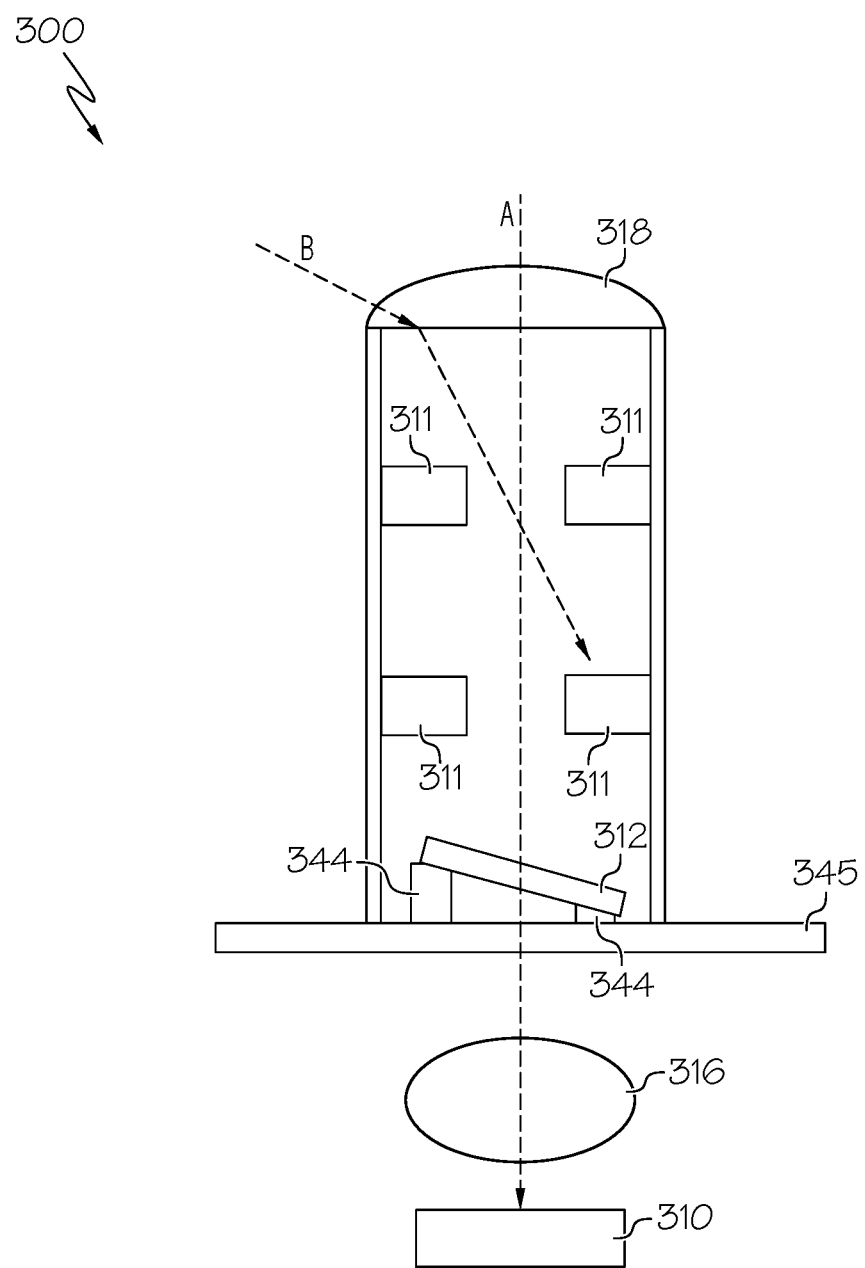
FIG. 3 is a block diagram illustrating example components of an imaging system including a tunable optical filter in a LIDAR application in accordance with some embodiments described herein.

FIG. 3 shows one example of an imaging system 300 including a tunable filter 312 according to some embodiments. Collection optics 318, which may include one or more optical elements, collimate light from a predefined acceptance cone, e.g., 120° horizontal×30° vertical with respect to the optical axis of the system 300. Spatial filters 311, which may be implemented in various forms such as a barrel, are arranged so as to allow only a relatively narrow set of ray angles to be transmitted through them. For example, as shown in FIG. 3, Ray A (which is at least partially collimated) passes through the 2-pupil spatial filter 311, while Ray B (which is incident at an angle that is greater than or outside of the angular range of the acceptance cone) is blocked. A tunable filter 312 with desired finesse is attached to a stationary substrate 345 by actuators 344 (such as piezoelectric actuators, whose driving voltage may be set by a thermal sensor attached to the emission VCSEL array).

Focusing optics 316 focuses the spatially- and spectrally-filtered light onto an optical sensor or detector array 310, which may be a SPAD array in some embodiments.

As shown in greater detail in the example of FIG. 3, the tunable filter 312 is arranged in front of the detector array 310 to substantially block ambient light and/or other light that is not output from the emitter array (e.g., 115, 215). In particular embodiments the tunable filter 312 may be a high-finesse tunable Fabry-Perot Interferometer, a high-finesse liquid-crystal tunable filter, a tunable acousto-optical tunable filter, or a dielectric filter, each of which may be mounted on one or more actuators 344 and (optionally) placed behind a spatial filter (such as defined by the pupils 311) to direct collimated light at a controlled angle with respect to the filter 312. The actuator(s) 4 may be configured to tilt the tunable filter 312 at a desired tilt angle in response to an actuator control signal. The actuators 344 may be operable to alter the tilt angle of the tunable filter 312 over a continuously variable angular range, or among a set of discrete tilt angles corresponding to respective actuator positions. The one or more pupils 311 may be coaxial with the desired propagation of incoming light.

Figure 4A:
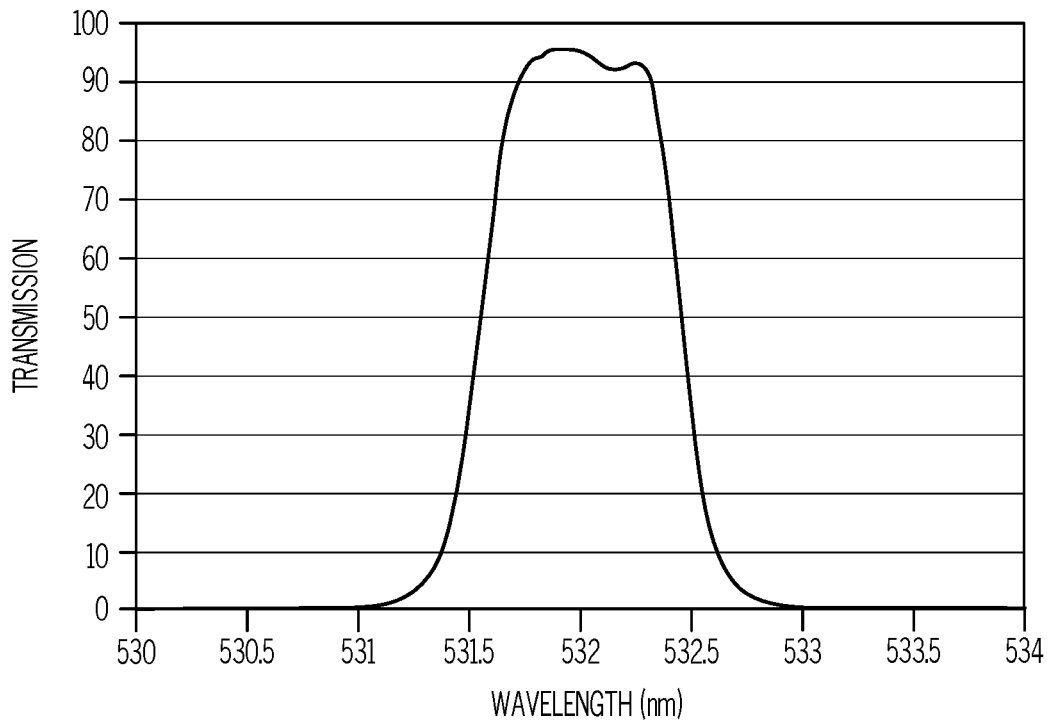
FIGS. 4A-4D are graphs illustrating characteristics of tunable optical filters that may be used in in a LIDAR application in accordance with some embodiments described herein.
Figure 4B:
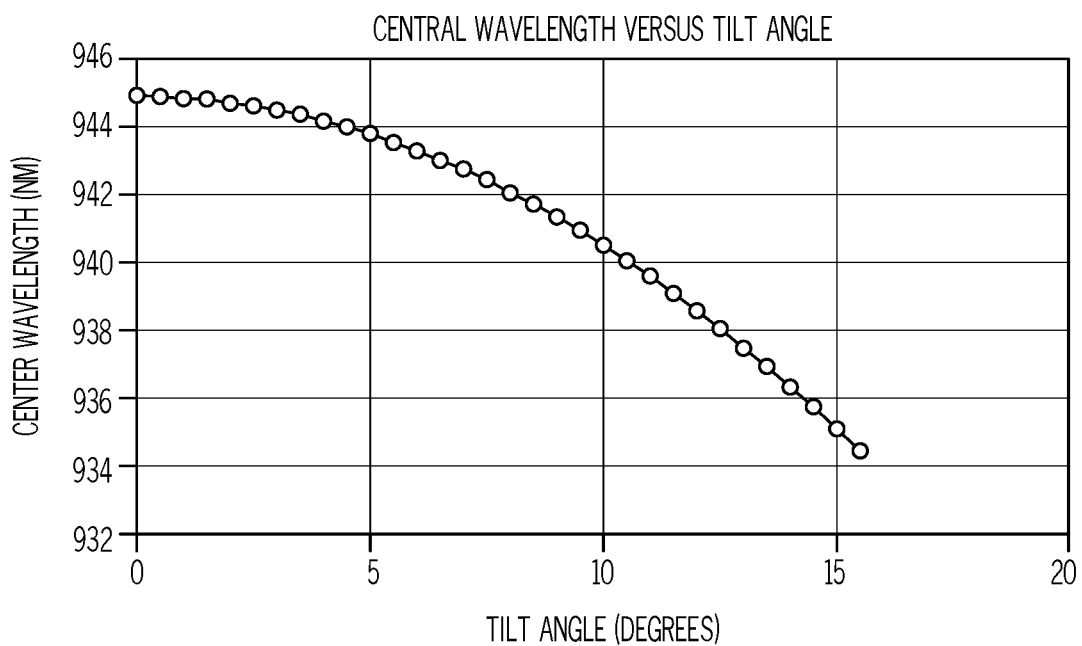
Figure 4C:
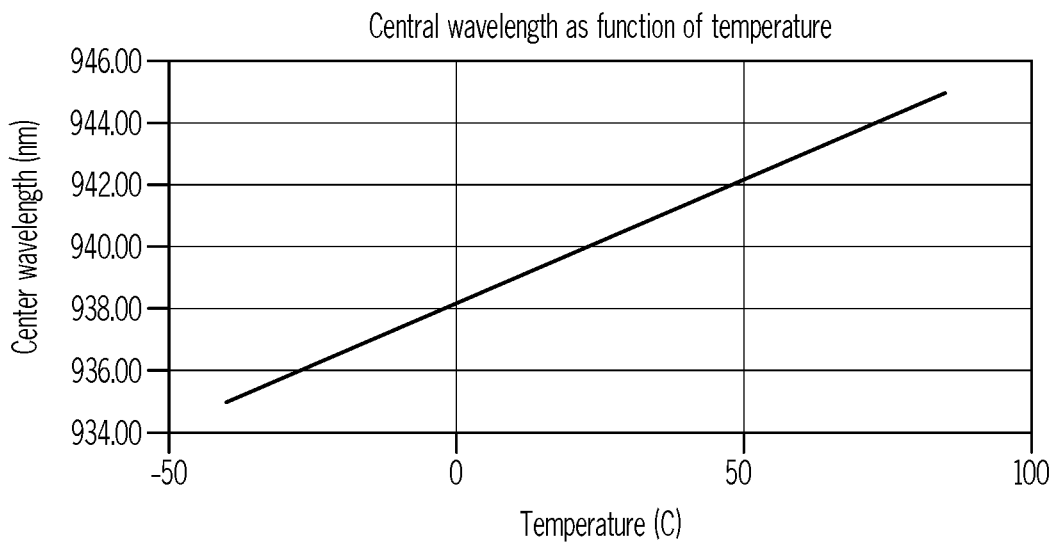
Figure 4D:
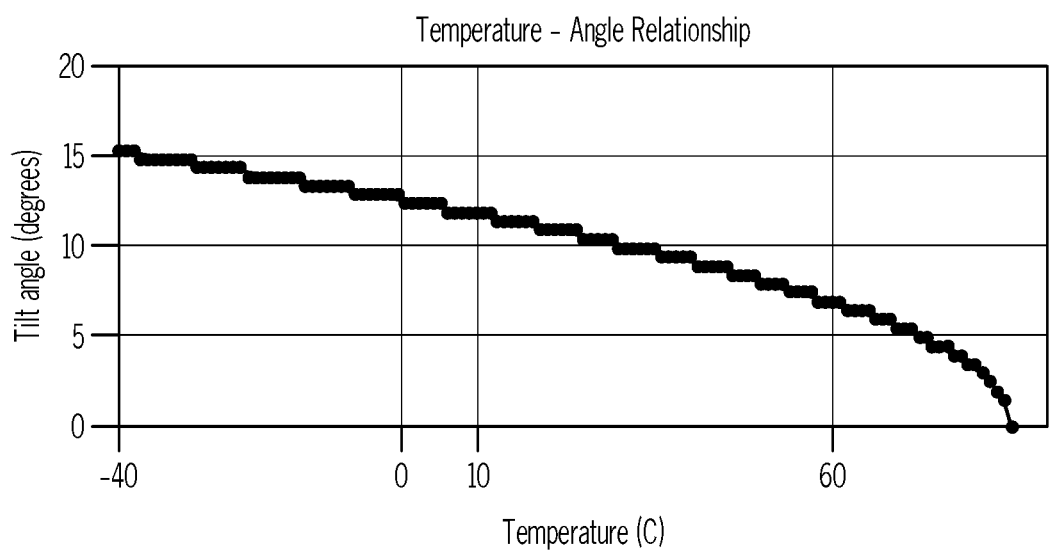

Spectral filters may be used for rejecting sunlight but allowing LIDAR reflection light to reach the detectors. The transmission bands of such filters are typically 1-20 nm wide. A transmission band of an example narrow band LIDAR filter is shown in FIG. 4A. The transmission band center wavelength is a function of the incident light ray angle with respect to its optical axis:

$$\lambda(\theta) = \lambda_o \sqrt{1 - (\sin\theta/n_{\text{eff}})^2}$$

and is shown by way of example in FIG. 4B for $n_{\text{eff}}$=1.8. The central emission wavelength of VCSELs may vary approximately linearly with temperature at a rate of approximately 0.08° C./nm. An example of an emission spectrum of an emitter array (e.g., the VCSEL array 215) as a function of temperature is shown in FIG. 4C. In some embodiments, the temperature of the emitter array is monitored (e.g., by temperature monitor 213), and a microcontroller generates a tilt signal in response to the temperature of the emitter array to control actuator elements 4 (e.g., piezoelectric elements) attached to the narrowband filter 312 such that the transmission wavelength of the filter 312 tracks the narrow emission band of the emitter array, for example, based on the temperature-angle relationship shown in FIG. 4D.

In the embodiment of FIG. 3, the tunable filter 312 is placed in the Fourier plane of the optical system 10. In some embodiments, the tunable filter 312 is placed in the focal plane, such that the numerical aperture of the system 10 is sufficiently low to provide a relatively narrow pass band (e.g., 0.1, 0.5, 0.8, 1, 1.5, 3, 5, 7, 10, or 20 nm FWHM), while maintaining consistency between the numerical aperture and the diameter of the aperture. In some embodiments, the imaging system 10 may be configured to maintain a temperature of the environment of the tunable filter 312 within a predetermined temperature range.

Figure 5A:
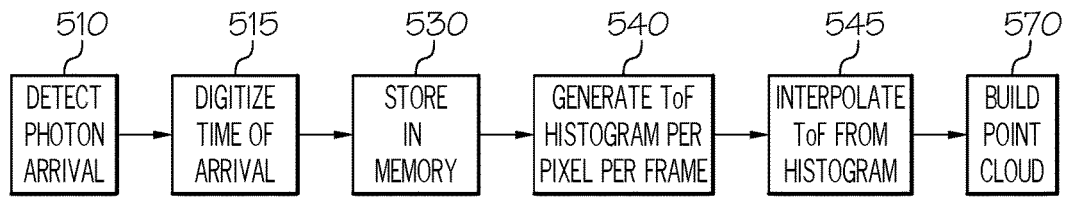
FIGS. 5A-5C are diagrams illustrating SPAD-based 3D imaging systems and associated operations that may be performed in accordance with some embodiments described herein.
Figure 5B:
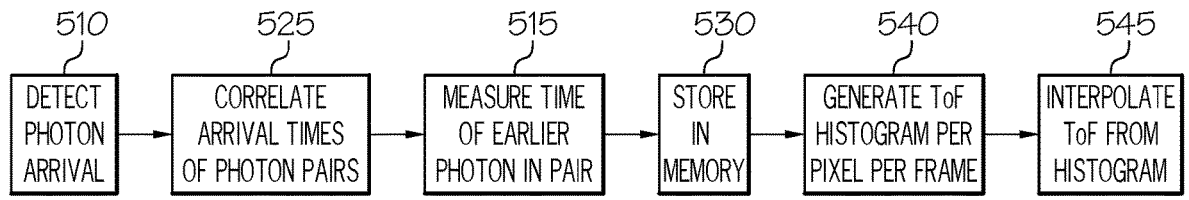
Figure 5C:
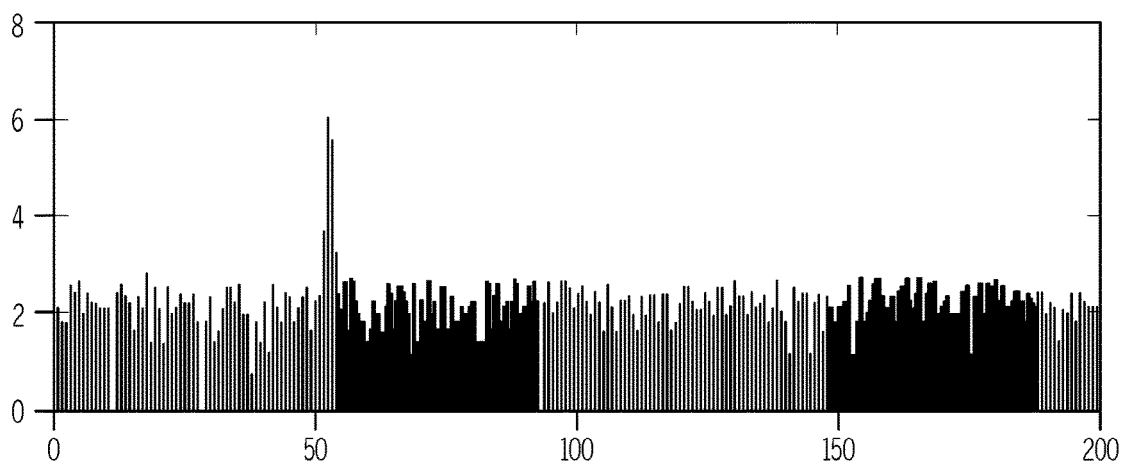

FIGS. 5A, 5B, and 5C illustrate some SPAD-based 3D imaging systems to aid understanding of embodiments described herein. In particular, data flow of some 3D direct TOF SPAD arrays is shown in FIG. 5A. For example, for emitter array light output at about 940 nm, direct beam solar irradiance may be about 0.33 W/m²/nm. Photon energy may be approximately 2.1e-19 J, so 0.33/2.1e-19=1.6e18 photons may impinge per m² per second in a 1 nm pass band, and 3.2e19 photons may impinge in a 20 nm pass band. For a 10 μm diameter SPAD, this translates to 3.2e9 photons per second. Light takes 400/3e8=1.3 μs to traverse 2×200 m.

During this time, 13.2e9×1.3e-6=416 photons on average will impinge on the SPAD every laser cycle. In some architectures, the SPAD array is recharged once per cycle so upon an avalanche, a SPAD becomes unresponsive to additional photons, and thus, the imaging system cannot function.

If filtering is implemented to reduce average photon detection to 1 per laser cycle, detection of each avalanche (at block 510) may require a time digitization (at block 515) by a time to digital converter (TDC) circuit. There may be 1/1.3e-6=800,000 such conversions per pixel per second, and 800,000×360,000=288 billion time to digital conversions for the whole array per second. The TDC power consumption may be about 22.5 nW, so the detector array may require 6.5 kW, which may be unattainable in a small form factor autonomous vehicle LIDAR. Furthermore, to digitize with 1 nsec resolution (15 cm) and 1.3 µsec range may require 11 bits of resolution. An array of compact TDC's with this resolution may occupy 4 full-photolithography reticle dies in a 28 nm process technology, even before considering how to route all the signals at-speed and with sub-ns jitter, which may be impractical in staring 3D long-range LIDAR systems.

Embodiments of the present disclosure can reduce the number of required time to digital conversions based upon recognition that photons originating from the solar background arrive uncorrelated, whereas photons from a target illuminated by a pulsed light source (e.g., a pulsed laser) have a higher likelihood of being detected in groups of 2 or more in a narrow time correlation window (for example a time window corresponding to the pulse width), also referred to herein as a predetermined correlation time. Such embodiments, some of which may be implemented in a quasi-linear SPAD array (versus an area, staring detector), are illustrated in FIG. 5B. In particular, as shown in FIG. 5B, after detection of photon arrival (at block 510), a time correlator circuit outputs signals indicating detection of correlated photon pairs having respective times of arrival that fall within the predetermined correlation time relative to one another (at block 525). This can reduce the number of time to digital conversions, but a TOA histogram would still be generated for each pixel during each acquisition frame, which involves digitization of up to several hundred TOAs per pixels per frame (block 515), storage of the digitized data in a memory (block 530), and generation of a histogram (at block 540). In some instances, 10.8 million histograms per second may be needed, which may be beyond the computational power of cost-effective mobile platforms.

FIG. 5C illustrates an example time-of-arrival histogram (as generated at block 540), with 100 k lux background and a target 55 m from the emitter. If a 3 ns TOA correlation window is implemented, at direct sunlight (100 k lux) there would still be approximately 12,000 correlated arrival events per 30 ms frame time per pixel. Yet the information per pixel per frame can be encoded in a single 12 bit output ($\log_2(200$ m/5 cm)), meaning that the information may be extremely sparse in the pixel.

Some in-pixel data reduction or minimization by averaging of times-of-arrival for measurement of molecular fluorescence lifetime has been demonstrated. However, such methods may be inadequate for LIDAR applications because in fluorescence lifetime imaging microscopy (FLIM) applications, there is a priori information on the expected TOA of fluorescent photons. For example, a laser cycle time of 1 µsec may be utilized with fluorophores with lifetime on the order of 0.5 ns-3.5 ns, which makes it possible to define a very short time window and reject a majority of uncorrelated (also referred to herein as non-correlated) avalanche events. In LIDAR, on the other hand, the echo may arrive any time within the laser cycle time. Furthermore, in some instances, uncorrelated or non-correlated photon emissions can be reduced or minimized by keeping the system optically isolated, so light only originates from the pulsed laser, which may not be emitting for a large duration of the cycle time (e.g., pulse width of 0.5 ns in a cycle time of 1 µsec). Furthermore, excitation can be kept to short evanescent regions, approximately 50 nm above the waveguide on the top surface of the imaging chip. In contrast, in LIDAR applications, ambient light impinges the sensor throughout the whole laser cycle, rendering such spatial isolation of the specific emission difficult. Also, in fluorescence-lifetime imaging systems, the systems may be designed such that the probability of an avalanche per laser cycle is very low, typically below 1%, in order to prevent a statistical error referred to as pile-up. In LIDAR applications, many photons are expected to arrive per laser pulse in certain ambient and target range and reflectivity scenarios. Thus, some problems addressed by embodiments of the present disclosure may have been heretofore unaddressed.

Figure 6:
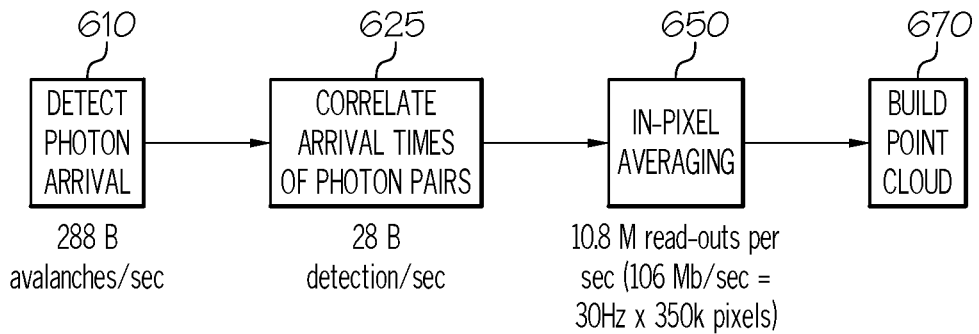
FIG. 6 is a block diagram illustrating operations for in-pixel data reduction in accordance with some embodiments described herein.

FIG. 6 is a block diagram illustrating some in-pixel data reduction or minimization operations in accordance with embodiments of the present disclosure. As shown in FIG. 6, upon detection of incident photons (at block 610), two or more photons having respective times of arrival that fall within a predetermined correlation time relative to one another are correlated (at block 625), for example by a time correlator circuit as described herein. Signals indicative of detection of the correlated photons are output for in-pixel averaging (at block 650), which may be implemented by counter and time integrator circuits as described herein. A point cloud may be generated based on the output of the in-pixel averaging (at block 670), independent of storing data indicative of the times of arrival in a memory (e.g., without storing a TOA histogram as shown in FIG. 5C).

In some embodiments of the disclosure, spectral filtering (e.g. using one or more optical filters, such as the tunable filters 212, 312) can reduce the ambient light photon counts at the detector (e.g., 110, 210, 310) as to allow in-pixel averaging. In some embodiments, this ambient light rejection is implemented by selecting one or a population of light emitters (e.g., VCSELs, generally referred to herein as emitters) or arrays thereof (e.g., 115, 215) whose emission spectra are relatively narrow. In some embodiments, the light emitter or emitter array is attached to a thermally conductive substrate. In some embodiments, the thermally conductive substrate may be used to ensure that the light emitters are essentially isothermal, and are thermally insulated from the surrounding environment. In some embodiments, passive cooling may be used to ensure that the light emitters remain at thermal equilibrium and/or within a temperature range. In some embodiments, the light emitter and/or the thermally-conductive substrate are actively cooled or heated to maintain them within a desired temperature range. In some embodiments, a temperature sensor (e.g., 213) measures the temperature of the emitters, the emitter substrate, and/or the ambient temperature and provides electrical output signals indicative of the temperature(s). In some embodiments, the electrical output signals are converted via a lookup table or a mathematical algorithm to a drive signal to a tunable filter element (e.g., 212, 312). In some embodiments, the emission wavelength drift of an emitter (e.g., 115, 215) is tracked or measured using a spectral measuring device such as, without loss of generality, a spectrometer. The output of the spectral measuring device can be converted to a drive signal to the tunable filter element (e.g., 212, 312). The drive signal may be used to adjust the transmission band of the tunable filter element based on the changes in emission wavelength of the emitter(s), as indicated by the changes in temperature and/or spectral output thereof. In some embodiments an optical filter is placed in front of the emitter or emitter array (e.g., 115, 215) such that the optical filter selects and outputs a narrower transmission band than the light output from the emitter(s).

It will be understood that, in some embodiments and without loss of generality, closed-loop control schemes described herein with reference to the detector portions of a system can be similarly used instead of or in conjunction with the emitter portions of the system. In some embodiments, the temperature control of the emitter may provide a more stable emission band, which is transmitted through a fixed spectral narrowband filter. In some embodiments the transmission band of a tunable filter is tuned so as to follow the emission band of the emitter. In some embodiments, a combination of passive and/or active temperature controls and active tuning of the transmission band of the tunable filter can reject of ambient light while transmitting the reflected light from the emitter. In some embodiments, the transmission band of the tunable filter is controlled to follow the same temperature dependence as the emitters. In some embodiments, the transmission band of the tunable filter changes with temperature, and an active control signal may fine tune the transmission band to match the emission band of the emitters.

In some embodiments, a direct TOF imaging system (or "imager") includes a plurality of pixels. Each of the pixels contains one or two or three or four or more SPADs (or other photodetectors) with a response time configured to accurately measure the arrival time of photons. In a pixel including multiple SPADs, the SPADs may be arranged, for example, in a concentric (e.g., with a central diode surrounded by one or more ring-shaped diodes) or stacked (e.g., with one or more diodes arranged under a first diode) arrangement, and where these diodes may either share one or more electrical connections or each have their own electrical connection. The SPADs are biased such that they are inactive (in a non-operating or non-detecting state, also referred to herein as deactivated) at least during the firing of the emitter(s) of the LIDAR system.

Some embodiments provide fast and simultaneous recharging of the SPAD array, such that the SPADs remains biased below breakdown when inactive, and active (in an operating or detecting state, also referred to herein as activated) and fully charged almost instantaneously, for example, within 0.1 ns, 0.5 ns, 1 ns, 2 ns or 5 ns, subsequent to being inactive. In some embodiments, the recharging of the array is not simultaneous but rather is carried out (e.g., sequentially) for groups of pixels of the detector array, such as rows, columns or sub-arrays, for example, such that each such group can detect reflected optical signals from a different set of distances, thus reducing current spikes in the detector.

In some embodiments, an array of capacitors is provided on the imager (for example, on a same substrate as the SPAD array) so as to allow charge distribution and fast recharging of the SPAD array. In some embodiments, the array of capacitors is implemented above the substrate of the device. In some embodiments, the array of capacitors is implemented as an array of Metal-Insulator-Metal (MIM) or Metal-Oxide-Metal (MOM) capacitors which are distributed over areas which are not active detection regions (e.g., areas allocated for processing circuitry adjacent the SPADs). In some embodiments, large capacitor banks are implemented above a region of the detector outside the SPAD array, while an array of smaller capacitors is interspersed between the pixels of the array and/or above interconnect regions. In some embodiments a second die is bonded to the detector die on a side that is not exposed to light, with the second die including an array of capacitors for efficient and fast charge distribution.

In some embodiments, a SPAD is connected to the gate of a first transistor such that the avalanche output of the SPAD (responsive to detection of an incident photon) switches the state of the first transistor. The first transistor is connected to a capacitor. A second transistor is connected in series with the first transistor. The gate of the second transistor is connected to a global timing circuit. In some embodiments, upon changing its state (responsive to the SPAD being discharged), the first transistor is configured to conduct current onto the capacitor. The global timing circuit changes the state of the second transistor upon activation of the SPAD array, so that the second transistor is configured to conduct current. In some embodiments, the second transistor is turned off by the global timing circuit synchronously with the pulsed emitter. In some embodiments, current or voltage integration starts with or is initiated responsive to a global timing signal shortly after the emitter pulse and ends upon the earlier of a trigger by an avalanche output of a SPAD or a global end to the active time window. In some embodiments, current or voltage integration begins with or responsive to an avalanche output from a SPAD, and ends just before the firing of a subsequent emitter pulse. In some embodiments the global timing signals may not be timed with the start of the emitter cycles or the end of the emitter cycles, but may be timed between the start and the end of the cycle (also referred to herein as strobing signals). In some embodiments, the timing of the global start and end signals are not identical during all cycles, for example, allowing variable strobing of the range.

In some embodiments, detection of an incident photon and the resulting avalanche output from the SPAD also increments a per-pixel counter. In some embodiments, the counter is a digital counter. In some embodiments the counter is an analog counter which receives a quantum of charge for each count, with the stored voltage as a measure of the total number of counts.

As described above, a SPAD is based on a p-n junction that is biased beyond its breakdown region, for example, by or in response to a strobe signal having a desired pulse width. The high reverse bias voltage generates a sufficient magnitude of electric field such that a single charge carrier introduced into the depletion layer of the device can cause a self-sustaining avalanche via impact ionization. The avalanche is quenched by a quench circuit, either actively or passively, to allow the SPAD to be "reset" to detect further photons.

In some embodiments, a processing circuit is configured to operate responsive to photons incident on a detector array by implementing counter and/or integrator circuits in accordance with embodiments described herein. The counter and integrator circuits are operable to count and integrate the individual times of arrivals of the detected photons, respectively, in response to the output(s) of one or more detector circuits that detect incident photons. The processing circuit may include analog and/or digital implementations of counting circuits and/or integrator circuits.

In some embodiments, the processing circuit includes a correlator circuit (also described herein as a pulse time correlator) that provides output signals in response to incident photons that arrive within a predefined correlation window, also referred to herein as a correlation time. That is, in-pixel correlation as described herein may involve calculation of the times-of-arrival (TOAs) of signal photons received in a same correlation window defined by the correlator circuit. As such, if a burst of multiple photons arrive substantially concurrently at a SPAD of the array, it has the same effect as a single photon, namely, to discharge that SPAD. Once the SPAD has been discharged by the leading photon, it is blind to all the other photons in the burst, while the remaining SPADs in the array may operate likewise responsive to the multiple photons in the burst. The processing circuit may be configured to calculate an estimated time of arrival of the burst of photons based on a ratio of the integrated times of arrival (e.g., as provided by time integration circuits herein) and the count of the detection (e.g., as provided by counter circuits herein) of each of the photons by respective SPADs in the array.

Figure 9:
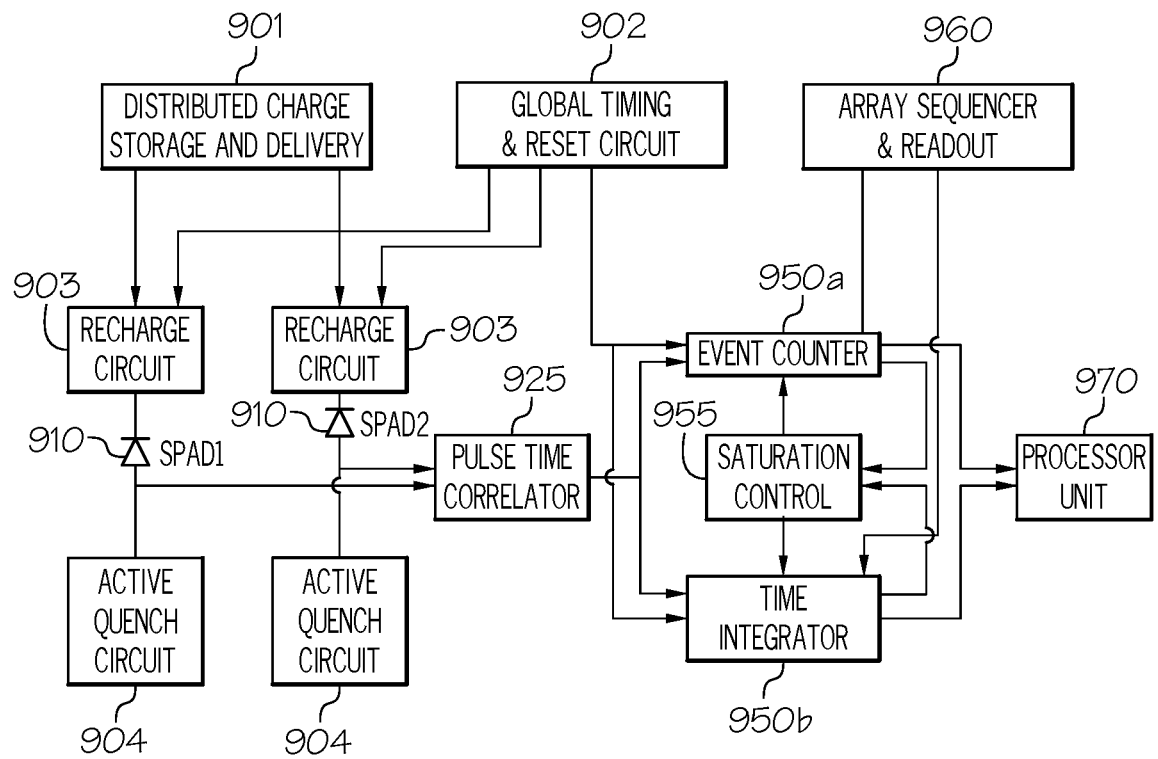
FIG. 9 is a block diagram illustrating an example LIDAR measurement device in accordance with some embodiments described herein.

Operation of some embodiments of LIDAR measurement device 900 is shown in FIG. 9. In this example, a distributed charge network 901 delivers charge to the vicinity of a pixel of a SPAD array, illustrated as including two SPADs 910. A global timing generation and reset circuit 902 controls the timing of the recharging of the SPADs 910 via respective recharge circuits 903 coupled to each SPAD 910. In some implementations, the recharging scheme is passive and, upon an avalanche output, the SPAD 910 is immediately and quickly recharged by the respective recharge circuit 903. In some embodiments, the recharging scheme is active, and the recharge time of the recharge circuit 903 is electrically controlled in response to respective strobing signals output from the global timing generation and reset circuit 902 (also referred to as active recharge circuitry). An active quench circuit 904, senses the onset of an avalanche and delivers a feedback signal to quickly quench the avalanche.

In some embodiments, the active recharge circuitry 902, 903 biases the SPADs 910 beyond breakdown for respective times correlated with the firing of an optical signal output from a pulsed light source, such as a laser pulse output from a VCSEL of the LIDAR system. In some embodiments the active recharge circuitry 902, 903 biases the SPADs 910 to be activated for a portion of time ("time gate"), such as a portion of the time required for a pulse of light to traverse a round trip to the farthest target and back, and this time gate can be varied so as to strobe the range of the LIDAR system. In some embodiments, the active recharge circuitry 902, 903 maintains a SPAD 910 at its recharge state for duration sufficient to release a relatively large percentage of trapped charges (for example, 1 ns, 2 ns, 3 ns, 5 ns, 7 ns, 10 ns, 50 ns, or 100 ns), and then quickly recharges the SPAD 910.

That is, some embodiments described herein can utilize range strobing (i.e., biasing the SPADs to be activated and deactivated for durations or windows of time over the laser cycle, at variable delays with respect to the firing of the laser, thus capturing reflected correlated signal photons corresponding to specific distance sub-ranges at each window/frame) to limit the number of ambient photons acquired in each laser cycle. A laser cycle refers to the time between laser pulses. In some embodiments, the laser cycle time is set as or otherwise based on the time required for an emitted pulse of light to travel round trip to the farthest allowed target and back, that is, based on a desired distance range. To cover targets within a desired distance range of about 200 meters, a laser in some embodiments may operate at a frequency of at most 750 kHz (i.e., emitting a laser pulse about every 1.3 microseconds or more).

Figure 7:
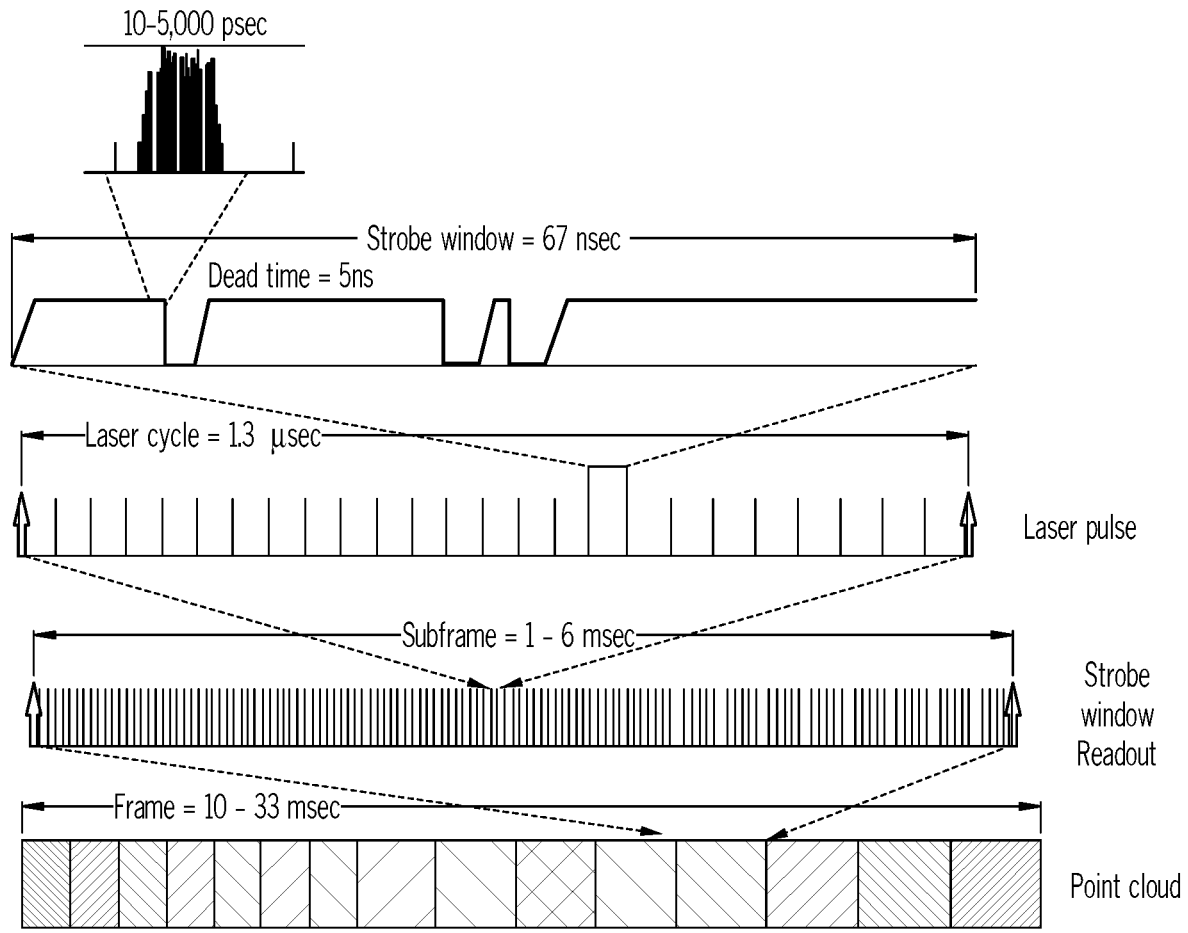
FIG. 7 is a diagram illustrating relationships between image frames, subframes, laser cycles, and strobe windows in accordance with some embodiments described herein.

FIG. 7 is a diagram illustrating relationships between image frames, subframes, laser cycles, and time gates (also referred to herein as strobe windows) in accordance with embodiments described herein. As shown in FIG. 7, an example laser cycle may be broken into multiple strobe windows having respective durations over the time between emitted laser pulses. For example, at an operating frequency of 750 kHz, a laser cycle may be about 1.3 μs. The laser cycle may be broken into respective strobe windows such as, for example, 20 strobe windows. The strobe windows can be mutually exclusive or overlapping in time over the laser cycle, and can be ordered monotonically or not monotonically. In the example of FIG. 7, the strobe windows may have equal, non-overlapping durations of 67 ns each, within the 1.3 μs of the laser cycle time between laser pulses. An image subframe includes multiple laser pulses, with multiple strobe windows between the laser pulses. For example there may be about 1000 laser cycles in each sub frame. Each subframe may also represent data collected for a respective strobe window. A strobe window readout operation may be performed at the end of each subframe, with multiple subframes (corresponding to a respective strobe window) making up each image frame (for example, 20 sub frames in each frame). The timings shown in FIG. 7 are by way of example only, and other timings may be possible in accordance with embodiments described herein.

Figure 8A:
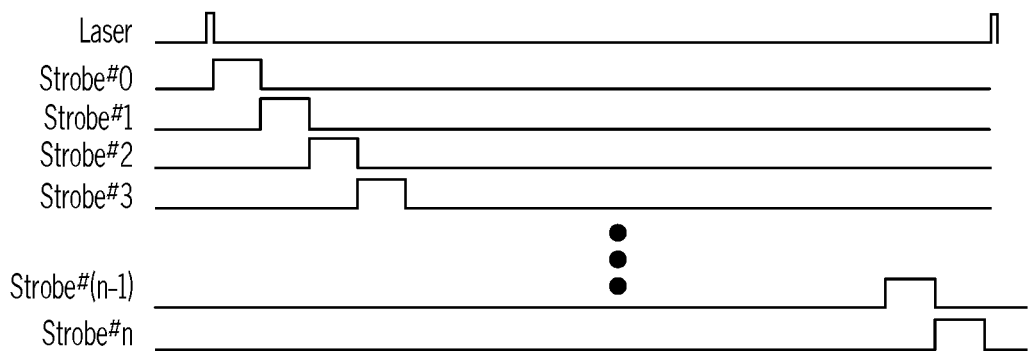
FIGS. 8A and 8B are diagrams illustrating examples of range strobing in accordance with some embodiments described herein.
Figure 8B:
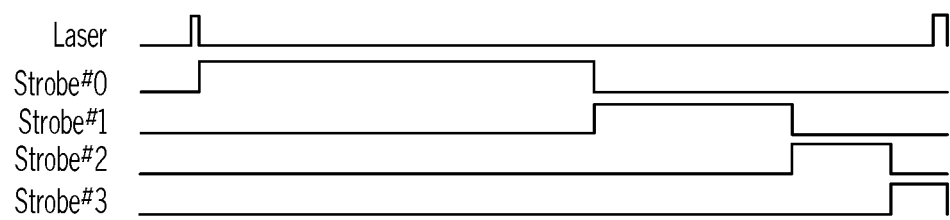

FIGS. 8A and 8B illustrate examples of range strobing in accordance with embodiments described herein. In particular, FIG. 8A illustrates n strobe windows between laser pulses, with each strobe window 0-n defining a duration of activation for a SPAD at respective delays that differ with respect to the laser pulses, responsive to respective strobing signals Strobe #0-Strobe #n. In some embodiments, the strobe windows 0-n are identical in duration, as shown in FIG. 8A. In some embodiments, the strobe windows may be scaled, for example such that "closer" strobe windows (having shorter delays relative to a laser pulse firing) are wider/of greater duration and "farther" strobe windows (having longer delays relative to the laser pulse firing) are narrower/of shorter duration, or vice versa, providing non-linear strobe windows, as shown in FIG. 8B.

A time between the pulses of the optical signals (and/or the corresponding strobe windows) may correspond to a distance range, and the respective strobe windows may thus correspond to sub-ranges of the distance range. For example, to image a distance range of 200 meters (m), the respective strobe windows may be defined to cover distance sub-ranges of 1 m-50 m, 50 m-90 m, 90 m-125 m, 125 m-155 m, 155 m-175 m, 175 m-190 m, and 190 m-200 m. Such a scheme provides that the strobe windows for acquiring photons reflected from farther targets (which may be weaker or less reflective) is shorter, thus allowing fewer ambient photons to arrive over the shorter acquisition window, and thereby achieving a higher signal to background ratio when calculating an average time of arrival as compared with a uniform strobe window duration.

In some embodiments, the number of laser cycles allocated per time gate (e.g., per strobe window readout for each subframe, as shown in FIG. 7, where each subframe indicates data for a respective strobe window) may be adjusted or varied. In some embodiments, the number of laser cycles in each frame or subframe covering a specific distance range may be constant, regardless or independent of the strobe gate width or distance range. That is, by way of example, for detection at 10 frames per second using a 750 kHz laser, each frame may correspond to 75,000 laser cycles (e.g., 75,000 laser pulses for each of 10 time gates (e.g., strobe window readouts) covering distance sub-ranges of 1 m-50 m, 50 m-80 m, 80 m-110 m, 110 m-125 m, 125 m-140 m, 140 m-155 m, 155 m-170 m, 170 m-180 m, 180 m-190 m, and 190 m-200 m). In some embodiments, the number of laser cycles corresponding to each frame or subframe is different for different-range time gates. For example, subframes for farther time gates (with a longer delay from the laser pulse firing, e.g., covering farther distances of 190-200 meters) may be allocated or otherwise correspond to a greater portion (or a lesser portion) of the number of laser cycles than subframes for closer time gates (with a shorter delay from the laser pulse firing, e.g., covering closer distances of 0-50 meters), rather than allocating the number of laser cycles equally per time gate or subframe. That is, in some embodiments, the number of laser cycles for a distant time gate is larger than the number of laser cycles for a closer time gate, or vice versa.

In some embodiments, the relative number of laser cycles in a frame or subframe for a given time gate scales as the square of the distance. In some embodiments, background/uncorrelated photon counts are selectively recorded/captured without signal photons (e.g., by suspending firing of the laser or by measuring the number of photon counts at a strobe gate corresponding to a distance range where no target reflects and scaling according to the gate width), and the background-plus-signal photon count is recorded and stored in memory, which can be used to calculate the signal photon counts (assuming the photon count rate is low enough to make these parameters independent, or, if they are not independent, correcting for this dependence, e.g., "Pile-Up Correction" schemes). The relative number of laser cycles per subframe corresponding to a strobe gate can be adjusted based on the signal photon count or the background photon count, or both. For example, the strobing of the detector array may be adjusted based on the detected reflectivity of the target (e.g., based on a feedback indicated by previous detection signals), such more laser cycles may be allocated to detection of lower-reflectivity targets (e.g., 100,000 of the 750,000 laser cycles may be directed to targets at distances of 190-200 meters), and fewer laser cycles may be allocated to detection of higher-reflectivity targets (e.g., 50,000 of the 750,000 laser cycles may be directed to targets at distances of 0-50 meters), or vice versa. More generally, the number of laser cycles allocated per time gate/corresponding subframe may be varied so to provide more laser cycles for dimmer (lower-reflectivity) targets, or more laser cycles for brighter (higher-reflectivity) targets.

In some embodiments, different parts (e.g. SPADs in different regions) of the detector array may strobe different distance ranges simultaneously. In some embodiments, alternate rows of the imager may be charged during different time intervals, which can allow for reduced laser power while achieving identical SNR, at the cost of lower spatial resolution. For instance, in one example, 120 rows scan at 10 strobe windows, with all rows scanning the same strobe window at a given sub-frame. For a global frame rate of 30 frames per second, the readout may be at 300 frames per second, so enough energy must be delivered to the target each 1/300=3 msec (millisecond) sub-frame. In a further example, alternate rows image alternating strobe windows so that the effective row number is 120/2=60. For a global frame rate of 30 frames per second, the same energy should be delivered to the target during a period of 2/300=6 msec, so the average and peak power can be halved versus the previous example described above.

In some embodiments, the LIDAR measurement device 900 is shown in FIG. 9 may further include a processor that is configured to receive signals from the detector array 910 in response to detection of signal photons or other avalanches such as thermally-generated avalanches, determine a brightness of a respective target based on the received signals, and dynamically adjust the number of laser cycles, correlation window for the detectors, strobe window of the detectors, and/or background subtraction/correction as described herein based on the determined brightness of the target.

The LIDAR measurement device 900 FIG. 9 further includes a pulse time correlator 925 (also referred to herein as a correlator circuit), a time processing circuit 950 including an event counter 950a (also referred to herein as a counter circuit) and a time integrator 950b (also referred to herein as a time integrator circuit), a saturation control circuit 955, an array sequencer and readout circuit 960, and a processor unit 970 (which may be provided on-chip or off-chip). In some embodiments, the array sequencer and readout circuit 960 may operate in coordination with the emitter array (and/or related control circuit) of the LIDAR system. The correlator circuit 925, counter circuit 950a, and time integrator circuit 950b are described in greater detail below.

Figure 10:
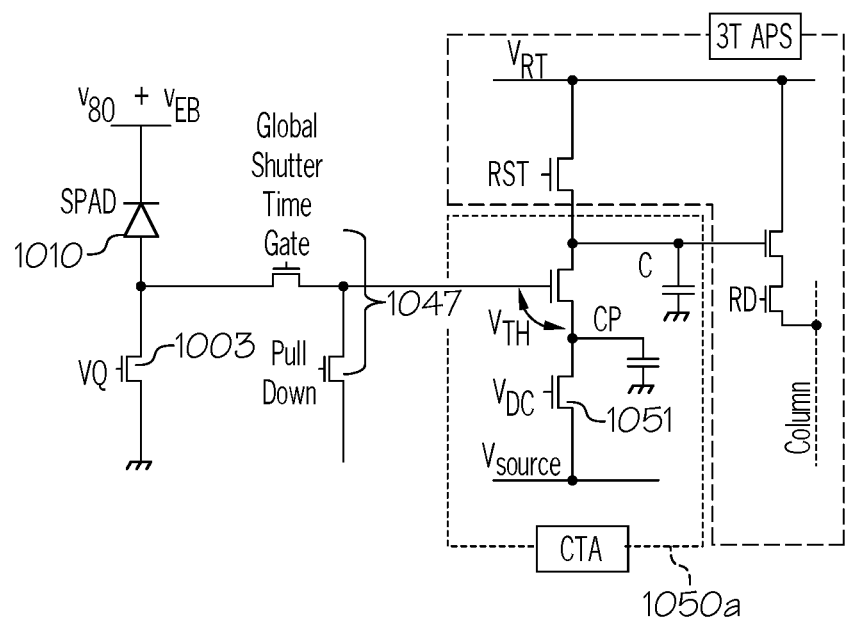
FIG. 10 is a block diagram illustrating an example counting circuit in accordance with some embodiments described herein.

Some embodiments of the present disclosure provide various architectures whereby the counter circuit 950a is implemented as an analog event counter and/or the time integrator circuit 950b is implemented as an analog time integrator, in combination with correlator circuits 925 and/or saturation control circuits 955 as described herein. For example, as shown in FIG. 10, a SPAD 1010 is connected to a passive quench and recharge transistor 1003 with static DC bias voltage "VO" controlling the recharge or "dead" time of the SPAD 1010. This is connected to an analog counting Charge Transfer Amplifier (CTA) circuit 1050a via a two transistor global shutter time gate 1047. The CTA circuit 1050a is reset by pulling the main capacitor "C" to the high reset voltage VRT. The CTA circuit 1050a operates responsive to the input gate voltage (in this case the anode voltage of the SPAD 1010) increasing above the threshold voltage of the input source follower. Charge flows from the main capacitor "C" to the parasitic capacitor "CP" and the voltage rises on the parasitic node. The rising voltage pushes the source follower into the cut-off region and the charge flow halts, causing a discrete charge packet to be transferred from the main capacitor for each input pulse. The SPAD 1010 begins recharging and the lower transistor 1051 in the CTA circuit 1050a discharges the parasitic capacitance which is achieved with a static bias voltage "VDC" applied keeping this transistor, below threshold, in weak inversion.

Figure 11A:
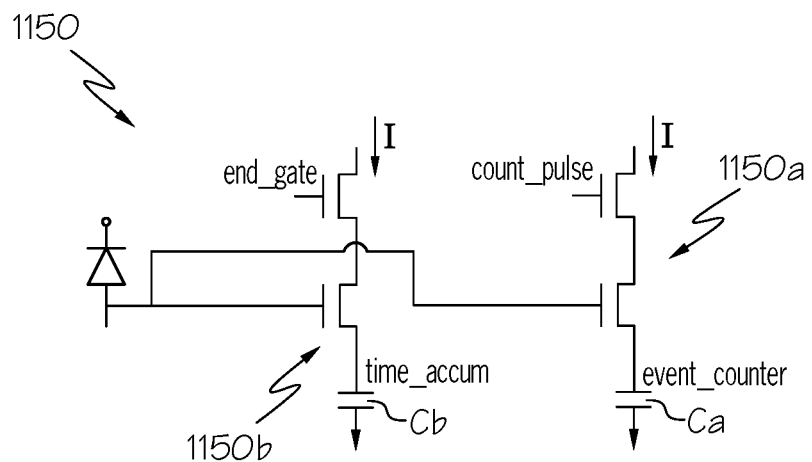
FIGS. 11A and 11B are block diagrams illustrating examples of time processing circuits in accordance with some embodiments described herein.
Figure 11B:
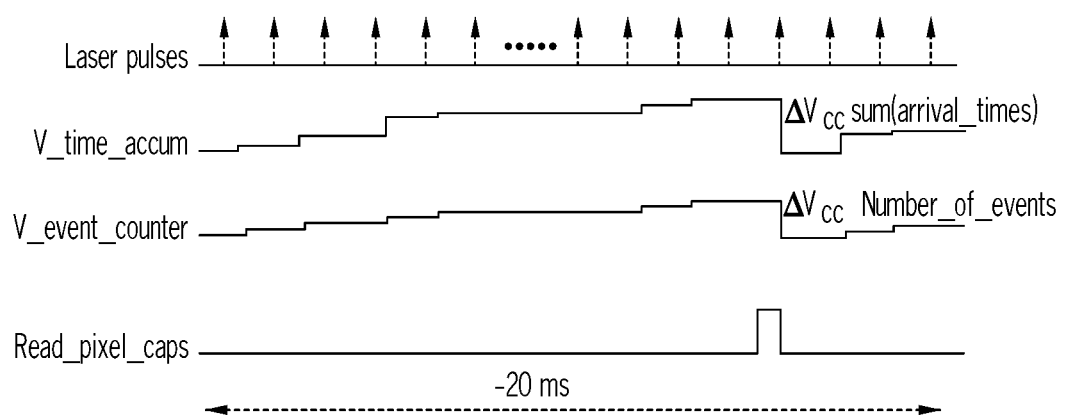

FIGS. 11A and 11B are provided by way of example to illustrate operation of time processing circuits 1150 including analog counter circuits 1150a and analog time integrator circuits 1150b in accordance with embodiments described herein. Timing of an associated emitter array (Laser pulses) is also illustrated. The counter circuit 1150a operates by injecting a fixed amount of charge onto a capacitor Ca. Thus, the voltage on the capacitor Ca (V_event_counter) is the number of recorded avalanches times the charge quantum divided by the capacitance of Ca. The analog time integrator circuit 1150b operates by starting to inject current to a different capacitor Cb at the onset of an avalanche, and stopping at a globally-controlled time (e.g., based on a reference timing signal). Thus, the voltage on the capacitor Cb (V_time_accum) equals the current flowing (I) times the total integrated time divided by the capacitance of Cb. The pixels are read out (Read_pixel_caps) at the end of a subframe, providing a count value (Number_of_events) and a sum of the arrival times (sum(arrival_times) for the subframe, from which an average time of arrival of detected photons can be estimated.

In some embodiments of the present disclosure, each pixel includes 2 SPADs with their guard-rings and optical and electrical isolation. The leading edges of the SPAD's output in response to an avalanche are time-correlated in a compact, in-pixel pulse-time correlator (PTC). If the leading edges arrive within a pre-set or tunable "correlation time", then the latter of the leading edges will be transmitted, with relatively low jitter, to the time processing circuitry, comprising the event counter and the time integrator. If there are no correlated avalanches, no signal will reach the time processing circuitry. In some embodiments, only one (e.g., the earlier one) of the edges will be processed. In some embodiments, both edges will be processed and two corresponding sets of event counters and time integrators are implemented in the pixel. In some embodiments, the PTC only outputs a digital signal of one polarity if two detected avalanches are sufficiently close in time (e.g., within the predetermined correlation time) and otherwise outputs the other polarity, and this correlation signal serves as a control for a switch which allows timing and event measurements for correlated events, and otherwise does not allow such a measurement to occur.

In some embodiments, digital circuits may replace the time integrating capacitor Cb and/or the event counter capacitor Ca. In some embodiments, the output of the correlator (e.g., 925) is fed to a time-to-digital converter (TDC) with a dynamic range corresponding to the ratio of the time duration of the strobe gate (e.g., 66 nsec for a 10 meter window) and the required or desired temporal resolution per measurements (e.g., 2 nsec)—in this example only 5 bits are required—which may be significantly fewer than in other LIDAR pixels which typically require 12-14 bits and thus occupy more space in the pixel. The output of the TDC can be stored in memory in the pixel. A digital accumulator (e.g. 950b) adds the arrival times. Similarly, a digital counter (e.g., 950a) increments after each correlation event output from the correlator (e.g., 925). The values of the digital time accumulator and the digital event counter are likewise read out at the end of a subframe, from which an average time of arrival of detected photons can be estimated.

In some embodiments, the events are recorded in memory in telegraph code with a number of bits equal to the ratio between the strobe gate duration and the required or desired temporal resolution. For example, if the strobe gate is 66 nsec and the required or desired measurement resolution is 2 nsec, 33 memory bins are used, each with a number of memory cells. The number of memory cells may be determined by the total expected count per time bin. For each arrival, the memory value at the appropriate bin is incremented, thus generating a real-time histogram. In some embodiments, the inputs to this memory array are not direct SPAD outputs but rather correlated events, thus resulting in a much "cleaner" and smaller histogram, with significantly fewer uncorrelated events. It will be understood that the area occupied by the memory cells can be a limiting factor in implementation, and therefore the significant reduction of events to be processed (by using the correlator and/or the strobing gates in accordance with embodiments described herein) may be desirable.

Figure 12A:
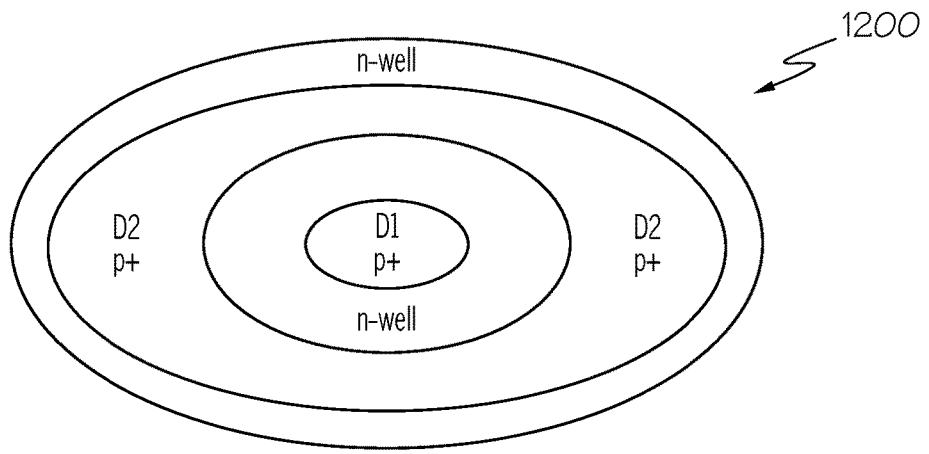
FIGS. 12A and 12B are plan and cross-sectional views, respectively, illustrating an example detector pixel including multiple detector elements in accordance with some embodiments described herein.
Figure 12B:
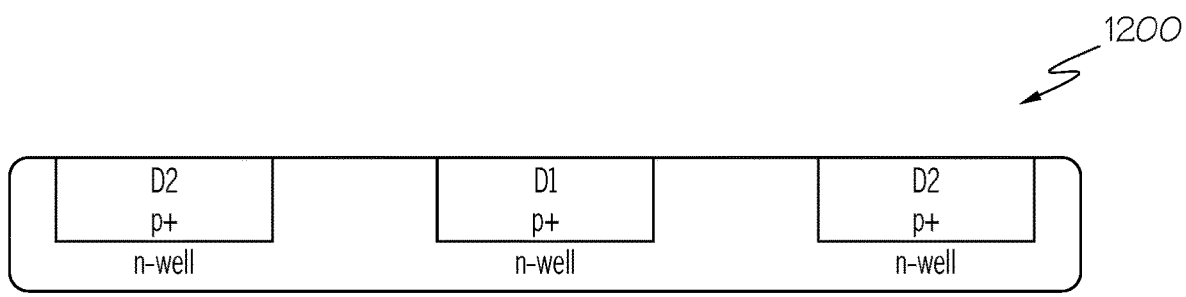

In some embodiments, the two SPADs or microcells in a pixel of a detector array are defined by two or more diodes, each enclosed in a guard ring. In some embodiments, as shown in the plan and cross-sectional views of FIGS. 12A and 12B, respectively, a pixel 1200 includes two diodes D1 and D2 arranged concentrically, e.g., such that a first, central diode D1 is elliptical or polygonal, and a second diode D2 defines an elliptical or polygonal ring surrounding the central diode D1, thus reducing the total pixel area occupied by the pair of diodes D1, D2. In some embodiments, isolation structures, such as trench or implant structures, may be formed to better isolate the two diodes D1, D2. More generally, the second diode D2 may be arranged around a perimeter or periphery of the first diode D1. The diodes D1, D2 are sufficiently electrically and optically isolated from each other and each have a readout node as described herein. In some embodiments, more than two concentric diodes may be formed in the pixel 1200. For example, a third diode may likewise define an elliptical or polygonal ring surrounding the diode D2, a fourth diode may define an elliptical or polygonal ring surrounding the third diode, and so forth.

Figure 13:
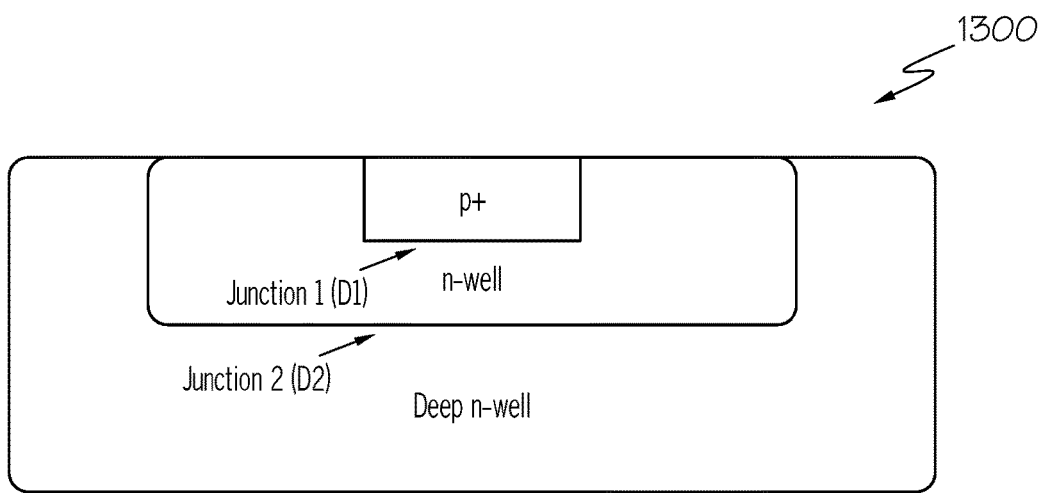
FIG. 13 is a cross-sectional view of an example detector pixel including multiple detector elements in accordance with further embodiments described herein.

In some embodiments, the two or more correlating diodes in a pixel may be vertically stacked. For example, the two diodes D1, D2 may be implemented using different junctions in the pixel. As an example and without loss of generality, a pixel 1300 may include one diode D1 defined by the source-drain diffusion to N-well junction (Junction 1) and the other diode D2 defined by the N-well to Deep N-well junction (Junction 2), as shown in the cross-sectional view of FIG. 13. However, it will be understood that embodiments of the present disclosure are not limited to the illustrated junction structures, and other junction structures may be used to provide sufficient electrical isolation such that an avalanche in one diode has a low probability of inducing an avalanche in the second diode. In some embodiments, each diode has its own readout circuit. In some embodiments, the pixel 1200, 1300 or other structure has a single readout where one diode's avalanches are read out as one voltage polarity and the other's avalanches are read out as a second polarity, both feeding into the readout circuit as described herein. A reduction in pixel area and thus significant pixel area saving can thereby be achieved. In some embodiments, the two or more diodes of a pixel are stacked via wafer-to-wafer bonding with appropriate electrical interconnection. Appropriate computational correction factors can be made by processing circuitry as described herein to account for the different detection probabilities of the two diodes.

It will be understood that signal and gate polarities described herein are provided by way of example only and may be changed without loss of functionality in accordance with embodiments of the present disclosure. The time processing circuitry (e.g., 950) includes a counter (e.g., 950a) and a time integrator (e.g., 950b). Both the counter and the time integrator may be reset once per frame. Both the counter and the time integrator may be disabled by a saturation control circuit (e.g., 955).

Figure 14:
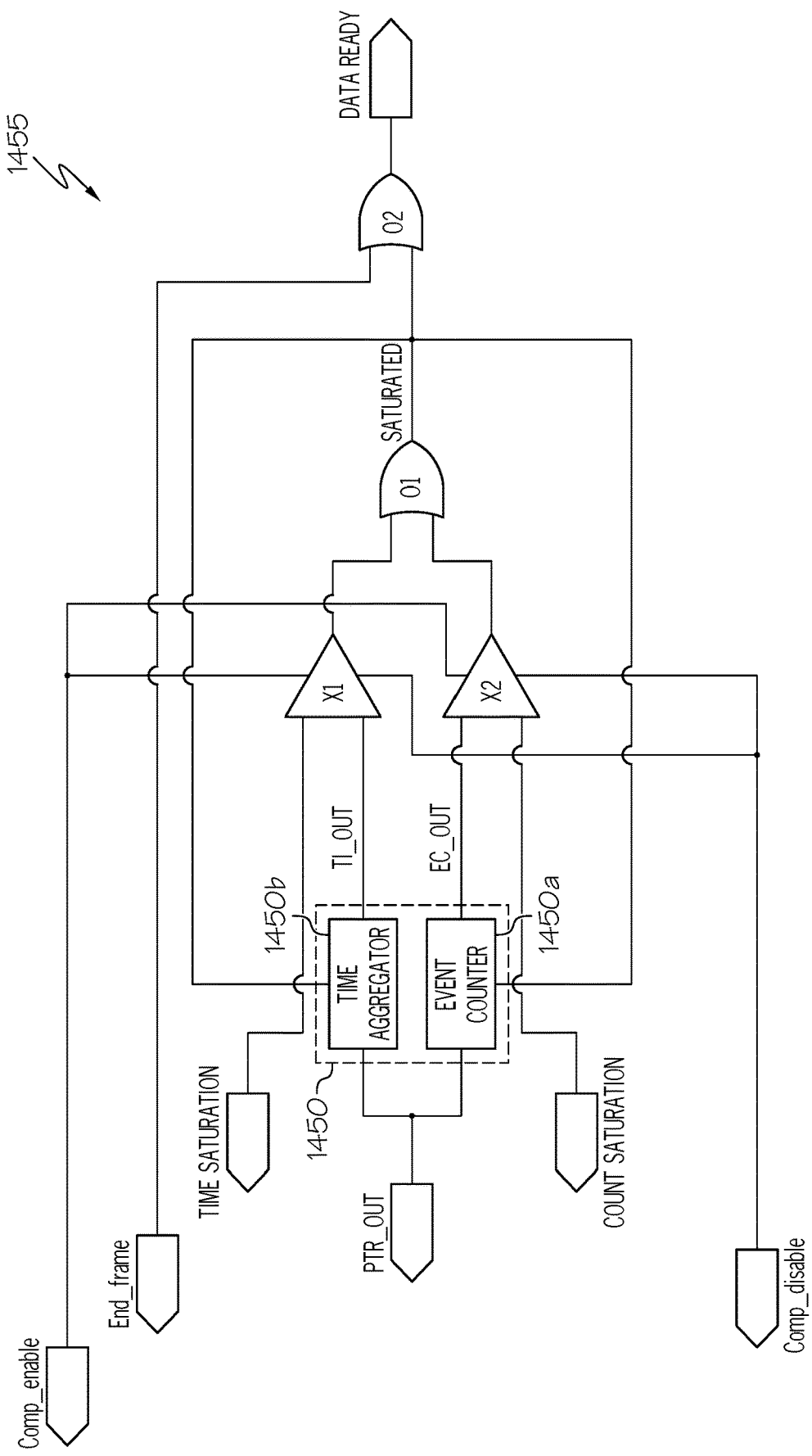
FIG. 14 is a block diagram illustrating an example saturation control circuit in accordance with some embodiments described herein.

An example saturation control circuit 1455 in accordance with the present disclosure is illustrated in FIG. 14, the operation of which will now be described. In FIG. 14, DC voltages Time saturation and Count saturation are provided to the pixel. Comparators X1 and X2 monitor the voltage outputs TI_out and EC_out of the time integrator 1450b and event counter 1450a, respectively. Once either voltage (TI_out or EC_out) reaches a threshold set by the external voltages (Time saturation and Count saturation), the output of the comparator circuit X1, X2, (saturated) switches to 1, and freezes the values of the time integrator 1450b and event counter 1450a. The time integrator 1450b and event counter 1450a may be reset by respective reset signals at the beginning of a frame. An external End_frame signal is input to an OR gate 02. If either the time processing circuitry 1450 reaches saturation or the End_frame flag is 1, a data-ready bit becomes 1. In some embodiments the event counter 1450a is an analog counter. In some embodiments the event counter 1450a is a digital counter.

In some embodiments, the PTC (e.g., 925) is configured to output one binary data as a correlation signal when its two inputs, which are the direct, inverted, or buffered outputs of the two SPADs (e.g., 910), arrive within a predefined or predetermined duration of time (also referred to herein as a "correlation time" or "correlation window"), and otherwise outputs another binary output or a tri-state output. In some embodiments, the PTC may provide the direct, inverted, or buffered output of a first SPAD and a second SPAD of a detector array to the clock input and the data input of an edge triggered D Flip Flop.

Figure 15:
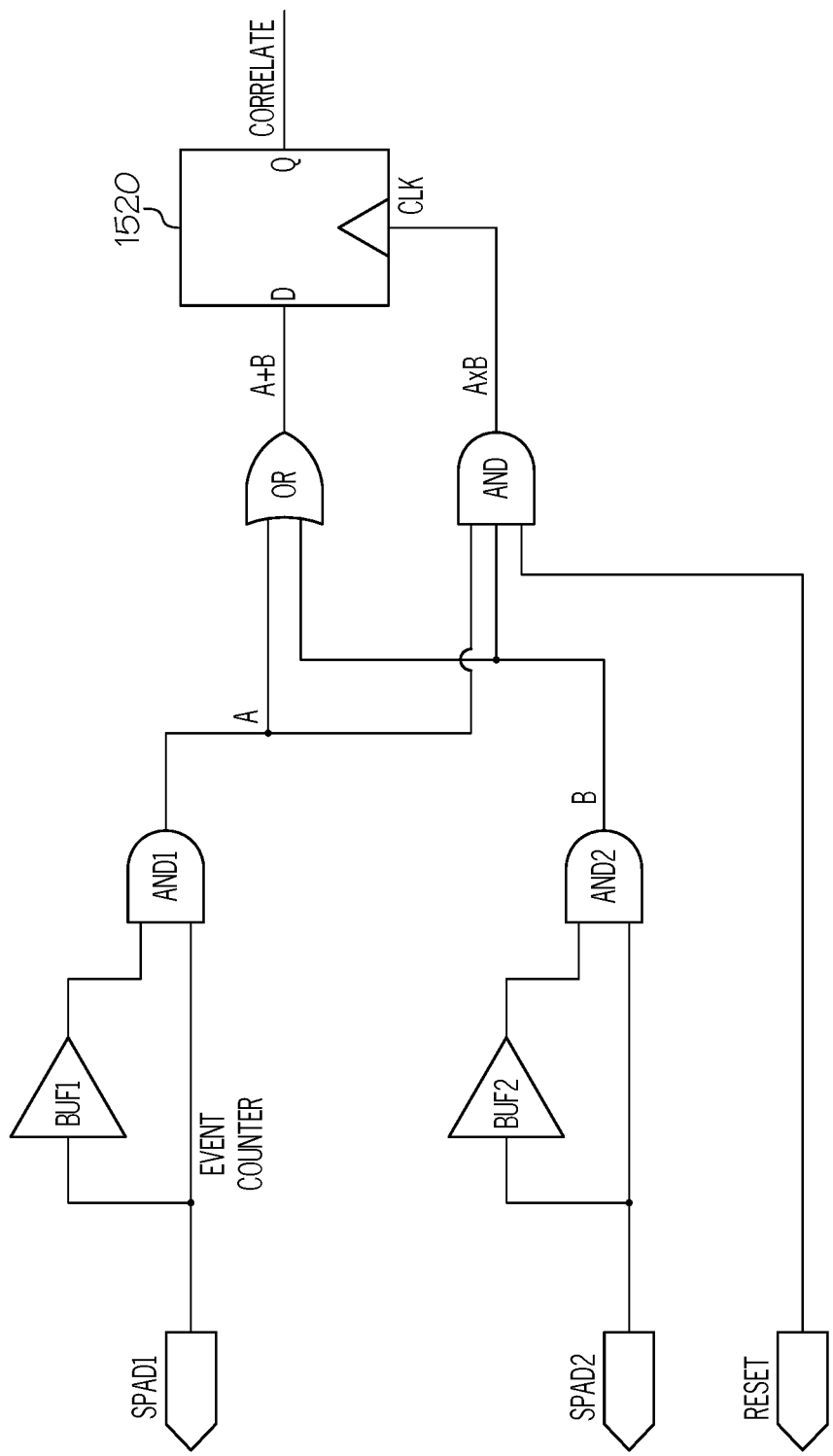
FIG. 15 is a block diagram illustrating an example pulse time correlator (PTC) circuit in accordance with some embodiments described herein.

An example pulse time correlator (PTC) circuit 1525 in accordance with the present disclosure is shown in FIG. 15, the operation of which will now be described. As throughout the present disclosure, the polarity of gates may be reversed in particular embodiments. As shown in FIG. 15, The PTC 1525 provides the direct or buffered voltage of the switching node of each of the two or more SPADs (SPAD1, SPAD2) of a detector array (e.g., 910) to respective AND gates (AND1, AND2), directly and via delay elements (BUF1, BUF2). In some embodiments, the delay through the delay elements BUF1 and BUF2 is equal to the desired correlation time. In some embodiments, the delay elements BUF1 and/or BUF2 may be implemented as an odd number of inverters connected in series. In some embodiments, the delay elements BUF1 and/or BUF2 may be implemented as even number of inverters connected in series. In some embodiments, the delay provided by elements BUF1 and/or BUF2 can be controlled via external circuitry. In some embodiments, the delay provided by elements BUF1 and/or BUF2 can be controlled to maintain desired levels across multiple manufacturing process conditions, supply voltage variations, and/or temperatures (PVT). The outputs (A,B) from the AND gates (AND1, AND2) are fed to an OR gate (OR) and an AND gate (AND), which generate the Data and CLK inputs, respectively, for an edge-triggered D Flip Flop 1520, respectively. A Reset signal (Reset) is used to reset the output of the flip flop 1520. The flip-flop 1520 is configured such that its setup time is approximately equal to or less than the maximal correlation time corresponding to a correlated detection. In some embodiments, the correlation time is shorter than the pulse duration of an emitter pulse. In some embodiments, the correlation time is longer than the pulse duration of an emitter pulse. The PTC circuit 1525 is configured such that it adds a reduced or minimal possible jitter to the data when data is propagated to its output.

Figure 16A:
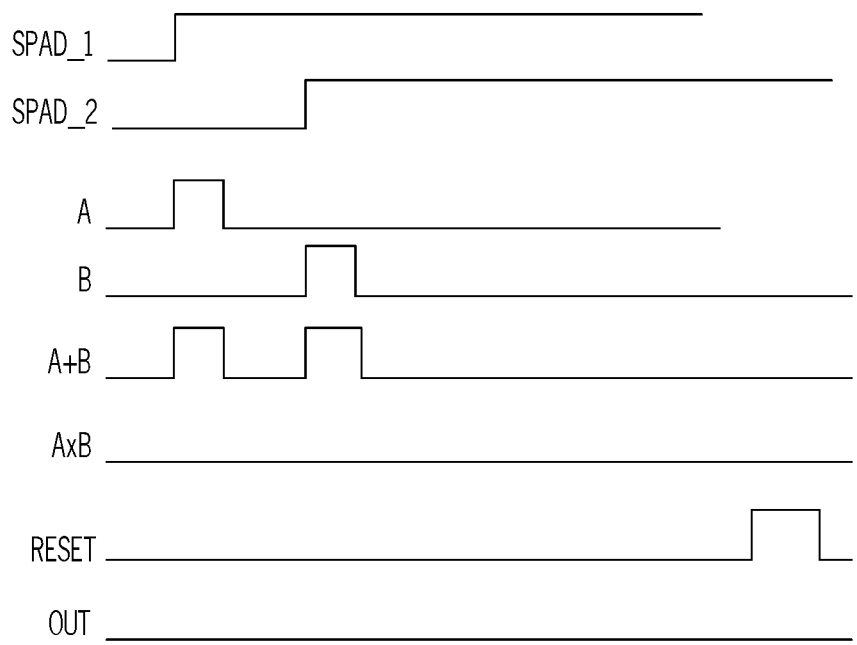
FIGS. 16A-16C are timing diagrams illustrating example operations of the PTC circuit of FIG. 15 in accordance with some embodiments described herein.
Figure 16B:
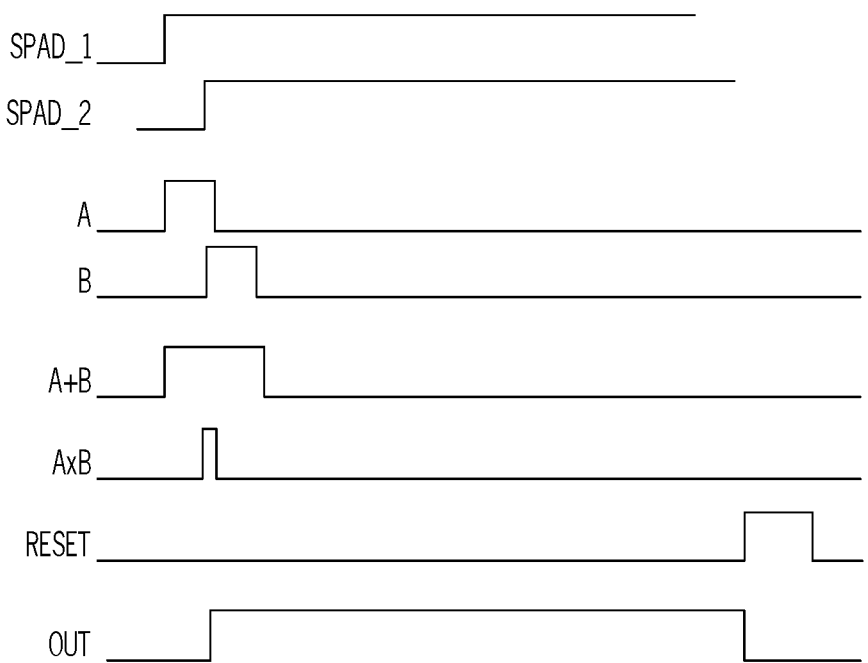
Figure 16C:
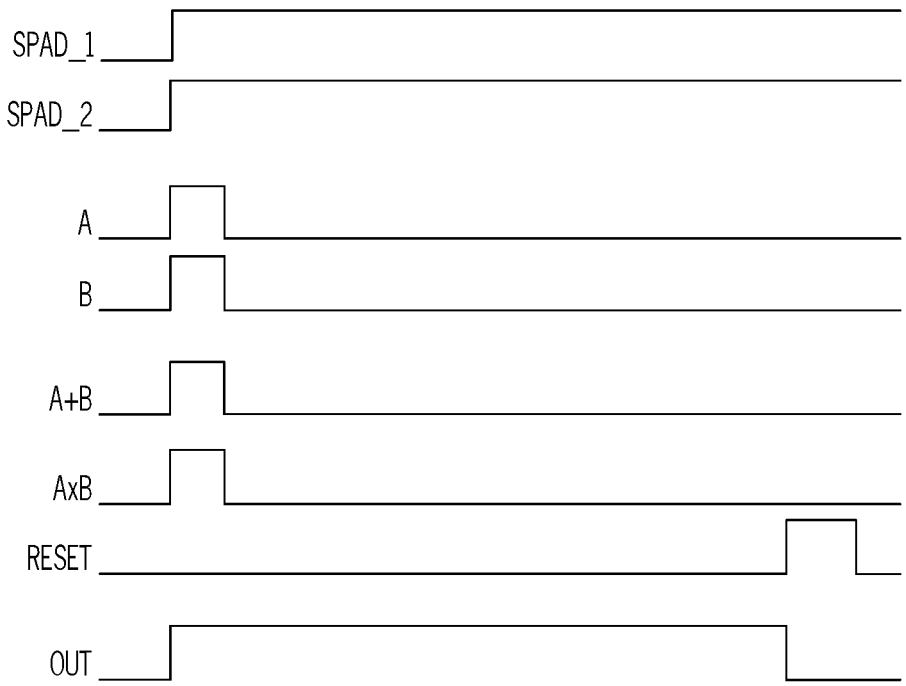

The timing diagrams including the waveforms shown in FIGS. 16A-16C illustrate example operations of the PTC circuit 1525 shown in FIG. 15. In FIGS. 16A-16C, the signal "Out" refers to the output of the PTC circuit 1525, also referred to herein as a correlation signal. At the end of the measurement window, the state of the flip flop 1520 is reset by the signal Reset.

The timing diagrams including the waveforms shown in FIG. 16A illustrate the operation of the PTC circuit 1525 when the detection of avalanches in two SPADs (SPAD1 and SPAD 2), output as detection signals SPAD_1 and SPAD_2, occur with a lag time relative to one another that is longer than the predetermined correlation time. The detection signals SPAD_1, SPAD_2 indicate respective times of arrival of photons at the corresponding detector elements (SPAD1, SPAD 2). The buffer (BUF1, BUF2) and AND gates (AND1, AND2) convert the leading edge of each detection signal SPAD_1, SPAD_2 from a respective avalanche into pulse signals A, B having pulse widths or durations corresponding to the correlation time. The signal A+B output from the OR gate (OR) as the data signal to the flip flop 1520 indicates that the pulse signals A, B, do not overlap. The CLK signal A×B samples a digital 0 and is provided to D flip flop 1520, such that the correlation signal Out generated by the PTC circuit 1525 is 0, indicating that the respective times of arrival of the photons detected at SPAD1 and SPAD 2 are not correlated.

The timing diagrams including the waveforms shown in FIG. 16B illustrate the operation of the PTC circuit 1525 when the detection of avalanches in the two SPADs (SPAD1, SPAD 2), output as detection signals SPAD_1 and SPAD_2, occur just within the predetermined correlation time. In this case, the signal A+B output from the OR gate (OR) as the data signal to the flip flop 1520 indicates that the pulse signals A, B, overlap, and the rising edge of the CLK signal A×B samples a digital 1 such that a correlation signal Out generated by the PTC circuit 1525 is 1, indicating that the respective times of arrival of the photons detected at SPAD1 and SPAD 2 are correlated.

The timing diagrams including the waveforms shown in FIG. 16C illustrate a scenario when the detection of avalanches in two SPADs (SPAD1 and SPAD 2), output as detection signals SPAD_1 and SPAD_2, occur substantially simultaneously. In this case, the signal A+B output from the OR gate (OR) as the data signal to the flip flop 1520 also indicates that the pulse signals A, B, overlap, and the rising edge of the CLK signal A×B is provided to the flip flop 1520 with the data signal A+B. Because the setup time of the flip flop 1520 is set to zero, the data A+B is still sampled correctly and a correlation signal Out generated by the PTC circuit 1525 is 1, indicating that the respective times of arrival of the photons detected at SPAD1 and SPAD 2 are correlated.

Specific implementations of correlator circuits in accordance with embodiments of the present disclosure have been provided as an example, but are not so limited. As such, other correlator circuits which provide a binary signal output of one type when avalanches occur within the correlation time, and another binary signal output when no two pulses occur within the correlation time, can be implemented in accordance with embodiments of the present disclosure.

In some embodiments, the number of events and the sum of times are stored as voltages on capacitors (e.g., Ca and Cb, respectively).

In some embodiments, only one TOF measurement is made per laser cycle. In some embodiments, multiple TOF measurements are made in one laser cycle.

In some embodiments, only one event counter and time integrator pair (e.g., 950a and 950b) is included in a pixel. In some embodiments, more than one pair of event counters and time integrators is included in a pixel such that if one pair has already been triggered to record a time and event, the next pair is used.

In some embodiments, a rolling shutter readout scheme is used to read out the voltages from the pixels one row at a time. In some embodiments, a global shutter scheme is used to read out all voltage of the detector array at once.

In some embodiments, a Region of Interest (ROI) is defined whereby only a subset of the detector array is read out.

In some embodiments, a circuit is included in the pixel to calculate the ratio of the integrated time and the number of events to derive the average time of arrival. For example, a Gilbert Multiplier circuit may be integrated in the pixel.

In some embodiments the read-out voltages are digitized using an analog to digital converter (ADC). In some embodiments, the ADC is on-chip. In some embodiments the ADC is off-chip. In some embodiments the read-out is in a bonded chip (e.g., a readout integrated circuit (ROIC)).

In some embodiments the imaging chip which includes the SPAD array (and in some embodiments, a CIS array) is frontside illuminated. In some embodiments the imaging chip which includes the SPAD array is backside illuminated.

In some embodiments, an on-chip or off-chip processing unit (e.g., a microprocessor) calculates the ratios of integrated times (voltages) to number of events (voltages) per pixel. In some embodiments a processing unit converts all ratios to ranges and azimuth-height coordinates and stores and/or displays the results as a 3D point cloud.

Other advantages of embodiments of the present disclosure may include improved dynamic range. Dynamic range may be an obstacle for all other modalities, including PMDs. Some example calculations are provided below; however, it will be understood that these examples are non-limiting and provided for purposes of illustration only.

In the following examples with reference to LIDAR systems, it is noted that illumination photon flux (photons/area/time) typically falls off as a square of the distance (in some cases, e.g., when a non-divergent beam is used, the illumination photon flux remains approximately constant, but this is not the typical configuration for long-range LIDAR systems). Therefore, a target 200 m away may be illuminated with $(5/200)^2=6.25e-4$ as much power as a target 5 m away (with the assumption that 5 m is a minimum desired detection range). In this example, the closer target is a specular reflector (100% reflectivity) and the farther target has 10% reflectivity and is a Lambertian reflector. The reflected power received by the detector also goes as the square of the distance range, so the echo from the far target may again be 6.25e-4 of the echo from the close target. Therefore, some integrating detectors, even before considering ambient light, may deal with a dynamic range of 1:25.6 million. However, in some image sensors, typical full well capacity may be about 5,000 to 100,000 (a sensor meeting these specs may need a full well capacity of 25.6 million electrons, if it could read out with a read noise of less than one electron, which may be not be possible). When the effects of sunlight are included, which may add a background of about 500 photons per cycle, this problem may become significantly worse.

In contrast, embodiments of the present disclosure using single photon detectors can paradoxically address dynamic range problems (paradoxically because single photon detectors can handle high fluxes better than pin diodes, APDs, PMD, etc.). If a large burst of photons arrives at a SPAD, it has the same effect as a single photon, namely, to discharge the SPAD. Once the SPAD has been discharged by the leading photon, it is blind to all the other photons in the burst. Many concurrent photons may increase the probability for a correlated-pair detection, but otherwise operation of the SPAD may be unaffected. Embodiments of the present disclosure may thus provide further advantages, particularly where ambient photons are rejected and sensitivity is tuned for detection of farther targets.

Further improvements to the estimation of the center of mass by the pixels described above in the presence of uncorrelated photons are described herein. In the equations below, $t_{calc}$ is the time measured by the pixel, $t_{sigwidth/2}$ is half of the temporal spread of the avalanches correlated with the signal, s(t) is the average count rate of correlated events within the $t_{sigwidth}$, S is the total number of correlated events per subframe, b(t) is the average rate of uncorrelated events passing through the correlator, and B is the total number of uncorrelated events passing the correlator per subframe. b(t) and B can be calculated, as described herein, during a strobe gate not containing a signal echo, or during an interval when the emitter is not firing. $t_s$ is the real or actual time of flight to the target (which is a goal of the estimation).

$$t_{calc} = \frac{\int_{t=t_s-t_{sigwidth/2}}^{t_s+t_{sigwidth/2}} ts(t)dt + \int_{t=0}^{t_{strobe}} tb(t)dt}{S+B} = \frac{st^2}{2(S+B)} \Bigg|_{t_s-t_{sigwidth/2}}^{t_s+t_{sigwidth/2}} +$$

$$\frac{bt_{strobe}^2}{2(S+B)} = \frac{s}{2(S+B)} \times [(t_s+t_{sigwidth/2})^2 - (t_s-t_{sigwidth/2})^2] + \frac{bt_{strobe}^2}{2(S+B)} =$$

$$\frac{4st_s t_{sigwidth/2} + bt_{strobe}^2}{2(S+B)}$$

$$t_s = \frac{2(s+b)t_{calc} - bt_{strobe}^2}{4st_{sigwidth/2}}$$

$$t_s = \frac{2t_{calc}(S+B) - bt_{strobe}^2}{4st_{sigwidth/2}} =$$

$$\frac{2t_{calc}(S+B) - bt_{strobe}^2}{2st_{FullWidth}} = \frac{t_{calc}(S+B)}{st_{FullWidth}} - \frac{bt_{strobe}^2}{2st_{FullWidth}}$$

$$t_{FullWidth} = 2t_{sigwidth/2}$$

$$b = \frac{B}{t_{strobe}}; s = \frac{S}{t_{FullWidth}}$$

$$t_s = \frac{t_{calc}(S+B)}{S} - \frac{Bt_{strobe}}{2S}$$

Where $$t_{FullWidth} \sim \sqrt{t_{vcsel,pw}^2 + t_{spad,jitter}^2} + \frac{1}{2}t_{correl}.$$

The square root is the temporal spread.

Figure 17:
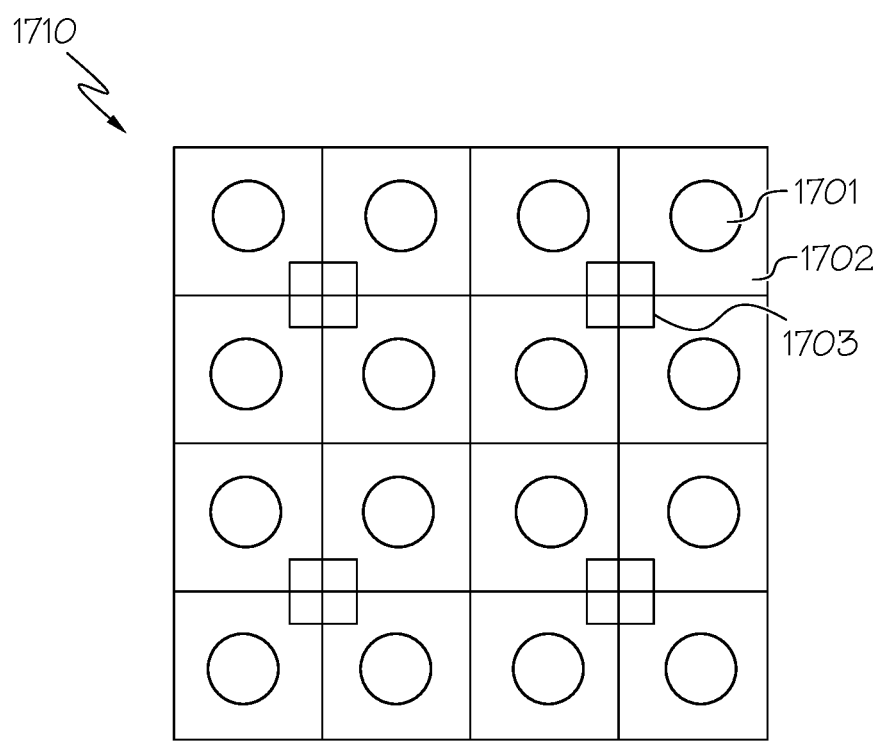
FIG. 17 is a block diagram illustrating an example detector sub-array in accordance with some embodiments described herein.

In some embodiments, CMOS Image Sensor (CIS) pixels, such as Active Pixel Sensor (APS) pixels or Passive Pixel Sensor (PPS), may be integrated within a SPAD-based detector array, and the respective controller array, which may be used for either rolling-shutter readout or global shutter read-out, may be provided either on the same die or on a separate readout integrated circuit (ROIC). A detector sub-array 1710 according to some embodiments of the present disclosure is shown in FIG. 17. In this example, SPAD pixels 1702 include SPAD active area 1701, with surrounding guard ring and circuitry. Also included in the detector array 1710 are CMOS Image Sensor (CIS) pixels 1703. Thus, two outputs can be generated from the detector array 1710—one being the 3D point cloud (based on the detection signals output from the SPADs 1702), and the other a gray scale undersampled image of the same field of view (based on the outputs of the CIS pixels 1703).

In some embodiments, the output of the CIS pixels 1703 and the SPAD pixels 1702 can be combined or "fused" by a processing unit to form an intensity-encoded 3D point cloud. In some embodiments, a separate or dedicated image sensor device can generate a complete image, either monochrome or color. In some embodiments, the undersampled image from the CIS pixels 1703 can be fused with the image from the separate or dedicated image sensor device, with the undersampled features serving as fiducials or registration points for the image from the separate or dedicated image sensor device. In some embodiments, this fused image can also be fused with the 3D point cloud generated by the SPAD pixels 1702.

Figure 18A:
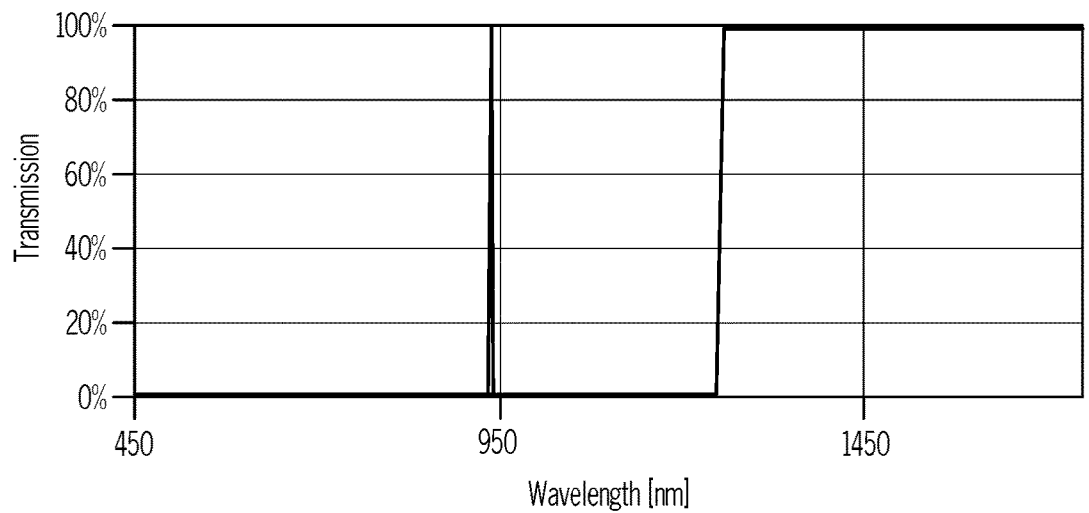
FIG. 18A is a graph illustrating characteristics of tunable optical filters that may be used in in a LIDAR application in accordance with some embodiments described herein

In some embodiments, a SPAD imager may be packaged with an image sensor that is sensitive to infrared (IR) photons, for example, to photons with wavelengths longer than 1200 nm. In some embodiments, the infrared image sensor can be bonded to a silicon-based SPAD device such that visible photons are absorbed by the silicon-based SPAD device but infrared photons (which cannot be absorbed by the silicon-based detector) will pass through to the IR sensor. It will be understood that, in such an embodiment, the optical system can have a sufficiently low numerical aperture and/or depth of focus so as to allow both focal plane arrays to concurrently be in focus, and/or that a tunable focus can be integrated so as to allow either detector (SPAD or IR) to be in the focal plane of the system. It will also be understood that metallization in the SPAD device can be designed such that it allows IR photons to reach the bonded IR sensor. It will also be understood that a filter at the front (or input) of the detection module or array can be configured such that, in the visible range, the filter will transmit a relatively narrow spectral band, e.g., having a transmission band of about 1 nm or 5 nm or 20 nm around 930 nm or 940 nm wavelength of light, and the filter can concurrently function as a high pass filter in with respect to IR wavelengths of light, transmitting as wide a band as desired above 1200 nm, as shown for example in the graph of FIG. 18A.

Figure 18B:
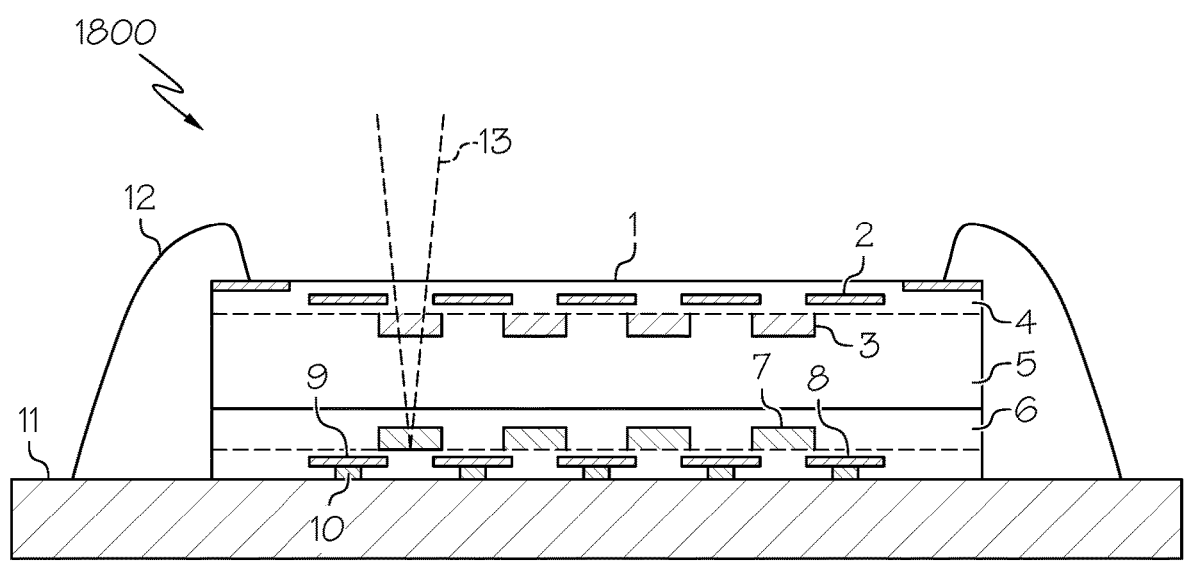
FIG. 18B is a block diagram illustrating an example integrated visible TOF-IR image sensor device in accordance with some embodiments of the present disclosure.

FIG. 18B illustrates an example of an integrated visible TOF-IR image sensor device 1800 in accordance with embodiments of the present disclosure. A SPAD die 5 (for example, a silicon die) is bonded, either wafer-level or die-level, with an IR detector die or wafer 6 (for example, an InGaAs die or wafer). The SPAD die 5 includes a top section containing metallization lines 2, wire bonding pads 1, and an inter-metal dielectric, with a lower or bottom part 4 containing the photodiodes 3. The IR die 6 may be backgrinded and backside illuminated (BSI) so that its photodiodes 7 are on the top-facing side of the die 6. In some embodiments, the IR die 6 is not backgrinded or is frontside illuminated. In a BSI IR sensor, metallization lines 10 and microbumps are used to electrically interconnect the IR array 6 to a substrate 11. In some embodiments, wirebonds 12 interconnect the SPAD array 5 to the same substrate. In some embodiments, thermal control may be provided to reduce the dark current from the IR detectors 7 to a sufficiently low level while maintaining the afterpulsing rate from the SPAD detectors 3 sufficiently low.

Some further embodiments of the present disclosure are directed to delay measurements on SPAD pixels based on area calculation with a background (BG) reference. Such embodiments may be used in combination with the analog or digital circuits used to compute time of flight inside each pixel (e.g., counter and time integrator circuits) as described above, as well as with features described above including (1) tunable narrow bandpass filters; (2) detector strobing or gating, particularly gate widths that vary with time of flight; and/or (3) coincidence counting (e.g., using correlator circuits to detect photons arriving within a predetermined correlation time relative to one another) to bias counting toward desired signal photons (e.g., from a desired light source) over background photons (e.g., from ambient light sources).

In particular embodiments, a second "reference" channel, which is configured to permit background photons (also referred to herein as BG or bg photons) to enter, may be used. The reference channel may be implemented by one or more single photon detectors that are configured to detect incident photons that are outside of the wavelength range of the optical signals emitted by a pulsed light source for a LIDAR system, such as VCSEL arrays describe herein. This reference channel is configured to estimate statistics related to only the background photons, and thereby allow for correction of the estimates of the time of flight on the "main" channel (signal+background). As background increases, the TOF estimate may be "pulled" toward the center of the gate; thus, the reference channel according to further embodiments described herein provides an analog output which can be used to counteract the pull toward the center.

In some embodiments, the reference channel may be implemented by optical filters that are arranged to provide the input light to the respective single photon detectors of a detector array. Some of the optical filters have transmission bands that permit light of the desired signal wavelength and background wavelengths, while others have transmission bands that permit light of the background wavelengths only. That is, the reference channel includes an optical bandpass filter that is not on (i.e., does not correspond to or is otherwise configured to prevent transmission of) the wavelengths of the desired signal photons. Other methods to deprive the reference channel of desired signal photons may also be implemented. In some embodiments, microtransfer printing may be used to apply the respective optical filters to respective single photon detectors of the detector array.

As described in some examples herein, SPADs may be an example of detectors that can be used for detecting extremely low levels of signal. However, a SPAD may register an event for every photon that it detects, including background photons. This means that even if the signal could be recovered, the memory and processing requirements (for digitizing/recording/analyzing all of the photon events) may likely be too great to include in a single pixel, if the analysis strategy relies on analysis using all of the photon events.

As discussed in detail above, embodiments of the present disclosure are directed to light ranging detection and analysis that provides a reduction in the data load of SPAD output at the point of detection, without losing essential information (e.g., information that indicates the time of flight of the desired signal photons). Some embodiments may thus "integrate" all events "on the fly" into a small number of "figures of merit" from which the desired time of flight can be estimated.

Figure 19:
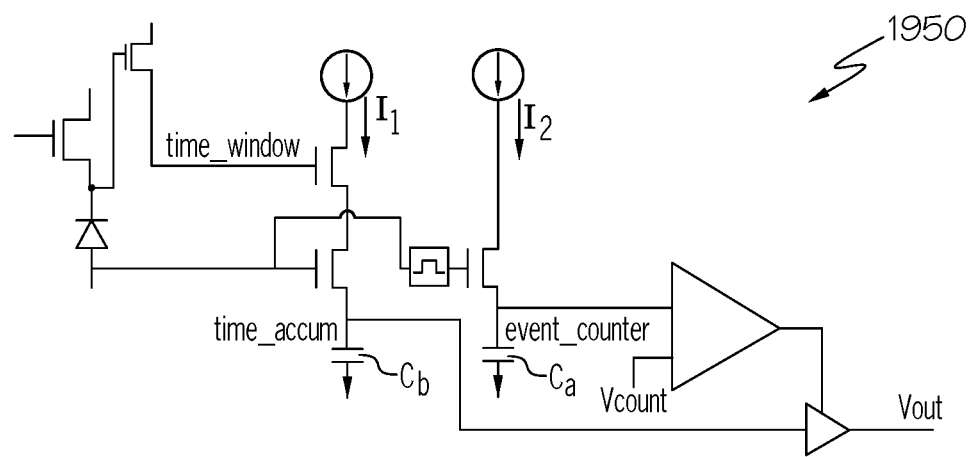
FIG. 19 is a block diagram illustrating an example analog time processing circuit in accordance with some embodiments described herein.

For example, some embodiments may calculate the average delay (e.g., first moment of histogram of time of flight from all SPAD avalanche events). FIG. 19 illustrates an example analog time processing circuit 1950 that is configured to compute the mean time of flight value by independently computing two quantities: (1) the sum of the TOF (or TOA) of all events (e.g., integrated on a capacitor Cb); and (2) counter of the number of events (e.g., stored on capacitor Ca). This circuit 1950 may be suitable for estimating TOF; however, background photons (and other sources) may result in detection events which are not from laser signal echos, providing noise in the measurements. As such, without additional information, the values generated by the circuit 1950 may, in some instances, mix desired signal and background photons into the same value.

Some further embodiments may thus generate additional information that can improve extraction of values that correspond to the desired signal photons (e.g., laser signal echos). For example, in some embodiments, an independent estimate of the average background intensity (and delay value) may be generated by implementing a reference detection channel #2 using similar devices as the primary channel #1. The reference detection channel #2 may operate simultaneously/in parallel with channel #1, or may operate sequentially/before or after channel #1. Channel #2 differs from channel #1 in that it is configured so as not to register or detect desired signal photons. By using the time processing circuit 1950 shown in FIG. 19 (or similar circuits) on both the primary and reference channels, but tuned for different wavelength ranges (e.g., using respective optical filters), further embodiments may provide detection analysis that allows the desired signal photons to be distinguished from the background photons, based on relationships between the values output from the primary and reference channels.

Some further embodiments described herein may thus allow analog calculation of peak delay by average of integrator by making use of a reference BG channel. To this end, a monte carlo analysis may be used to treat quantities as random variables drawn from a Gaussian distribution whose standard deviation (sigma) is equal to the square root of the expectation value (mean). The results can be expressed in terms of the most likely estimate of time of flight as well as the variance of that estimate. Each (estimate and variance) are plotted as a function of desired signal (s) and background (b) which are varied independently, where s=total number of desired signal photons during a time gate and b=total number of background photons during a time gate.

Figure 20A:
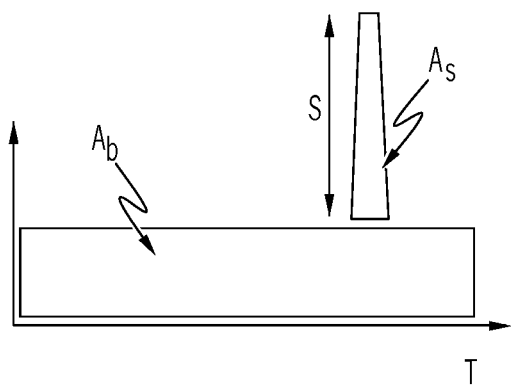
FIGS. 20A and 20B illustrate example operations for distinguishing between signal and background photons in accordance with some embodiments described herein.
Figure 20B:
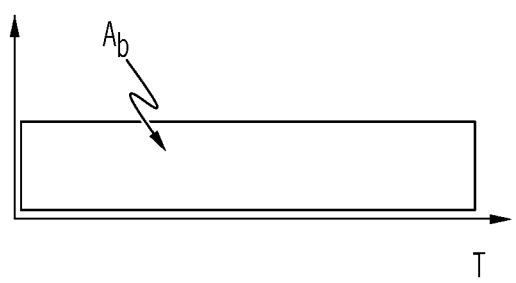

FIGS. 20A and 20B illustrate examples for distinguishing photons from signal and background across the time gate (Tg; also referred to herein as Tgate). To compute the average delay of the desired signal photons only $\langle t \rangle_s$, analog circuits as described herein may be configured to measure the average delay $\langle t \rangle$ and total photon counts, A, from a given photodetector. In particular, two channels may be used: one with a detector that is configured to collect light for a band/wavelength range that contains both desired signal and background photons, and the other for a band/wavelength range that contains just background photons. The equations below show how the desired quantity, average delay of signal only, can be derived from these measurements:

$$\langle t \rangle_{b+s} = \frac{\langle t \rangle_b A_b + \langle t \rangle_s A_s}{A_b + A_s} = \frac{\frac{1}{2}T_g A_b + \langle t \rangle_s A_s}{A_b + A_s}$$

$$M_1 = \frac{\frac{1}{2}T_g M_3 + \langle t \rangle_s (M_2 - M_3)}{M_2}$$

$$\langle t \rangle_s = \frac{M_1 M_2 - \frac{1}{2}T_g M_3}{M_2 - M_3}$$

Figure 21:
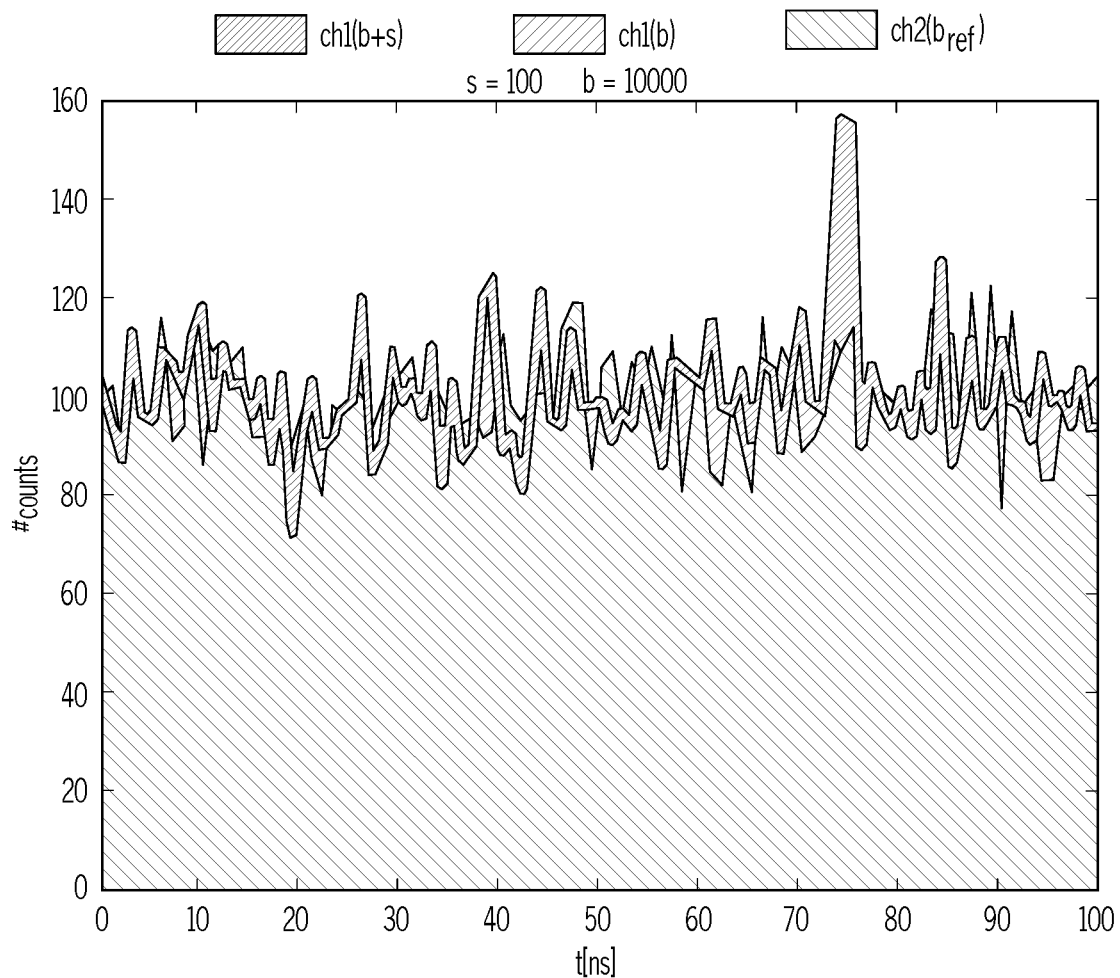
FIG. 21 is a graph illustrating effects of noise in example operations for distinguishing between signal and background photons in accordance with some embodiments described herein.

$\langle t \rangle_{b+s}$ = measurement1 = $M1$ $A_b + A_s$ = measurement2 = $M2$ $A_b$ = measurement3 = $M3$ $\langle t \rangle_b$ = measurement4 = $M4$ FIG. 21 is a graph illustrating the addition of noise to calculations, based on a given number of signal and background photons on channel #1, where S=the quantity of desired signal photons and B=the quantity of background photons (or dark counts). A random number of background photon counts may be drawn on (reference) channel #2: b_ref=b+X, noting that b_ref may not necessarily be the same value as b.

Photons may be distributed across Tgate according to expected distributions, and values for M1, M2, M3, M4, M5, M6 are computed, where M5=M3 using b_ref, and M6=M4 using b_ref. Estimates are computed based on 3 different equations:

$$\langle t \rangle_s = \frac{M_1 M_2 - M_6 M_5}{M_2 - M_5}$$

$$\langle t \rangle_s = \frac{M_1 M_2 - \frac{1}{2}T_g M_3}{M_2 - M_3}$$

$$\langle t \rangle_s = \frac{M_1 M_2 - M_4 M_3}{M_2 - M_3}$$

The above operations may be repeated for N-iterations to generate expected estimates and uncertainty of signal delay, ts. The accuracy of the calculation of TOF may thus increase as background noise is reduced in accordance with embodiments described herein. Accuracy may be further increased by increasing pulse power to increase photons per pulse, and SNR may be increased by integrating more pulses.

In embodiments including a single-photon detector-based reference channel that is configured to detect uncorrelated background (BG) photons for correction of the estimates of the time of flight on the "main" channel (which is configured to detect an aggregate of correlated signal photons+BG photons), the system may operate in three regimes. In a first regime, background counts are negligible in the sense that they have a sufficiently negligible effect on the center of mass calculation in the pixel. In a second regime, background counts are sufficiently high that the background collection operations described herein can be applied and, if the signal level is sufficiently high, the operations can estimate the correct range with a sufficiently low error. In a third regime, the background level is high enough to affect the measurement error adversely, but is too low to assume a uniform background count across the cycle. In some embodiments described herein, it may be desirable to operate in the first or third regimes and to avoid the second regime.

One way to move the system from the third regime to the first regime, if the signal level is sufficiently high, is to permit detection of more ambient light. This may be counterintuitive because, for a conventional image sensor, this will result in increased background noise and thus in a lower signal-to-noise ratio. However, in pixel implementations employing background correction according to some embodiments described herein, the detection of background photons with higher uniformity reduces the error of the background-correction operations.

Some embodiments described herein may thus include processing circuits (e.g., correlator circuit 925) that are configured to adjust (e.g., increase or decrease) a correlation time window based on detected levels of background (uncorrelated) photons, signal (correlated) photons, and/or a ratio of background-to-signal photons. In some embodiments, an increase in uncorrelated photons can be achieved by increasing the bandwidth of the spectral filter (e.g., tunable filter 212) to allow more non-emitter signal (e.g., ambient light) in. In some embodiments, an increase in the uncorrelated photon counts per frame can be achieved by broadening the correlation window of the in-pixel correlator. For example, the correlation window can be altered by electronically controlling the delay in the buffers BUF1 and/or BUF2 in the Pulse-Time Correlator (PTC) circuit 1525 of FIG. 15, thus changing the width of the pulse signal A and/or B. When the correlation time is longer, more uncorrelated counts can be passed to the Event Counter (e.g., 1450a) and Time Integrator (e.g., 1450b), transitioning the system to the first regime. In some embodiments, the uncorrelated photon count level is monitored or detected in a passive frame (i.e., where the emitters are not firing or emitting) or in a strobe gate where there is no target/reflection, and the correlation window is adjusted accordingly in response to the uncorrelated photon count level. In some embodiments, the correlation window is controlled globally for the single photon detectors of the detector array. In some embodiments, the strobe window is controlled by region of the detector array, that is, such that different correlation times are applied to detection signals output from detectors in a first region of the detector array and detection signals output from detectors in a second, different region of the detector array. In some embodiments, the strobe window is controlled for one or more pixels of the detector array.

That is, some embodiments may include determining a background (uncorrelated photon) detection level relative to a threshold (which may be based on a predetermined or desired background detection level, a predetermined or desired signal level, and/or a ratio therebetween), and then adjusting (e.g., increasing or decreasing) the correlation time that is applied to detection signals from one or more of the single photon detectors when the determined background detection level is below the threshold. This allows for detection of background photons with higher uniformity, which can increase accuracy of background subtraction/correction operations described herein.

In some embodiments, the correlator circuit (e.g., 1525) may be bypassed and the signal from either one or both SPADs may be driven directly to the integrating and counting capacitors. For example, in cases where the signal and/or the background levels fall below a certain threshold (e.g., as indicated by detection signals from one or more detectors), the correlator circuit may be bypassed. This bypass may be achieved, for example and without loss of generality, by setting the correlation time to be very high. This bypass may also be achieved by forcing the D input of the flip flop 1520 of FIG. 15 to be high.

In further embodiments including a single-photon detector-based reference channel that is configured to detect uncorrelated background (BG) photons for correction of the estimates of the time of flight on the "main" channel (which is configured to detect an aggregate of correlated signal photons+BG photons), under some operating conditions, the uncorrelated photon count rate, or the signal photon count rate, or both, may be too high. This can be undesirable in that, if the uncorrelated photon count rate is too high, the probability of detection of signal photons may be reduced if there is a significant probability that a signal photon will fall/arrive within the single-photon detector's dead time after the arrival of an uncorrelated photon. Conversely, if the signal photon count rate is too high, the probability of detection of uncorrelated photons within a dead time after arrival of a signal photon (and even afterward) may not be uniform, and thus the background subtraction/correction operations may provide an insufficiently accurate estimate of the signal time of arrival. In other words, if too many uncorrelated photons are being detected, the single-photon detectors may fail to detect signal photons that arrive within the detector's subsequent dead time, while if too many signal photons are being detected, the uncorrelated photons may be detected non-uniformly. If both of these operating conditions occur, both of the problems described above may occur. However, in some instances, it may be undesirable to set a global and/or static limit on the number of detected events or photon count rate because the optimal or otherwise desired number of events for reducing or minimizing the range estimation error can be a function of the signal photon count level, the background photon count level, and/or their combination.

In some embodiments, a dynamic event saturation threshold may be used to adjust the number of events in a subframe for a range calculation, for example to transition the system from the third to the first regimes described above. For example and without loss of generality, the Count Saturation signal that is fed to comparator X2 in the saturation control circuit 1455 of FIG. 14 can be adjusted based on the signal and background photon count levels measured (i) in a previous cycle, (ii) in another pixel, or (ii) in both a previous cycle and another pixel. In some embodiments, a controller outside of the pixel may receive signals indicative of the number of background and signal+background photon counts from a controlling cycle, and may set the Count Saturation signal level based on a lookup table or function, such that the measurement provides an improved range estimation performance. In some embodiments, the dead time of the SPADs (or other single-photon detectors) in the pixel can be adjusted by controlling the active recharge circuit (e.g., 903), thereby allowing more or fewer avalanches to enter or otherwise be provided to the correlator circuit (e.g., 925). In some embodiments, the single-photon detection probability of the detectors is adjusted, for example by adjusting the voltage overbias seen by the diodes (e.g., SPAD1 and SPAD2). Such mechanisms can operate on a per-pixel basis or on groups of pixels.

That is, in some embodiments of single-photon detectors in dynamically controlled LIDAR applications described herein, the photon count rate may be adjusted (increased or decreased), for example, by altering thresholds for saturation control circuits described herein (e.g., based on signal and background levels from a previous cycle, another pixel, or both), and/or by altering the dead time of the single photon detectors by controlling the active recharge circuits described herein. The photon count rate may be adjusted because, if too many uncorrelated photons are counted, the detectors may not detect some signal photons that arrive within the "dead time" after arrival of a preceding uncorrelated photon, or conversely, if too many signal photons trigger the single-photon detectors, detection of uncorrelated/background levels may be non-uniform, such that background subtraction/correction methods described herein may not be accurate.

In some embodiments, in-pixel correlation as described herein may include calculation of the center-of-mass of the distribution of the respective times-of-arrival (TOAs) of signal photons over a correlation window. Setting the correlation window to be narrow in relation to the pulse width can reduce the number of uncorrelated photons passing through the correlator, but may result in loss of or failure to measure some signal avalanches. Setting the window to be wide in relation to the pulse width can provide for measurement of more avalanches, but may include some background avalanche. That is, in this case more uncorrelated pairs may be measured. Accordingly, in some embodiments, the duration of the correlation window can be dynamically adjusted (per pixel or per groups of pixels) in response to the measured background and signal count rates.

As discussed herein, some embodiments may operate based on decreasing the number of uncorrelated avalanches (i.e., responsive to photons that are uncorrelated to the pulsed laser sources) by reducing the data load of a single-photon avalanche detector (SPAD) at the point of detection. Such uncorrelated avalanches may result from the SPAD device itself (e.g., due to thermal emissions or tunneling), and/or may result from the absorption of photons that do not correspond to the wavelengths of optical signals emitted by the LIDAR emitter (such as solar photons, or photons from other external sources, such as other non-correlated background or ambient light) generally referred to herein as background photons. In direct time-of-flight systems, this non-correlated background light may have a relatively minor effect on the calculation of the correct photon time-of-flight and hence on the calculation of the range of a target. However, in some embodiments, the effects may be more severe, for example, for range calculations based the calculation of the mean time of arrival (TOA). An effect of uncorrelated avalanches on the measured time of arrival (TOA) may be a skew towards the center of the time window over which arrival times are collected.

In the presence of uncorrelated or non-correlated avalanches (also described herein without loss of generality as background avalanches), the TOA measured by a pixel element (or "pixel") described herein (which may include one or more photodetectors) after integration over many pulse cycles may be:

$$TOA_{meas} = \frac{\sum_{k=1}^{m}(t_{sig,k} \times n_k) + (t_{win,mid} \times n_{bg})}{n_{bg+sig}}$$

where, k is the index of the time bins within a measurement sequence (e.g., a laser pulse cycle), m is the total number of time bins within a sequence, $t_{sig,k}$ is the arrival time of the $k^{th}$ time bin of signal photons arrival time, with respect to a reference time (heretofore, for simplicity and without loss of generality taken as the time of the laser pulse excitation (e.g., based on the leading edge of the pulse)), $n_k$ is the number of signal (not background) avalanches recorded in the $k^{th}$ time bin, ($t_{win,mid}$) is the time of or corresponding to the center of the time band during which the sequence of avalanches is recorded, $n_{bg}$ is the total number of background avalanches recorded during the total integration time and $n_{bg+sig}$ is the total number of signal and background avalanches recorded during the integration time.

However, it may be desirable to measure the (mean) signal photons' TOA:

$$TOA_{sig} = \frac{\sum_{k=1}^{m}(t_{sig,k} \times n_k)}{n_{sig}}$$

where $n_{sig}$ is the total number of signal avalanches (avalanches originated by signal photons). In examples described herein, the mean time between avalanches may be relatively large as compared with the dead time of the SPAD such that a change in the number of background avalanches within the measurement range may have no significant effect on the probability of a signal photon to induce an avalanche.

In some embodiments, the avalanche times as referred to herein may be times of avalanches indicated by detection signals output from individual SPAD detectors. In some embodiments, the avalanche times as referred to herein may be the times of one or both of a correlated pair of avalanches that occur within a correlation time as defined by correlator circuits (e.g., 925, 1525) described herein and indicated by correlation signals output therefrom.

Further embodiments described herein relate to photon arrival times that fall or are otherwise detected in two neighboring time bands or distance sub-ranges. Methods and circuits for alternating or otherwise adjusting the boundaries of the time bands or distance sub-ranges are described.

According to some embodiments described herein, a background-corrected TOA can be calculated by:

$$TOA_{bg\_corrected} = \frac{(TOA_{meas} \times n_{bg+sig}) - (t_{win,mid} \times n_{bg})}{n_{sig}} = \frac{\sum_{k=1}^{m}(t_{sig,k} \times n_k)}{n_{sig}}$$

Some embodiments described herein provide methods and circuits whereby calculations are performed for correcting errors resulting from background avalanches. Pixels described in some embodiments may contain an avalanche-counting capacitor or circuit (e.g. 950*a*) and a time-integrating capacitor or circuit (e.g., 950*b*). These capacitors or circuits can further be used to count and integrate times of non-correlated avalanches by bypassing the in-pixel correlator (e.g., 925).

In some embodiments, a passive acquisition frame may be interspersed between one or more active acquisition frames. An active acquisition frame (also referred to herein as an active frame) may refer to a frame in which the pulsed laser of a LIDAR system is active. A passive acquisition frame (also referred to herein as a passive frame) may refer to a frame in which the pulsed laser of the LIDAR system is inactive.

In some embodiments, a passive acquisition SPAD (also referred to herein as a passive SPAD) or other photodetector may be interspersed in a SPAD detector array such that the passive SPAD is not configured to detect photons of the wavelength of the emitting laser (i.e., signal photons). In some embodiments, an optical filter may be deposited or otherwise provided on top of the active light-receiving area of the passive SPAD such that the rate of background photons which are transmitted through the passive SPAD is proportional to the rate of background photons impinging on the active SPADs. In some embodiments, the passive SPAD may be optically isolated from external illumination, e.g., by a metal layer, and compensation can be made to non-optical background avalanches.

Methods and circuits are described herein with reference to a passive acquisition frame. It will be understood that similar methods can be used with an active SPAD, whereby correction can be contemporaneous with the signal acquisition rather than in series or sequence.

Referring again to the circuit of FIG. 9, and without loss of generality, a pixel of a detector array 910 may be operated at a particular or predetermined frame rate. For example, in some embodiments the frame rate may be 10 frames per second. In some embodiments the frame rate may be 20 frames per second. In some embodiments the frame rate may be 30 frames per second. During each active frame, a sequence of laser pulses is emitted (e.g., by VCSEL array 215), and their echoes may generate avalanches which are processed in the pixel, and in an array thereof. As an example and without loss of generality, once per a predetermined or desired number of active frames, a passive frame may replace an active frame. During the passive frame, the laser driver transistor/circuitry may not drive the laser to emit pulses.

In some embodiments, each frame may include a number sub-frames. Each sub-frame spans a part of a complete frame, corresponding to a distance range that is part of the distance range that can be imaged by the LIDAR system.

In some embodiments, a partially-passive frame, in which one or more sub-frames are operated in a passive mode, may replace the passive frame of the above description. For example, a partially-passive frame may replace an active frame once per a predetermined or desired number of active frames. The background counts for other frames may be extrapolated from the measured background count of a passive sub-frame, in proportion to their relative duration with respect to the passive sub-frame. For example, if a passive sub-frame lasts 300 ns and counts 100 counts, then another sub-frame which lasts 600 ns, can receive an extrapolated 200 background counts.

Referring to the background-corrected TOA ($TOA_{bg\_corrected}$), the following parameters (a non-exhaustive list) may be processed by the processing unit 970. $TOA_{meas}$ is the ratio of integrated time to counted events at the end of each active sub-frame (scaled by a known or determined factor); $n_{bg+sig}$ is the output of the event counter at the end of each sub-frame; $t_{win,mid}$ is the known or determined time of the middle of the time band of the current sub-frame; $n_{bg}$ is the output of the event counter during a passive sub-frame or an extrapolated count number based on another passive sub-frame, as described above; and $n_{sig}=n_{bg+sig}-n_{bg}$ is the calculated difference between the counter output during each active sub-frame, and the value of the last passive sub-frame counter for the same pixel, which value may be stored in a non-transitory memory or memory array (for a number of sub-frames) and replaced each time the same sub-frame's passive output is acquired.

Once parameters have been acquired by the processor unit 970, the processor unit 970 may be configured to calculate the background-corrected TOA ($TOA_{bg\_corrected}$) in accordance with the equation above. The processor unit 970 may be implemented by a microcontroller or microprocessor in some embodiments.

Further embodiments described herein may provide background subtraction in a SPAD pixel, which may differ from embodiments where the signal and background are temporally separated on a single pixel based on how measurement of the background is divided from the measurement of signal. In particular, rather than measurement of signal and measurement of background separated in time (e.g., during one cycle the emitter is activated and fires a laser pulse and the data returned is considered to be "signal" ("S") or "signal+background" ("S+BG"); during the next cycle the emitter is disabled and the measurement is considered to be "background only" ("BG")), further embodiments described herein provide a "dual pixel," whereby a single pixel element comprises two separate detection channels that operate simultaneously in parallel.

Figure 23:
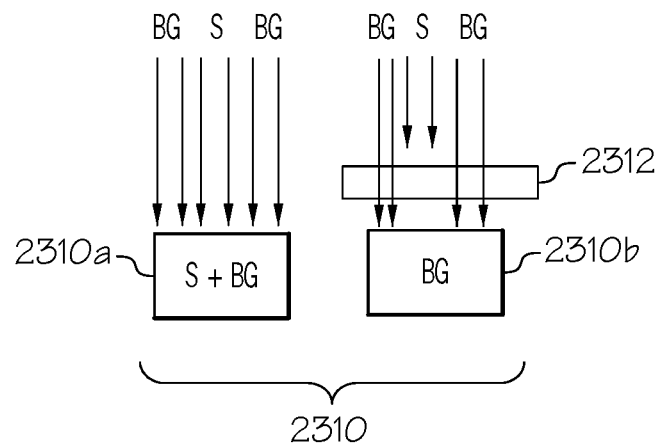
FIG. 23 is a block diagram illustrating an example dual pixel element for background photon correction operations in accordance with some embodiments described herein.

An example dual pixel element 2310 in accordance with embodiments of the present disclosure is illustrated in FIG. 23. As shown in FIG. 23, detector element 2310a defines one of the channels, which is configured to admit and detect signal+BG photons. Detector element 2310b defines the other channel 2310b, which configured to admit and detect only BG photons (i.e., so as to exclude detection of the desired signal photons/wavelength of light). Each of the detector elements 2310a and 2310b can be implemented as a single detector (e.g., SPAD, APD, etc.) or a combination of detectors, so as to output respective detection signals indicative of respective times of arrivals and/or intensities of photons incident thereon. In some embodiments, the detector elements 2310a and 2310b in FIG. 23 (which may be considered "subpixels" of the illustrated pixel element 2310) can be implemented as a pair of SPADs, which may produce/detect correlated avalanche events in accordance with the embodiments discussed above.

Distinguishing between the two simultaneously operating channels S+BG and BG defined by detector elements 2310a and 2310b, respectively, may be performed by various methods and devices. Some embodiments described herein may use optical bandpass filters, where the detector 2310a for one channel S+BG includes a bandpass filter that is open (i.e., is configured to permit light) at the wavelength of the emitter and therefore allows signal photons to pass through; and the detector 2310b for another channel BG includes a different optical bandpass filter (illustrated in FIG. 23 as optical filter 2312) that is configured to block the passage of signal photons (i.e., has a transmission band that is configured to filter photons/light having wavelengths output from the emitter), but allow non-signal background photons (e.g., photons from background or ambient light sources, including the sun) to pass in a quantity that is a linearly related to the quantity of background photons that would be expected to pass through the other channel S+BG (in addition to the signal). By operating these two channels S+BG and BG simultaneously, a simultaneous collection of both signal and background photons may be realized.

Some advantages of the embodiment of FIG. 23 over temporal multiplexing between signal and background may include (but are not limited to): an increase in integration time of the signal (because no time is "wasted" switching to "only BG" collection); and simultaneous sampling of S+BG and BG allows for other electrical embodiments whereby analog signals from each channel could be subtracted in real time. Some disadvantages may include (but are not limited to): additional "real estate" or area per pixel (e.g., a larger footprint) in the focal plane, which may reduce pixel count (for a same size array) or increase area of the array (to achieve the same pixel count); different optical bandpass filters to be applied to either or both of the two sub-pixels. The different optical bandpass filters may be implemented using micro-transfer printing techniques in some embodiments. In further embodiments, different optical bandpass filters may be implemented by standard optical filter deposition and growth approaches in combination with photolithographic masking methods and processes.

Figure 24A:
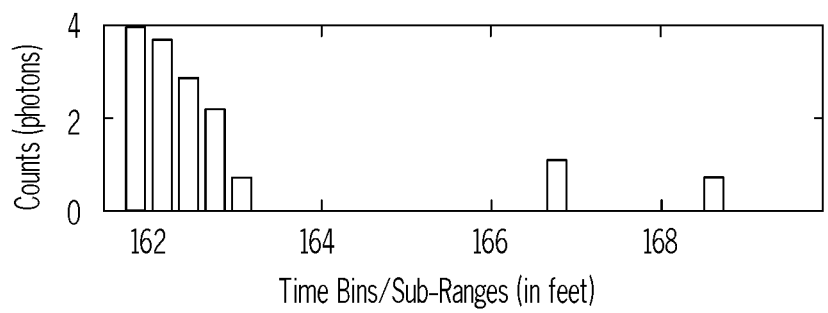
FIG. 24A and FIG. 24B are graphs illustrating operations for phase shifting to correct for distributions of detected photons that may span two subframes in accordance with some embodiments described herein.
Figure 24B:
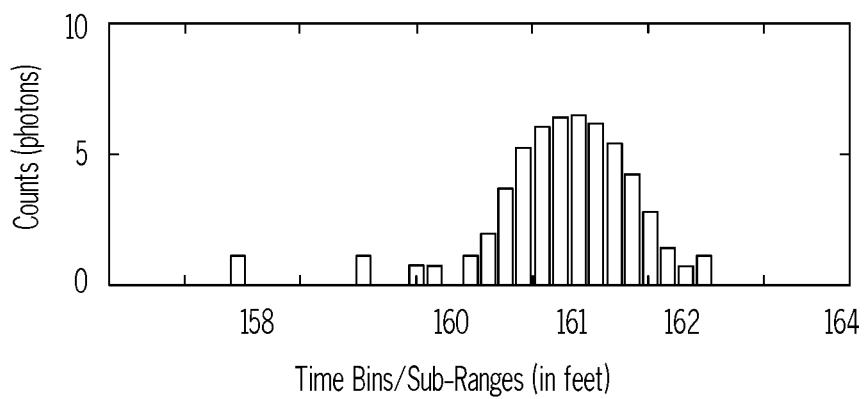

FIG. 24A and FIG. 24B illustrate operations for phase shifting to correct for a distribution of detected photons that may span two subframes in accordance with embodiments of the present disclosure. In particular, in some instances, the laser signal echoes reflected from a target may span two subframes. Each subframe may span a part of a complete frame, with each complete frame corresponding to a distance range being imaged. Each subframe may also include data for a respective strobe window of the detector array, with each strobe window corresponding to a respective sub-range of the distance range being imaged. A histogram of such arrivals (e.g., photon arrivals) is shown in FIG. 24A, where the horizontal axis represents the bins of time from or relative to a reference time (e.g., laser emission/firing), and can likewise represent bins of calculated range from a LIDAR system. The vertical axis represents the number of counts (e.g., photon counts) collected in each time bin (or sub-range of the distance range being imaged).

The time-distribution of times-of-arrival (TOAs) can extend beyond the limit of a sub-frame, where each sub-frame includes data for one strobe window. Because a pixel (which may include one or more detectors) as described in some embodiments herein may not output a histogram, but rather, a scalar value indicating the average over all integrated avalanche times, such a distribution can result in an erroneous estimation of the actual mean of arrival times. Some embodiments described herein provide methods and circuits that may alleviate such errors.

In particular, a timing circuit (which may be implemented by any of the control circuits described herein, e.g., 105, 205) is operable to control the subframe or sub-range limits of the detector array (e.g., 110, 210), for example, a SPAD-based or other detector array, for example, by altering timing and/or durations of the corresponding strobe windows. These time limits specify when the SPAD devices of the detector array are charged/activated to detect photons and generate detection signals responsive to avalanche events. In some embodiments, an alternating pattern of subframe limits can be employed to address instances in which the echoes from a single target span two subframes. In some embodiments, the time limits for subframes of respective detectors may be controlled by altering a duration/strobe window for which respective detectors of the array are activated, for example, using a time gating scheme, including but not limited to providing different ranges for different detectors at different positions of the array.

In the example of FIG. 24A and FIG. 24B, a target may be at a range of 161 meters (m) from the array, and the echoes may be distributed to times corresponding to ranges of 159 m to 163 m. A first frame may include a first subframe corresponding to a range of 150 m-160 m, and a second subframe corresponding to 160 m-170 m. The pixel may calculate a first target around 159 m for the first sub-frame, and (as shown in FIG. 24A) a second target around 162 m in the second sub-frame; however, both of these calculations are erroneous.

According to some embodiments described herein, a phase-shifted sequence of sub-frames is driven by the timing circuit, which may provide strobe signals that alter the timing and/or durations of the strobe windows of the detector array. In this example, the phase-shifted frames include subranges of 155 m-165 m and 165 m-175 m, such that no target is calculated for the first subframe (corresponding to the range of 150 m-160 m) and a target is calculated for the second subframe (corresponding to 160 m-170 m) at the correct range of 161 m (as shown in FIG. 24B).

In some embodiments, the timing circuitry is configured to continuously alternate or otherwise adjust the subframe boundaries. In some embodiments, the timing circuitry is configured to vary the subframe boundaries from frame to frame. In some embodiments, the timing circuitry is configured to vary the sub-frame boundaries if (and/or only if) targets are identified in adjacent sub-frames.

In some embodiments, methods of alternating sub-frame boundaries may be used to distinguish spurious noise from desired optical signals emitted by the emitter array. By way of explanation, if a background or ambient light levels are perfectly uniform, the measured TOA would be the center of the sub-frame. Methods of alternating boundaries as described herein may address (but are not limited to) the following scenarios which can lead to errors. In one example, a target may be located at the center of the subframe, e.g., at a distance that is equally spaced from the bounds of the range covered by the subframe (e.g., at a distance of 165 m in the example second subframe above), which could be construed as a perfectly symmetrical noise, and detection of the target might thus be missed by the LIDAR. Upon alternating to a phase-shifted frame in accordance with embodiments described herein, two targets may be identified (one at the 155 m-165 m phase-shifted subframe, and another at the 165 m-175 m phase-shifted subframe), and a processing unit that receives the detector output can infer the correct position of the target. Similarly, the noise may not be perfectly symmetrical and a false target reading may result, for example, indicating that a target is present at a distance of 166 m. During the phase-shifted frame in accordance with embodiments described herein, since no target is detected in the 155 m-165 m sub-frame and a stronger bias may be required to result in a mean range of 166 m in the 165 m-175 m sub-frame, the first reading can be tagged or otherwise identified by the processing unit as false.

As discussed above with reference to FIGS. 1-3, some embodiments described herein are directed to methods of fabricating and operating a tunable optical filter (e.g., tunable filter 212, 312), whose pass band can track or otherwise be varied to correspond to the light emission band or wavelength range of one or more LIDAR emitters (e.g., of arrays 115, 215), for example, in response to a change in the emitters' operating temperature (e.g., as indicated by temperature monitor 213). Tuning of the variable optical filter may be implemented by actuation of one or more actuator elements (e.g., 344) by a control circuit. In some embodiments, controlling the tilting of the optical filter to provide a desired tilt angle in response to actuation of the one or more actuator elements may affect or alter the optical transmission characteristics of the filter. For example, the filter may be configured to transmit shorter wavelengths of light as the tilt angle increases relative to the normal angle of incidence.

Figure 25A:
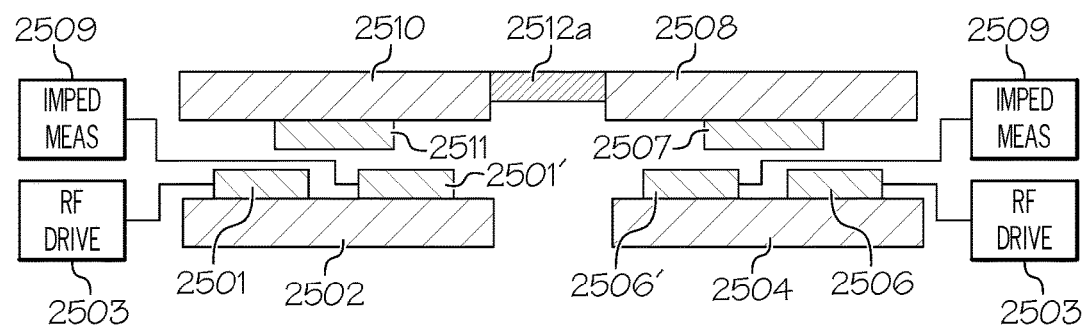
FIGS. 25A and 25B are block diagrams illustrating examples of tunable optical filter configurations in accordance with some embodiments described herein.
Figure 25B:
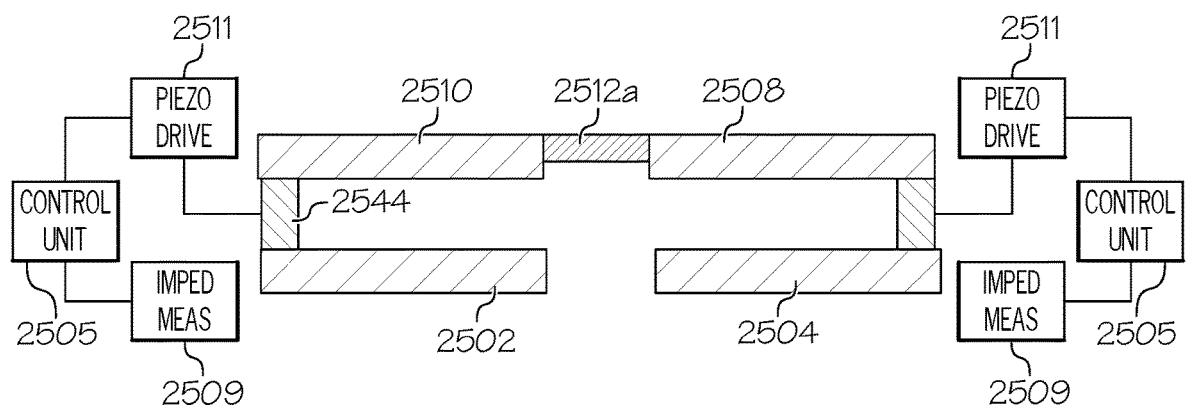
Figure 26:
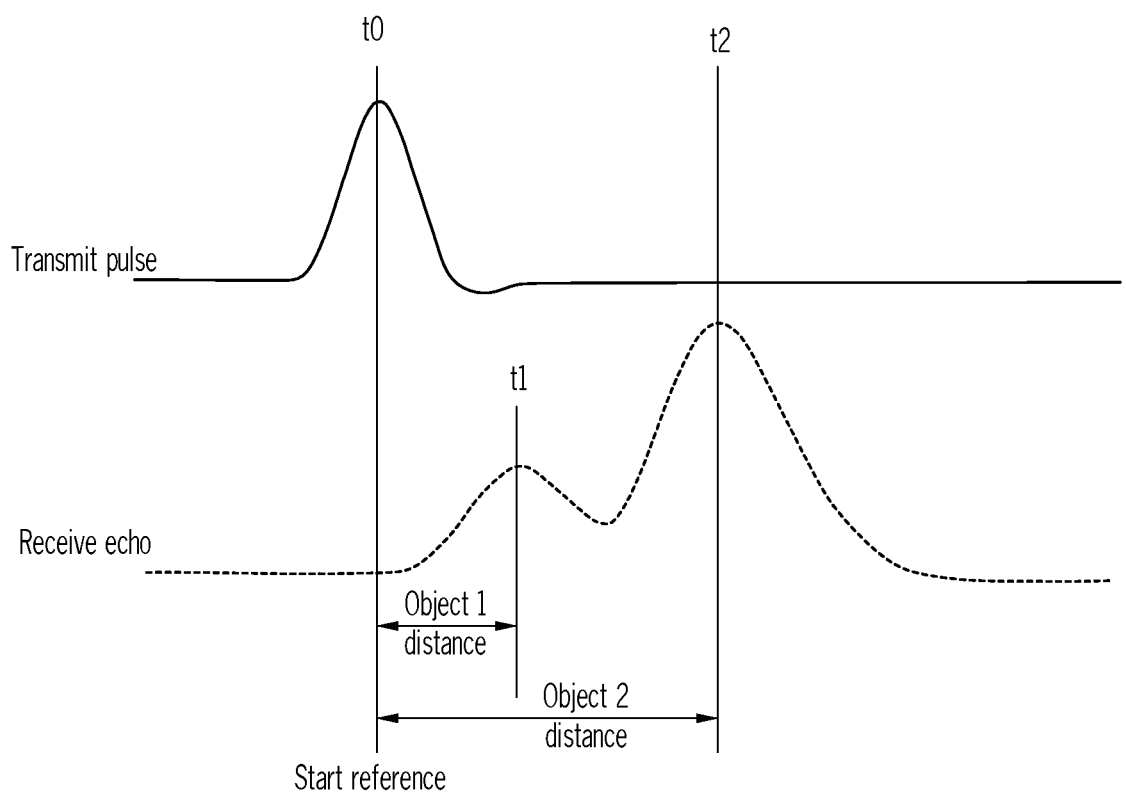
FIG. 26 is a diagram illustrating operational principles of SPADs that may be used in conjunction with LIDAR systems and measurement circuits in accordance with some embodiments described herein.

In some embodiments, as shown in FIGS. 25A and 25B, the variable or tunable optical filter 2512 may be controlled by actuators, such as piezoelectric actuators. For example, in FIG. 25A, an optical narrowband filter 2512 is mechanically-coupled to one or more electrodes 2507, 2511. In the example of FIG. 25A, the filter 2512 is mounted on a rigid substrate (e.g., a printed circuit board (PCB)) 2508, 2510 that includes the electrodes 2507, 2511 thereon at opposite sides of the filter 2512. Alternatively, the one or more electrodes 2507, 2511 may be deposited on the filter 2512 itself, for example by sputtering, by chemical vapor deposition, or other deposition methods.

In some embodiments, a substrate 2502, 2504 includes at least one electrode 2501, 2501', 2506, 2506' on a surface thereof facing the electrodes 2507, 2511. An impedance measurement circuit 2509 is coupled to two of the electrodes 2501', 2506', and a voltage driving circuit 2503 is coupled to the impedance-measurement circuit 2509. The voltage driving circuit 2503 provides a radio-frequency (RF) voltage signal to two of the substrate electrodes 2501, 2506. The RF signal is capacitively coupled to the floating PCB electrodes 2507, 2511 and back to substrate electrodes 2501', 2506'. The impedance measurement circuit 2509 measures the impedances across both paths (for example, 2501→2511 and 2511→2501', or 2506→2507 and 2507→2506').

In some embodiments, mounted filter 2512 is attached to a substrate 2502, 2504 through at least one actuator 2544. For example as shown in FIG. 25B, the mounted filter 2512 may be attached to the substrate 2502, 2504 through two piezoelectric crystals as the actuators 2544, which may be controlled by a piezoelectric drive 2511 based on the impedance measurements from the impedance measurement circuit 2509.

A control circuit 2505 may receive as input the two measured impedances from the impedance measurement circuit 2509, a temperature measurement from the emitter array (e.g., from temperature monitor 213), and data from a calibration table (having entries for impedance as a function of angle). The control circuit 2505 generates voltages to drive the an electrostatic force between pairs of electrodes 2501, 2511/2506, 2507 or actuate piezoelectric stages 2544 such that the transmission spectrum of the filter 2512 tracks or corresponds to the emission spectrum of the emitter.

In some embodiments, a calibration process may be performed to generate lookup tables. For example, in some embodiments, a sequence of voltages may be applied to the piezoelectric elements 2544 while a broadband collimated source illuminates the filter. A spectrometer on the opposite side of the filter may measure the transmitted spectrum. The impedance measurement circuit 2509 may measure the impedance at either side of the filter 2512. Using the formula for transmission wavelength $\lambda(\theta)$ dependence on angle of incidence $\theta$, where $\lambda_0$ is wavelength at normal incidence and $n_{\text{eff}}$ is the effective index of refraction, $$\lambda(\theta) = \lambda_0 \sqrt{1 - (\sin\theta/n_{\text{eff}})^2}$$

a table may be generated, including measured impedances as a function of each tilt angle. In some embodiments, this calibration may be conducted for a plurality of temperatures or temperature ranges. In some embodiments, a temperature correction factor may be applied to the impedance measurement in order to fit to the correct or corresponding tilt angle. In some embodiments the calibration table is stored in a memory that is accessible to the control circuit 2505.

In some embodiments, the temperature dependence of emission wavelength may be known, e.g., 0.08 nm per degree Celsius. In some embodiments, during operation, a temperature sensor (e.g., 213) may measure the temperature of the emitter array and may transmit this information to the control circuit 2505 or other processing unit. The processing unit may determine the set of impedances corresponding to the tilt angle which matches with the measured emitter temperature. The processing unit may also receive inputs from the impedance measurement circuits 2509, and may determine whether the drive voltage to either of the piezo actuators 2544 should be increased or decreased. Operations may continue until the desired impedance values are reached.

In some embodiments, actuation may be implemented via magnets instead of piezoelectric elements, and the magnitude of the tilt force can be controlled by adjusting a current through coils on the substrate.

In some embodiments, actuation may be implemented via an electrostatic force between pairs of electrodes acting as capacitors. For example and without loss of generality, the electrodes 2507, 2511 on the filter PCB 2508, 2510 may be negatively charged. When the distance between a pair of electrodes on one side of the filter 2512 should be increased to achieve a desired tilt, negative charge is applied to the substrate electrode(s) 2501 or 2506 on that side of the filter 2512, or vice versa.

In some embodiments, actuation may be implemented mechanically. For example, rotation of a screw may be utilized to push or pull one side of the filter 2512 in order to effect the desired tilt.

Further embodiments described herein are directed to tuning the optical pass band of a variable or tunable optical filter (e.g., tunable filter 212, 312) by temperature tuning. In particular, rather than (or in addition to) varying the mechanical position of the optical pass band filter, the temperature of the filter may be varied to affect or alter the optical transmission characteristics of the filter. In order to realize such a system, the temperature coefficient of the optical pass band may be characterized and known (for example, via a calibration process) such that the desired temperature of the variable optical filter can be set and varied in accordance with variations of the wavelength of the emitter. Optical filters typically have some, albeit small, dependence on temperature. This dependence can be complex and may result from various effects including (but not limited to) changes in density and refractive index of the materials in the thin film filter, as well as changes in the physical thickness of the layers (e.g., the thin film layers) in the stack resulting from thermal expansion. The temperature coefficient of many dielectric filters may be less than the temperature coefficient of the emitter (e.g. for VCSELs, 0.06 nm/degree), such that a temperature tuned optical bandpass filter may be based on dielectric stacks.

Another approach to provide temperature tunable optical filters in accordance with embodiments described herein may be to incorporate the same material set used for the emitters (e.g., the same materials as an output coupler distributed Bragg reflector (DBR) of emitter VCSELs) as the bandpass filter on the receiver/detector. For example, in some embodiments, a temperature tunable optical filter may be an AlGaAs/GaAs DBR that is deposited on top of a GaAs substrate (with bandgap large enough to allow transparency to desired photon wavelengths, e.g. 940 nm). Because the same materials and designs are used in this temperature-tuned bandpass filter (e.g., with respect to the emitter active region), the characteristics of the optical filter will vary with temperature in the same way as the emitter. Some embodiments described herein may thermally couple the two (emitter and receiver/detector bandpass filter) in a passive way, such that the temperature of the variable optical bandpass filter can be maintained equal to (or at a constant offset relative to) that of the emitter, and the pass band of the filter on the receiver/detector would vary with the wavelength of the emitter.

Figure 22:
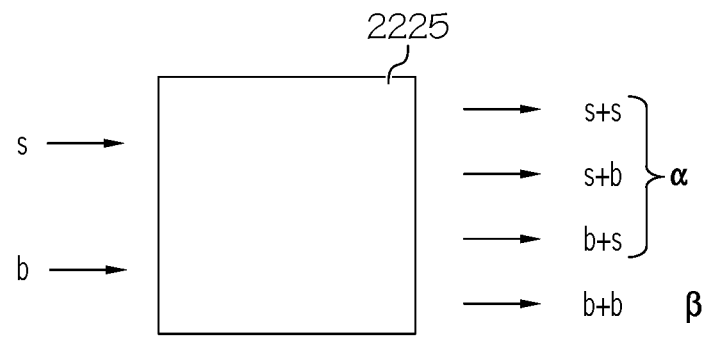
FIG. 22 is a block diagram illustrating example operation of a correlator circuit in accordance with some embodiments described herein.

Further embodiments relating to correlation and background correction are described below with reference to FIG. 22. In particular, the correlator circuit may be configured to generate a correlation signal only when a pair of avalanche events occur within the predetermined correlation time or time window specified by the correlator circuit. As shown in FIG. 22, embodiments herein may be used to distinguish between two types of correlation signal outputs: those that result from detection signals generated responsive to at least one of the input avalanches being a signal photon "s" (designated a or "alpha") and those which result from detection signals generated responsive to input avalanche event pairs that result only from background photons "b" (designated (3 or "beta").

The calculated average time of arrival may be polluted by detection of background photons. The calculated average time of arrival over the correlator outputs ($t_{meas1}$) may be a random variable (R.V.) that is a function of other random variables:

$$t_{meas1} = \frac{\left(\sum_i^{N_\alpha} t_\alpha(i)\right) + \left(\sum_i^{N_\beta} t_\beta(i)\right)}{N_\alpha + N_\beta} \quad \text{(Eq. 1)}$$

$$t_{meas1} = \frac{T_\alpha + T_\beta}{N_\alpha + N_\beta}$$

Each of the variables in $t_{meas1}$ may be a random variable. Determining the distribution of $t_{meas1}$ can be performed by: (1) computing $t_{meas1}$ repeatedly in a monte carlo fashion; (2)

algebraically combining the analytical expressions for the distributions of each of the four R.V. on the right hand side (RHS) of Eq. 1. Expressions for the distributions of the variables on the RHS are provided for both of these alternatives below.

One way to model the distributions for each of these random variables is with a Gaussian normal distribution. A basis for doing so is the central limit theorem, which indicates that a distribution which will govern the sum of any large number of random variables is a Gaussian. The conditions of the central limit theorem may generally be fulfilled in the random variables above. The mean value of the distribution for each random variable may be:

$$\overline{N_\alpha} = p_\alpha \times N_{opp} \quad \text{(Eq. 2)}$$

$$\overline{N_\beta} = p_\beta \times N_{opp}$$

$$\overline{T_\alpha} = \left(t_{target} + \frac{t_p}{2}\right) \times N_\alpha$$

$$\overline{T_\beta} = \frac{T_{gate}}{2} \times N_\beta$$

where $t_{target}$=the actual time of flight; $t_p$=pulse width; and $p_\alpha$, $p_\beta$, and $N_{opp}$ are defined below. Eq. 2 above provides half the parameters to define Gaussian distributions (the expectation values). As it may be difficult is to determine what the standard deviation for these Gaussian distributions should be, the description below looks at each random variable individually to determine the analytic function governing its distribution.

Using the random variables $N_\alpha$ and $N_\beta$, which are the total number of correlator outputs (within a given strobe gate) after integration over one frame corresponding to case $\alpha$ or $\beta$ as described above, the probability distribution of some number of events occurring may be a Bernoulli process assuming that the probabilities for each individual events are "IID" (independent and identically distributed). The probability of a "beta output" of the correlator can be similarly considered: over the course of integration there may be $N_{opp}$=# opportunities for the correlator to output a correlation signal in regard to the beta event occurring. In other words, over the time span of one time window on the correlator, there may be two possibilities: it can report a beta correlation event or not. The number of opportunities for a correlator output, i.e. $N_{opp}$, should be equal to the total integration time divided by the time window duration:

$$N_{opp,\beta} = \left(\frac{T_{gate}}{t_{win}}\right) \times (\text{\# dwells on gate per frame}) \quad \text{(Eq. 3)}$$

$$N_{opp,\beta} = \left(\frac{T_{gate}}{t_{win}}\right) \times \left(\frac{T_{frame}}{T_{laser\,cycle}} \frac{1}{N_{gates}}\right)$$

If the conditions for a Bernoulli process are fulfilled by this interpretation of the correlator output, then the formula for the probability distribution of the number of Bernoulli successes can be used to describe the total number of beta outputs of the correlator:

$$PDF_{gate}(N_\beta) = \binom{N_{opp}}{N_\beta} \times p_\beta^{N_\beta} \times (1 - p_\beta)^{N_{opp}-N_\beta} \quad \text{(Eq. 4)}$$

where the probability of a beta output at each opportunity is given by the Poisson probability of two (or more, k>=2) events occurring during the time window:

$$p_\beta = p_b(k \geq 2; \overline{n_b}) = 1 - p_b(k=1; \overline{n_b}) - p_b(k=0; \overline{n_b}) p_\beta = p_b$$

$$(k \geq 2; \overline{n_b}) = 1 - (\overline{n_b}+1) \times e^{\overline{n_b}} \quad \text{(Eq. 5)}$$

where the expected number of avalanche arrivals (resulting from BG photons) during the time window is the product of the average bg photon arrival rate, b, and the duration of the correlator time window, $t_{win}$:

$$\overline{n_b} = b \times t_{win} \quad \text{(Eq. 6)}$$

The beta outputs (i.e. coincidences between two BG photons only) are addressed in the above examples. For the alpha outputs, it may be re-examined how many opportunities there are and how the probability of a correlator output is different for alpha outputs, which consider the combination of signal and background.

Rather than focus only on alpha outputs (i.e. s+s, s+b, b+s only) and exclude beta outputs (b+b), some embodiments may compute the probability distribution for all possible correlator outputs, and then subtract the probability associated with only beta outputs.

In focusing on total number of events when the signal plays a role, the number of possible events may be restricted to only the time within the return of the pulse echo (i.e. inside the pulse width only). In some examples, only the case where the correlation time window is shorter than the pulse duration ($t_{win} < t_p$) may be considered. In this case, there may be ($t_p/t_{win}$) of these opportunities per gate period (assuming a pulse is in the gate). Therefore, the number of opportunities (for either alpha or beta output) is now:

$$N_{opp(\alpha+\beta)} = \left(\frac{t_{pulse}}{t_{win}}\right) \times \left(\frac{T_{frame}}{T_{laser\,cycle}} \frac{1}{N_{gates}}\right) \quad \text{(Eq. 7)}$$

Likewise, the probability of a correlation signal during one of these opportunities follows the same form as above, $$p_{\alpha+\beta} = p_{s+b}(k \geq 2; \overline{n_{s+b}}) = 1 - (\overline{n_{s+b}}+1) \times e^{\overline{n_{s+b}}}$$

but the expected number of photon arrivals during this opportunity may be higher according to the higher rate of signal photons arriving:

$$\overline{n_{s+b}} = (s+b) \times t_{win} \quad \text{(Eq. 8)}$$

The probability distribution for number of (alpha or beta) correlator outputs that result from the time period of the pulse only, then, may be:

$$PDF_p(N_{\alpha+\beta p}) = \quad \text{(Eq. 9)}$$

$$\binom{N_{opp(\alpha+\beta)}}{N_{\alpha+\beta p}} \times p_{\alpha+\beta}^{N_{\alpha+\beta p}} \times (1 - p_{\alpha+\beta})^{N_{opp(\alpha+\beta)}-N_{\alpha+\beta p}}$$

where $\beta_p$ refers to only beta correlations that occur during the pulse, as opposed to any other time during the gate.

The PDF (probability density function) for the number of alpha outputs only may be desired, and an expression for this may be determined by computing the PDF for the number of beta events that occur during the pulse only, $N_{\beta p}$.

$$PDF_p(N_{\beta p}) = \binom{N_{opp(\alpha+\beta)}}{N_{\beta p}} \times p_\beta^{N_{\beta p}} \times (1-p_\beta)^{N_{opp(\alpha+\beta)}-N_{\beta p}} \quad \text{(Eq. 10)}$$

Combining these two functions may yield:

$$PDF(N_\alpha) = PDF(N_{\alpha+\beta} - N_{\beta p}) =$$

$$\binom{N_{opp(\alpha+\beta)}}{N_{\alpha+\beta} - N_{\beta p}} \times p_\beta^{N_{\alpha+\beta}-N_{\beta p}} \times (1-p_\beta)^{N_{opp(\alpha+\beta)}-(N_{\alpha+\beta}-N_{\beta p})}$$

The random variable $T_\beta$ may refer to the sum of all beta correlator outputs which result from coincidences of background photons within the correlation time window of the correlator. The distribution of these events may be uniformly distributed across the duration of the gate, $0 \ldots T_{gate}$. The expectation value for the uniformly distributed random variables, $t_\beta(i)$, is $\frac{1}{2} T_{gate}$. The distribution may be the "Irwin Hall" distribution or the uniform sum distribution. Substituting appropriately, the expression for the distribution of possible values about the expected value ($\frac{1}{2}$ Tgate) may be:

$$PDF_{T_\beta}(T_\beta; N_\beta) = \quad \text{(Eq. 11)}$$

$$\frac{1}{2(N_\beta - 1)!} \sum_{k=0}^{N_\beta} (-1)^k \binom{N_\beta}{k} \left(\frac{T_\beta}{T_{gate}} - k\right)^{n-1} \text{sgn}\left(\frac{T_\beta}{T_{gate}} - k\right)$$

This distribution may depends on the number of instances, $N_\beta$, of the random variable, $t_\beta(i)$ that contribute to the sum, $T_\beta$. The larger $N_\beta$ the tighter the distribution and the more likely that it approximates the expectation value.

Furthermore, $T_\beta$ and $N_\beta$ may be "linked." For example, if a particular value is used for $N_\beta$, (e.g., 113), then the exact same number (113) may be used when generating the value for $T_\beta$ (i.e., $N_\beta$ may not be re-generated for the purposes of generating $T_\beta$). References for distribution of sum & mean of uniformly distributed random variables:

Irwin Hall (sum):

$$X = \sum_{k=1}^n U_k. \quad fx(x; n) = \frac{1}{2(n-1)!} \sum_{k=0}^n (-1)^k \binom{n}{k} (x-k)^{n-1} \text{sgn}(x-k)$$

Bates (average):

$$X = \frac{1}{n}\sum_{k=1}^n U_k. \quad fx(x; n) = \frac{n}{2(n-1)!} \sum_{k=0}^n (-1)^k \binom{n}{k} (nx-k)^{n-1} \text{sgn}(nx-k)$$

For the random variable $T_\alpha$ (assuming that the $t_{window} \ll t_{pulse} = t_p$), correlator events which result from the coincidence of at least one signal photon avalanche, by definition, occur within the time of the pulse duration: $t_{target} < t_\alpha(i) < t_{targ} + t_{pulse}$. For the duration of the (square) pulse, it may be assumed that the likelihood of all values within this domain is uniform. Thus, the problem may be considered as identical to the one for Tb or $T_\beta$, with a difference being that the time domain over which correlator events may occur is different: roughly, $T_{gate} \rightarrow T_{pulse}$ Additionally the number of events expected may be different, $N_\beta \rightarrow N_\alpha$. Making these substitutions, a PDF which is defined only on the interval $(0 \ldots t_{pulse}) + t_{target}$ may be derived:

$$PDF_{T_\alpha}(T_\alpha; N_\alpha) = \quad \text{(Eq. 12)}$$

$$\frac{1}{2(N_\alpha - 1)!} \sum_{k=0}^{N_\alpha} (-1)^k \binom{N_\alpha}{k} \left(\frac{T_\alpha}{t_p} - k\right)^{N_\alpha - 1} \text{sgn}\left(\frac{T_\alpha}{t_p} - k\right)$$

This distribution may be defined only within the pulse duration, and may be zero otherwise. Further, the larger that Na is the closer the PDF approximates a delta function centered on $t_{targ} + \frac{1}{2} t_p$. Given these considerations, the limiting case may be considered:

$$\lim_{N_\alpha \rightarrow \text{large}} T_\alpha = t_{targ} + \frac{1}{2} t_p \quad \text{(Eq. 13)}$$

In implementing background correction in accordance with some embodiments described herein, the expression (Eq. 1) describes a random variable that represents a given measurement of the average time of arrival of correlator output events in the presence of both signal and background. Further, the random variables which make up the right hand side of Eq. 1 have been described with analytic expressions for their probability distributions. The time of arrival of signal photons "s" is designated $t_{targ}$ in the expressions above and is measured as a value within the domain $0 \ldots T_{gate}$.

To recover the value of $t_{targ}$ given the knowledge of each of the other quantities in Eq. 1, the limit described in Eq. 13 can be substituted into Eq. 1 for Ta (or $T_\alpha$):

$$t_{meas1} = \frac{T_\alpha + T_\beta}{N_\alpha + N_\beta} = \frac{\left(t_{targ} + \frac{1}{2} t_p\right) + T_\beta}{N_\alpha + N_\beta} \quad \text{(Eq. 14)}$$

rearranging to isolate the desired quantity:

$$t_{targ} = (N_\alpha + N_\beta) t_{meas1} - T_\beta - \frac{1}{2} t_p \quad \text{(Eq. 15)}$$

Combination of multiple random variables with their PDFs can be accomplished by considering error propagation models. Eq. 1 (or Eq. 14) may be used to derive a representation of the PDF for $t_{meas1}$ on the right hand side. Likewise, the distribution of actual outcomes for $t_{targ}$ (in Eq. 15) may be determined. In some embodiments, BG correction based on analysis above may be implemented as follows:
1. Select a "true" value for $t_{targ}$, $t_{targ,true}$.
2. Select parameter values:
   a. $t_p$=duration of pulse; Tgate=duration of gate;
   b. s=rate of signal photon arrivals (during the pulse only)
   c. b=rate of background photon arrivals (over entire gate)

d. $T_{integ}$=time of integration on this pixel. In case of flash LIDAR set this to the frame duration e. $N_{gates}$=number of strobe gates that have to share the total integration time.

3. compute PDFs functions
4. Begin a single iteration (e.g., of monte carlo analysis) for given integration time. Note: a single iteration may have a determined number of laser cycles and value for $N_{opp}$, etc. This single iteration may generate a unique set of values for:

a. $N_\alpha$
   b. $N_\beta$
   c. $T_\beta$
   d. And $t_{meas1}$=Eq. 14.

5. Repeating the iterations in step 4 may yield a distribution for $t_{meas1}$
6. For each of the iterations in step 4 that are used to compute $t_{meas1}$ a second set of background values can be computed (indicated by a prime):

a. $N'_\beta$
   b. $T'_\beta$

7. The error for each iteration can be computed by:

$$\text{error} = (t_{targ} - t_{targ_{true}}) = (N_\alpha + N'_\beta) t_{meas1}^{montecarlo} - T'_\beta - \frac{1}{2} t_p$$

where $t_{meas1}$ (monte carlo) on the RHS is from step 4 but the other quantities are from step 6.

Accordingly, embodiments described herein provide integrated solid-state systems that can identify and localize objects in three dimensions and at varying sunlight conditions. In some embodiments, the system includes a pulsed light source, a detector with an array of single-photon avalanche detectors (SPADs) and on-chip data reduction or minimization circuitry, and a control and processing unit. A substrate with at least one laser source is driven to emit a train of pulses which illuminate a wide and deep field of view. Reflected optical signals are filtered to remove ambient light and trigger avalanches in individual pixels in the SPAD array. Processing circuitry reduces the amounts of generated data to a voltage corresponding to the distance between a target and the sensor for a given azimuth and altitude. A processing unit generates a three-dimensional point cloud.

Some embodiments described herein may be applied to LIDAR systems for use in, for example, ADAS (Advanced Driver Assistance Systems), autonomous vehicles, UAVs (unmanned aerial vehicles), industrial automation, robotics, biometrics, modeling, augmented and virtual reality, 3D mapping, and security. In some embodiments, the emitter elements of the emitter array may be vertical cavity surface emitting lasers (VCSELs). In some embodiments, the emitter array may include a non-native substrate having thousands of discrete emitter elements electrically connected in series and/or parallel thereon, with the driver circuit implemented by driver transistors integrated on the non-native substrate adjacent respective rows and/or columns of the emitter array, as described for example in U.S. Provisional Patent Application No. 62/484,701 entitled "LIGHT DETECTION AND RANGING (LIDAR) DEVICES AND METHODS OF FABRICATING THE SAME" filed Apr. 12, 2017, and U.S. Provisional Patent Application No. 62/613,985 entitled "ULTRA-SMALL VERTICAL CAVITY SURFACE EMITTING LASER (VCSEL) AND ARRAYS INCORPORATING THE SAME" filed Jan. 5, 2018, with the United States Patent and Trademark Office, the disclosures of which are incorporated by reference herein.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment", "one embodiment" and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts. The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

Spatially relative terms, such as "beneath," "below," "bottom," "lower," "above," "top," "upper," and the like, may be used herein for ease of description to describe one element's or feature's relationship to another element(s) or feature(s) as illustrated in the Figures. It will be understood that the spatially relative terms are intended to encompass different orientations of the device in use or operation in addition to the orientation depicted in the Figures. For example, if the device in the Figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers may also be present.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present inventive concept.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. In no event, however, should "on" or "directly on" be construed as requiring a layer to cover an underlying layer.

Embodiments are described herein with reference to cross-sectional and/or perspective illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concepts.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the present invention being set forth in the following claims.

That which is claimed:

1. A Light Detection And Ranging (LIDAR) apparatus, comprising:
   a pulsed light source configured to emit optical signals;
   a detector array comprising single-photon detectors that are configured to output respective detection signals indicating respective times of arrival of a plurality of photons incident thereon, wherein the photons comprise signal photons having wavelengths corresponding to the optical signals from the pulsed light source and background photons having wavelengths corresponding to at least one other light source; and
   processing circuitry configured to receive the respective detection signals output from the single-photon detectors, wherein the processing circuitry comprises one or more of:
      a recharge circuit configured to activate and deactivate subsets of the single-photon detectors for respective strobe windows between pulses of the optical signals and at respective delays that differ with respect to the pulses, responsive to respective strobing signals;
      a correlator circuit configured to output respective correlation signals representing detection of one or more of the photons whose respective time of arrival is within a predetermined correlation time relative to that of at least one other of the photons;
      a time processing circuit comprising a counter circuit configured to increment a count value responsive to the respective correlation signals or detection signals, and a time integrator circuit configured to generate an integrated time value based on the respective times of arrival indicated by the respective correlation signals or detection signals with respect to a reference timing signal,
      wherein a ratio of the integrated time value to the count value indicates an average time of arrival of the photons.

2. The LIDAR apparatus of claim 1, further comprising:
   a tunable optical filter element arranged to transmit the photons that are incident on the detector array, the tunable optical filter element having a transmission band that is configured to vary based on a spectrum of the optical signals output from the pulsed light source, a temperature of the pulsed light source, and/or a temperature of the tunable optical filter element.

3. The LIDAR apparatus of claim 1, wherein the processing circuitry further comprises:
   a first channel that is configured to provide output values responsive to a first subset of the detection signals indicating the respective times of arrival of the plurality of photons comprising the signal photons and the background photons;
   a second channel that is configured to provide reference values responsive to a second subset of the detection signals indicating the respective times of arrival of the background photons; and
   a control circuit that is configured to calculate an estimate of the average time of arrival of the photons based on a relationship between the output values and the reference values.

4. The LIDAR apparatus of claim 1, wherein the processing circuitry is integrated in a same chip or package with the detector array, wherein the single-photon detectors are single-photon avalanche detectors (SPADs).

5. The LIDAR apparatus of claim 4, further comprising:
a control circuit that is configured to generate the respective strobing signals and/or calculate an estimate of the average time of arrival of the photons.

6. A Light Detection And Ranging (LIDAR) measurement device, comprising:
a detector array comprising single-photon detectors that are configured to output respective detection signals indicating respective times of arrival of photons incident thereon, wherein the photons comprise signal photons having wavelengths corresponding to optical signals output from a pulsed light source; and
processing circuitry comprising a recharge circuit that is configured to activate and deactivate subsets of the single-photon detectors for respective strobe windows between pulses of the optical signals and at respective delays that differ with respect to the pulses, responsive to respective strobing signals.

7. The LIDAR measurement device of claim 6, wherein durations of the respective strobe windows differ.

8. The LIDAR measurement device of claim 7, wherein a time between the pulses of the optical signals corresponds to a distance range, and wherein the durations of the respective strobe windows differ according to sub-ranges of the distance range.

9. The LIDAR measurement device of claim 6, wherein the recharge circuit is configured to activate and deactivate the subsets of the single-photon detectors for the respective strobe windows responsive to the respective strobing signals based on relative positions of the subsets of the single photon detectors in the detector array.

10. The LIDAR measurement device of claim 6, wherein the recharge circuit is configured to dynamically adjust the durations of the respective strobe windows responsive to the respective strobing signals.

11. A Light Detection And Ranging (LIDAR) measurement device, comprising:
a detector array comprising single-photon detectors that are configured to output respective detection signals indicating respective times of arrival of a plurality of photons incident thereon, wherein the photons comprise signal photons having wavelengths corresponding to optical signals output from an emission source and background photons having wavelengths corresponding to at least one other light source; and
processing circuitry configured to receive the respective detection signals output from the single-photon detectors, wherein the processing circuitry comprises:
a time processing circuit comprising a counter circuit configured to increment a count value responsive to the respective detection signals, and a time integrator circuit configured to generate an integrated time value based on the respective times of arrival indicated by the respective detection signals with respect to a reference timing signal,
wherein a ratio of the integrated time value to the count value indicates an average time of arrival of the photons.

12. The LIDAR measurement device of claim 11, wherein the processing circuitry further comprises:
a recharge circuit that is configured to activate and deactivate subsets of the single-photon detectors for respective strobe windows between pulses of the optical signals and at respective delays that differ with respect to the pulses, responsive to respective strobing signals.

13. The LIDAR measurement device of claim 11, wherein the processing circuitry further comprises:
a correlator circuit that is configured to receive the respective detection signals and output respective correlation signals representing detection of one or more of the photons having a respective time of arrival within a predetermined correlation time relative to that of at least one other of the photons,
wherein the counter circuit is configured to increment the count value responsive to a subset of the respective detection signals corresponding to the correlation signals, and the time integrator circuit is configured to integrate the respective times of arrival indicated by the subset of the respective detection signals corresponding to the correlation signals.

14. The LIDAR measurement device of claim 11, further comprising:
a tunable optical filter element arranged to transmit the photons that are incident on the detector array, the tunable optical filter element having a transmission band that is configured to vary based on a spectrum of the transmitted optical signals and/or temperature of the emission source.

15. The LIDAR measurement device of claim 11, wherein the time processing circuit comprises a first channel that is configured to provide the count value and the integrated time value responsive to a first subset of the detection signals indicating the respective times of arrival of the plurality of photons comprising the signal photons and the background photons, and a second channel that is configured to provide a reference count value and a reference integrated time value responsive to a second subset of the detection signals indicating the respective times of arrival of the background photons, and further comprising:
a control circuit that is configured to calculate an estimate of the average time of arrival of the photons based on relationships between the integrated time value and the reference integrated time value, and between the count value and a reference count value.

16. A Light Detection And Ranging (LIDAR) measurement device, comprising:
a detector array comprising single-photon detectors that are configured to output respective detection signals indicating respective times of arrival of a plurality of photons incident thereon; and
processing circuitry configured to receive the respective detection signals output from the single-photon detectors, wherein the processing circuitry comprises:
a correlator circuit that is configured to output respective correlation signals representing detection of one or more of the photons whose respective time of arrival is within a predetermined correlation time relative to that of at least one other of the photons.

17. The LIDAR measurement device of claim 16, wherein the correlator circuit is configured to output the correlation signals independent of stored data indicating the respective times of arrival based on the detection signals.

18. The LIDAR measurement device of claim 16, wherein the predetermined correlation time is relative to a leading edge of the respective detection signal indicating the respective time of arrival for the one or more of the photons.

19. The LIDAR measurement device of claim 16, wherein the correlator circuit comprises:
respective buffer elements that are configured to delay the respective detection signals by the predetermined correlation time and output respective pulsed signals having pulse widths corresponding to the predetermined correlation time; and logic circuits that are configured output the correlation signals when the pulse widths of at least two of the respective pulsed signals overlap in time.

20. The LIDAR measurement device of claim 16, wherein the processing circuitry further comprises:
- a time processing circuit comprising a counter circuit configured to increment a count value responsive to each of the correlation signals, and a time integrator circuit configured to generate an integrated time value with respect to a reference timing signal based on the respective times of arrival corresponding to the correlation signals,
- wherein a ratio of the integrated time value to the count value indicates an estimated average time of arrival of the photons,
- wherein the processing circuitry is configured to bypass the correlator circuit and provide the respective detection signals to the time processing circuit based on the respective detection signals relative to a predetermined threshold.

21. The LIDAR measurement device of claim 20, wherein the time processing circuit comprises a first channel that is configured to provide the count value and the integrated time value responsive to the correlation signals, and a second channel that that is configured to provide a reference count value and a reference integrated time value responsive to respective detection signals corresponding to photons whose respective times of arrival are outside the predetermined correlation time relative to one another.

22. The LIDAR measurement device of claim 16, wherein the processing circuitry further comprises:
- a recharge circuit that is configured to activate and deactivate subsets of the single-photon detectors for respective strobe windows between pulses of optical signals output from a pulsed light source and at respective delays that differ with respect to the pulses, responsive to respective strobing signals.

23. The LIDAR measurement device of claim 16, further comprising:
- a tunable optical filter element arranged to transmit the photons that are incident on the detector array, the tunable optical filter element having a transmission band that is configured to vary based on a spectrum of optical signals output from a pulsed light source and/or a temperature of the pulsed light source.

* * * * *

UNITED STATES PATENT AND TRADEMARK OFFICE
CERTIFICATE OF CORRECTION

PATENT NO. : 11,467,286 B2
APPLICATION NO. : 16/273783
DATED : October 11, 2022
INVENTOR(S) : Finkelstein et al.

It is certified that error appears in the above-identified patent and that said Letters Patent is hereby corrected as shown below:

In the Specification

Column 4, Line 59: Please correct "time to." to read --time t0.--

Column 4, Line 61: Please correct "time to," to read --time t0,--

Column 26, Line 34: Please correct "VO" to read --VQ--

Column 29, Line 1: Please correct "02" to read --O2--

Column 39, Line 48: Please correct "$n_{b9}$" to read --$n_{bg}$--

Column 46, Line 46: Please correct "designated a" to read --designated α--

Column 46, Line 49: Please correct "designated (3" to read --designated β--

Column 48, Lines 5-6, Eq. 5: Please delete Eq. 5 and replace with the following:
$$p_\beta = p_b(k \geq 2; \overline{n_b}) = 1 - p_b(k = 1; \overline{n_b}) - p_b(k = 0; \overline{n_b})$$
$$p_\beta = p_b(k \geq 2; \overline{n_b}) = 1 - (\overline{n_b} + 1) \times e^{\overline{n_b}}$$

Column 48, Line 45: Please delete "$p_{\alpha+\beta} = p_{s+b}(k \geq 2; \overline{n_{s+b}}) = 1 - (\overline{n_{s+b}} + 1) \times e^{\overline{n_{s+b}}}$" and replace with the following:
$$p_{\alpha+\beta} = p_{s+b}(k \geq 2; \overline{n_{s+b}}) = 1 - (\overline{n_{s+b}} + 1) \times e^{\overline{n_{s+b}}}$$

Signed and Sealed this
Twenty-first Day of February, 2023

*Katherine Kelly Vidal*

Katherine Kelly Vidal
*Director of the United States Patent and Trademark Office*